US007515397B2

(12) United States Patent
Reed et al.

(10) Patent No.: US 7,515,397 B2
(45) Date of Patent: Apr. 7, 2009

(54) METHODS OF MAKING A NIOBIUM METAL OXIDE AND OXYGEN REDUCED NIOBIUM OXIDES

(75) Inventors: David M. Reed, Douglassville, PA (US); Sridhar Venigalla, Macungie, PA (US); Ricky W. Kitchell, Douglassville, PA (US); Stephen J. Krause, Phoenixville, PA (US); Heather L. Enman, Bethlehem, PA (US); Dorran L. Schultz, Perkiomenville, PA (US); Jeffrey A. Kerchner, Fleetwood, PA (US)

(73) Assignee: Cabot Corporation, Boston, MA (US)

( * ) Notice: Subject to any disclaimer, the term of this patent is extended or adjusted under 35 U.S.C. 154(b) by 793 days.

(21) Appl. No.: 10/848,970

(22) Filed: May 19, 2004

(65) Prior Publication Data

US 2005/0025699 A1    Feb. 3, 2005

Related U.S. Application Data

(60) Provisional application No. 60/568,967, filed on May 7, 2004, provisional application No. 60/535,603, filed on Jan. 9, 2004, provisional application No. 60/534,461, filed on Jan. 6, 2004, provisional application No. 60/533,931, filed on Jan. 2, 2004, provisional application No. 60/471,650, filed on May 19, 2003, provisional application No. 60/471,649, filed on May 19, 2003.

(51) Int. Cl.
*B32B 18/00* (2006.01)

(52) U.S. Cl. .................. 361/528; 423/594.17; 264/618; 428/702; 428/469; 428/472; 205/149; 205/150; 361/529

(58) Field of Classification Search ............ 423/594.17, 423/592.1, 62, 265; 428/702, 469, 472; 361/528, 361/529; 205/149, 150, 322, 207; 264/618
See application file for complete search history.

(56) References Cited

U.S. PATENT DOCUMENTS

| | | | |
|---|---|---|---|
| 1,415,516 A | 5/1922 | Bridge | |
| 1,906,184 A | 4/1933 | Bohn | |
| 2,183,517 A | 12/1939 | Leemans et al. | 75/135 |
| 2,242,759 A | 5/1941 | Schlecht et al. | 75/84 |
| 2,443,524 A | 6/1948 | Kroll et al. | 423/62 |
| 2,621,137 A | 12/1952 | Miller | 148/13.1 |
| 2,700,606 A | 1/1955 | Wilhelm et al. | 75/84 |
| 2,761,776 A | 9/1956 | Bichowsky | 75/5 |
| 2,861,882 A | 11/1958 | Bichowsky | 75/84 |
| 2,937,939 A | 5/1960 | Wilhelm et al. | 75/84 |
| 2,992,095 A | 7/1961 | Li | 75/27 |
| 3,421,195 A | 1/1969 | Berryhill | 29/25.42 |
| 3,647,420 A | 3/1972 | Restelli | 75/84 |
| 3,665,260 A | 5/1972 | Kirkpatrick et al. | 361/529 |
| 3,849,124 A | 11/1974 | Villani | 420/422 |
| 3,926,832 A | 12/1975 | Barosi | 252/181.6 |
| 3,962,715 A | 6/1976 | Raccah et al. | 357/2 |
| 4,032,328 A | 6/1977 | Hurd | 75/84.1 |
| 4,059,442 A | 11/1977 | Bernard | 75/208 R |
| 4,118,727 A | 10/1978 | Laplante | 357/10 |
| 4,126,493 A | 11/1978 | Wurm | 148/20 |
| 4,186,423 A | 1/1980 | Yoshida et al. | 361/525 |
| 4,201,798 A | 5/1980 | Lindmayer | 427/74 |
| 4,406,699 A | 9/1983 | Beck et al. | 75/233 |
| 4,428,856 A | 1/1984 | Boyarina et al. | 252/181.1 |
| 4,483,819 A | 11/1984 | Albrecht et al. | 419/2 |
| 4,722,756 A | 2/1988 | Hard | 148/126.1 |
| 4,748,737 A | 6/1988 | Charles et al. | 29/599 |
| 4,805,074 A | 2/1989 | Harakawa et al. | 361/525 |
| 4,923,531 A | 5/1990 | Fisher | 148/126.1 |
| 4,960,471 A | 10/1990 | Fife | 148/20.3 |
| 4,964,906 A | 10/1990 | Fife | 75/369 |
| 5,011,742 A | 4/1991 | Fife et al. | 428/558 |
| 5,013,357 A | 5/1991 | Worcester et al. | 75/622 |
| 5,022,935 A | 6/1991 | Fisher | 148/126.1 |
| 5,171,379 A | 12/1992 | Kumar et al. | 148/422 |
| 5,211,741 A | 5/1993 | Fife | 75/255 |
| 5,245,514 A | 9/1993 | Fife et al. | 361/529 |
| 5,369,547 A | 11/1994 | Evans | 361/516 |
| 5,412,533 A | 5/1995 | Murayama et al. | 361/528 |
| 5,448,447 A | 9/1995 | Chang | 361/529 |
| 5,470,525 A | 11/1995 | Tripp et al. | 419/36 |

(Continued)

FOREIGN PATENT DOCUMENTS

AU    104631    8/1937

(Continued)

OTHER PUBLICATIONS

Abstract Document No. 129:284714, 1998, no month.

(Continued)

*Primary Examiner*—Steven Bos

(57) ABSTRACT

Methods to at least partially reduce a niobium oxide are described wherein the process includes mixing the niobium oxide and niobium powder to form a powder mixture that is then heat treated to form heat treated particles which then undergo reacting in an atmosphere which permits the transfer of oxygen atoms from the niobium oxide to the niobium powder, and at a temperature and for a time sufficient to form an oxygen reduced niobium oxide. Oxygen reduced niobium oxides having high porosity are also described as well as capacitors containing anodes made from the oxygen reduced niobium oxides.

60 Claims, 12 Drawing Sheets

U.S. PATENT DOCUMENTS

| | | | | |
|---|---|---|---|---|
| 5,825,611 | A | 10/1998 | Pozdeev | 361/524 |
| 5,993,513 | A | 11/1999 | Fife | 75/743 |
| 6,007,597 | A | 12/1999 | Puopolo et al. | 75/10.14 |
| 6,051,044 | A | 4/2000 | Fife | 75/229 |
| 6,051,326 | A | 4/2000 | Fife | 428/610 |
| 6,136,062 | A | 10/2000 | Loffelholz et al. | 75/369 |
| 6,165,623 | A | 12/2000 | Fife et al. | 428/472 |
| 6,312,642 | B1 | 11/2001 | Fife | 419/30 |
| 6,322,912 | B1 | 11/2001 | Fife | 428/702 |
| 6,373,685 | B1 | 4/2002 | Kimmel et al. | 361/508 |
| 6,391,275 | B1 | 5/2002 | Fife | 423/592 |
| 6,416,730 | B1 | 7/2002 | Fife | 423/592 |
| 6,462,934 | B2 | 10/2002 | Kimmel et al. | 361/508 |
| 6,527,937 | B2 | 3/2003 | Fife | 205/209 |
| 6,576,038 | B1 | 6/2003 | Rao | 75/255 |
| 6,576,099 | B2 | 6/2003 | Kimmel et al. | 204/291 |
| 6,592,740 | B2 | 7/2003 | Fife | 205/149 |
| 6,639,787 | B2 | 10/2003 | Kimmel et al. | 361/508 |
| 6,759,026 | B2 | 7/2004 | Kimmel et al. | 423/592.1 |
| 2002/0028175 | A1 | 3/2002 | Fife | 423/592 |
| 2002/0066338 | A1* | 6/2002 | Shekhter et al. | 75/245 |
| 2002/0114722 | A1 | 8/2002 | Kimmel et al. | 419/45 |
| 2002/0135973 | A1 | 9/2002 | Kimmel et al. | 361/509 |
| 2003/0104923 | A1 | 6/2003 | Omori et al. | 501/134 |
| 2003/0117766 | A1 | 6/2003 | Naito et al. | 361/305 |
| 2003/0147203 | A1 | 8/2003 | Naito et al. | 361/524 |
| 2003/0170169 | A1 | 9/2003 | Omori et al. | 423/592.1 |
| 2003/0205106 | A1 | 11/2003 | Omori et al. | 75/245 |
| 2003/0230167 | A1 | 12/2003 | Loeffelholz et al. | 75/255 |

FOREIGN PATENT DOCUMENTS

| | | |
|---|---|---|
| DE | 198 312 80 | 1/2000 |
| EP | 0 634 762 A1 | 9/1991 |
| EP | 0 634 761 A1 | 1/1995 |
| GB | 485318 | 5/1938 |
| GB | 489742 | 8/1938 |
| GB | 835316 | 5/1960 |
| GB | 1123015 | 8/1968 |
| WO | WO 98/19811 | 5/1998 |
| WO | WO 00/15556 | 9/1999 |
| WO | WO 00/15555 | 3/2000 |
| WO | WO 01/35428 A1 | 5/2001 |
| WO | WO 01/71738 A2 | 9/2001 |
| WO | WO 01/99130 A1 | 12/2001 |

OTHER PUBLICATIONS

Abstract Document No. 129:130191, 1998, no month.
Abstract Document No. 128:288971, 1998, no month.
Abstract Document No. 85:170443, 1976, no month.
Abstract Document No. 83:140466, 1975, no month.
Abstract Document No. 104:229152, 1986, no month.
Abstract Document No. 104:198128, 1986, no month.
Abstract Document No. 108:122980, 1988, no month.
Abstract Document No. 106:42412, 1987, no month.
Abstract Document No. 110:224093, 1989, no month.
Abstract Document No. 109:103212, 1988, no month.
Abstract Document No. 116:199338, 1992, no month.
Abstract Document No. 113:10823, 1990, no month.
Abstract Document No. 120:179957, 1994, no month.
Abstract Document No. 119:84165, 1993, no month.
Abstract Document No. 118:86049, 1993, no month.
Mellor "Inorganic and Theoretical Chemistry" vol. IX, pp. 856-857, no date.
Pages 59, 65, and 66 of Encyclopedia of Chemical Technology, vol. 17, 4th Edition, no date.
Young article, pp. 4 and 5 of Chapter 2, no date, no citation.
Vest et al., "Electrical Conductivity in Ceramics and Glass" Department of the Air Force, Aerospace Research Laboratories Wright-Patterson Air Force Base, Ohio. pp. 375-384. (1974).
Feschotte, et al., "Niobium Physico-Chemical Properties Of TTS Compounds and Alloys" Atomic Energy Review, Special Issue No. 2. International Atomic Energy Agency—Vienna (1968). pp. 57-59.
Kuz' micheva, et al., "Superconductivity in lathanide-strontium-niobium-oxide systems" Sh. Neorg. Khim. 38(1), 162-6. (1993) (with English translation).
Acrivos, et al., "Dynamic phenomena in superconducting oxides measured by ESR" Phys. Rev. B: Condens. Matter, 50(18), pp. 12710-12723. (1994).
Acrivos, et al., "Dynamics of flux motion . . . " Physica C (Amsterdam) 234-40(Pt. 5), pp. 3159-3160. (1994).
International Search Report for PCT/US99/21413 mailed Sep. 16, 1999.
Georg Bauer, "The Oxides of Niobium," Zeitschrift fuer anorganische und allgemeine Chemie, vol. 248, Sep. 12, 1941, No. 1, pp. 1-31. (With Full English Translation).
J. W. Mellor, A Comprehensive Treatise on Inorganic and Theoretical Chemistry, Sep. 1947, vol. IX, p. 856.
"Niobium and Oxygen" Gmelins Handbook of Inorganic Chemistry, Verlag Chemi, 1970, pp. 14-44 (with English Translation).
Tagusagawa et al., "Niobium Compounds for Capacitor Application," TIC Meeting in Lisbon, pp. 1-11, (2003).
"Niobium Material Overview," http://www.espi-metals.com, pp. 223-228.
Hiraoka, et al., "Electrochemical Measurement of the Standard Free Energies of Formation of Niobium Oxides," Research Article, Department of Metallurgy and Materials Science, University of Tokyo, pp. 102-106, (1970).
Hiraoka et al., "Electrochemical Measurement of the Standard Free Energies of Formation of Niobium Oxides," Transactions ISIJ, vol. 11, pp. 102-106 (1971).
Baba et al., "Preparation and Chlorination of NbO2, NbO and NbC," Journal Mining and Mettalurgical Institute of Japan, vol. 82, No. 942, pp. 855-860 (1966).
Steeb, et al., "NIOB und Sauerstoff," Gmelin, Niob, Part B1, vol. 49, pp. 26-33 (1970) w/ partial English trans.
Mudrolyubov, "Production of tantalum capacitors in the C.I.S," Philadelphia meeting of the TIC, pp. 3-4 (1991).
Andersson, "Die Bedeutung des Tantals in der Kondensatorindustrie," Erzmetall, vol. 48, No. 6/7, pp. 430-434 (1995).
Brauer et al., "Die Nitride des Niobs," Z. anorg. Allg. Chemie, vol. 270, pp. 160-178 (1952) w/ partial Engl. Trans.
Brauer, "Nitrides, Carbonitrides and Oxynitrides of Niobium," Journal of the less-Common Metals, vol. 2, pp. 131-137, (1960).
Schonberg, "Some Features of the Nb-N and Nb-N-O Systems," ACTA Chem. Scand., vol. 8, pp. 208-212 (1954).
Gannon et al., "The Microstructure of Slightly Substoichiometric NbO2," Journal of Solid State Chemistry, vol. 20, pp. 331-344 (1977).
Schafer, "Uber die Darstellung der Nioboxide und ihren Transport im Temperaturgefalle," Z. anorg. Allg. Chemie. vol. 317, pp. 321-333, (1962) w/ partial English translation.
Mifune, et al., "Niobium Solid Electrolytic Capacitors," National Technical Report 1, 147, pp. 1-14, (1963) (in English).
Lapitskii, et al., "The formation of the lower oxides of niobium and tantalum in some reactions of reduction and oxidation," Zhurnal Neorganicheskoi Khimii, vol. II, No. 1, pp. 80-91, (1957).
Orlov et al., "Sutdy of Oxygen Solubility in Niobium," Metally, No. 5, pp. 202-205 (1985).
Brauer et al., "Mikrokristallines NbO," p. 1462 w/ partial English translation.
Notice of Opposition for EP 1115658 B1 with English Translation filed Apr. 2, 2004 by H.C. Stark GmbH.
Notice of Opposition for EP 1115658 B1 in English filed Apr. 8, 2004 by Strawman Limited.
International Search Report for International Application No. PCT/US2004/015626, dated Aug. 30, 2005.
Written Opinion for International Application No. PCT/US2004/015626, dated Aug. 30, 2005.

* cited by examiner

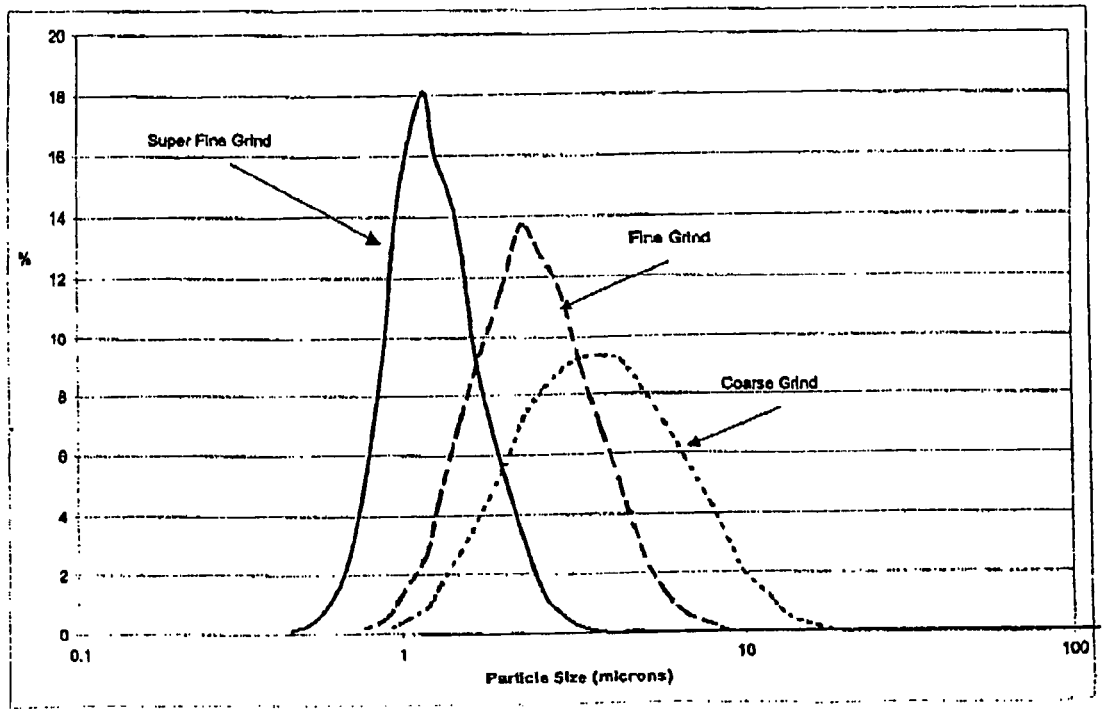
Figure 13  Particle size distributions for NbH particles.
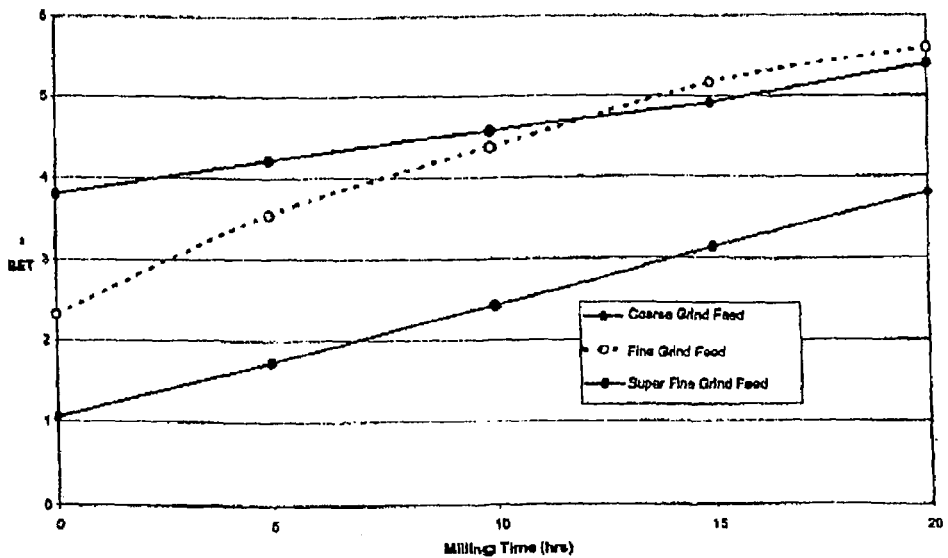
Figure 15  BET Surface Area versus milling time for 1/32" media.

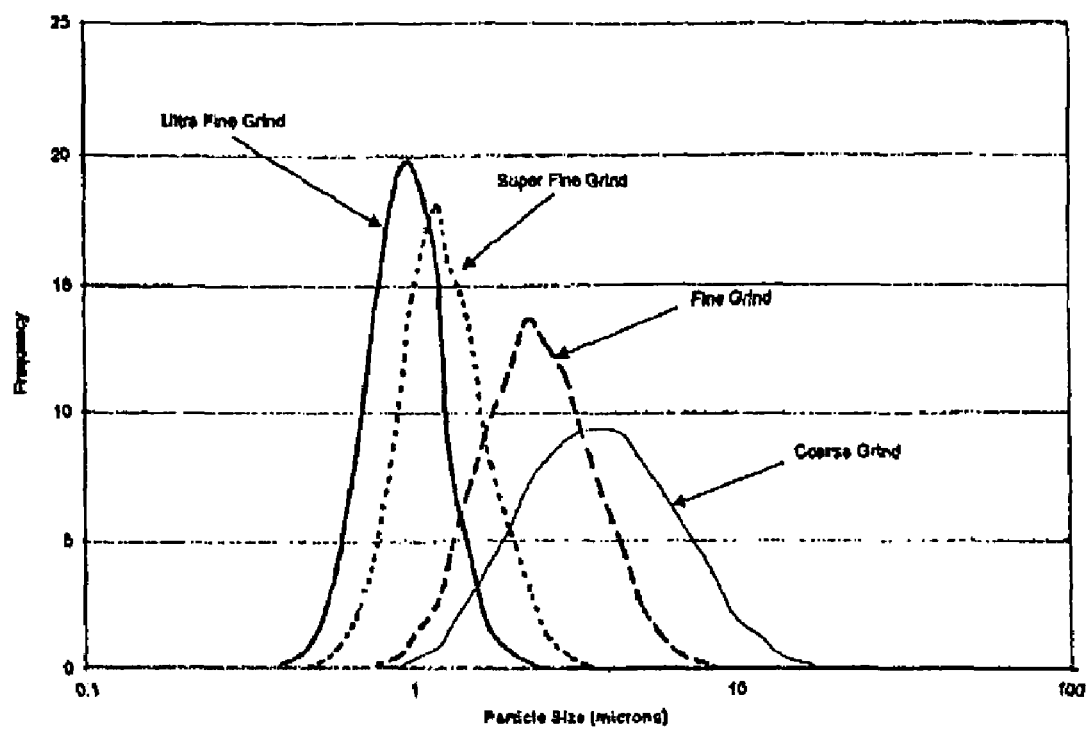
Figure 14  Particle size distributions for NbH powders.

METHODS OF MAKING A NIOBIUM METAL OXIDE AND OXYGEN REDUCED NIOBIUM OXIDES

This application claims the benefit under 35 U.S.C. §119 (e) of prior U.S. Provisional Patent Application No. 60/471,649 filed May 19, 2003, U.S. Provisional Patent Application No. 60/471,650 filed May 19, 2003, U.S. Provisional Patent Application No. 60/533,931 filed Jan. 2, 2004, U.S. Provisional Patent Application No. 60/534,461 filed Jan. 6, 2004, U.S. Provisional Patent Application No. 60/535,603 filed Jan. 9, 2004, and U.S. Provisional Patent Application No. 60/568,967 filed May 7, 2004, which are incorporated in their entireties by reference herein.

BACKGROUND OF THE INVENTION

The present invention relates to niobium and other valve metals and oxides thereof and more particularly to niobium oxides and methods to at least partially reduce niobium oxide and further to oxygen reduced niobium oxides and other valve metal oxides. The present invention relates to niobium oxides and other valve metal oxides useful, for instance, in the production of capacitors, sintered anode bodies, and the like. The present invention also relates to methods of making niobium oxide particles and other valve metal oxide particles. The present invention also relates to niobium, niobium powder, hydrided forms thereof, and electrolytic capacitors made therefrom. More particularly, the present invention relates to methods of preparing niobium or hydrided niobium feedstock to form suitable niobium powder or hydrided niobium for a variety of uses.

Efforts are continually being made to improve the handling of metal powder, such as niobium powder. In particular, fine powders, for instance, having particle sizes of 0.1-200 microns, can prove difficult to work with and thus, methods to agglomerate or granulate fine metal powder have been developed. In addition to developing methods to agglomerate fine metal powders, efforts have also been made to agglomerate such powders in such a manner that flow properties and/or other desirable properties such as electrical characteristics are maintained or improved.

Development of metal powders suitable for making capacitors has resulted from efforts by both capacitor producers and metal powder processors to delineate the characteristics required for metal powder to best serve in the production of quality capacitors. Such characteristics include surface area, purity, shrinkage, pressability, green strength, flowability, and stability.

Solid state electrolytic capacitors, and valve metal capacitors in particular, have been a major contributor to the miniaturization of electronic circuits. In addition to the reduced size and higher frequencies of current electronic equipment and electronic circuits, a growing demand exists for capacitors offering higher capacitance and lower equivalent series resistance (ESR). Valve metal capacitor anodes typically are manufactured by compressing valve metal powder to less than half of the metal's true density with an anode lead wire to form a pellet, sintering the pellet to form a porous body (i.e., an anode), and then anodizing the porous body by impregnation with a suitable electrolyte to form a continuous dielectric oxide film on the porous body. The anodized porous body is then impregnated with a cathode material to form a uniform cathode coating, connected to a cathode lead wire by soldering, for instance, and encapsulated with a resin casing. Thus, open, uniform pores are important for the steps of anodizing and impregnating the pellet to form the cathode.

Valve metal oxides that have been oxygen reduced, in other words, valve metal suboxides such as niobium monoxide (NbO), TaO, and the like, have been recently recognized as a viable solid electrolytic capacitor material that offers unique performance advantages such as high dielectric stability, low leakage current, and low flammability. These advantages, combined with lower costs, make valve metal suboxides an attractive and economical alternative to valve metal as an electrolytic capacitor material. Conventional methods of preparing niobium suboxide include converting a mixture of stochiometric proportions of niobium pentoxide ($Nb_2O_5$) powder and niobium metal powder (acting as an oxygen getter) into NbO via heat treatment under vacuum. However, these methods have the possibility that some incomplete reactions may occur that yield a sub-optimal material such as $NbO_2$ that is interspersed within and difficult to separate from the NbO. Thus, it is advantageous to eliminate the chances of any semi-conducting material being present in the powder material used to form the anodized porous body.

It is hypothesized that the ESR of a capacitor anode is related to the cohesiveness of the primary particles used in formation of the capacitor. The cohesiveness of the primary particles can be related to the quantity and quality of connections between primary particles achieved in agglomerating the primary particles to form agglomerates (agglomerates can be described as clusters of smaller primary particles). Thus, the ESR of a capacitor anode can be decreased via the coarsening that results from thermal agglomeration of the primary powder particles used in forming the anodized porous body. However, coarsening of the particles tends to be accompanied by densification of the particles which reduces the surface area (reduced capacitor capacitance). Thus, the production of agglomerated particles having a large surface area, suitable cohesive strength, and uniform porosity that enable the production of a valve metal capacitor having both high capacitance (i.e., high volumetric efficiency) and low ESR is considerably difficult using capacitor grade powders made by conventional methods.

In addition, conventional methods of preparing a valve metal suboxide powder typically produce powder particles having a relatively rough, irregular surface texture. The rough particle surface tends to retain significantly more organic material during formation of capacitors from the valve metal suboxide powder. Residual organics can result in high levels of residual carbon in the finished capacitors, causing high DC leakage of the capacitors.

With an ever increasing demand for capacitor materials such as tantalum, alternatives to tantalum have become an important priority in order to meet industry demands. Niobium is becoming one of the alternatives to tantalum but as the industry has realized, niobium is not a complete substitute for tantalum due to niobium not providing the same electrical properties. Accordingly, further developments in the niobium area continue today.

Another alternative to tantalum is niobium metal oxides that have been oxygen reduced, in other words, niobium sub-oxides such as NbO and the like. The oxygen reduced niobium oxides show considerable promise as providing an additional material that can be used in the formation of capacitor anodes. In order to further satisfy industry demands, several properties of the oxygen reduced niobium oxides can preferably be improved such as the crush strength of the oxygen reduced niobium oxides as well as efforts to reduce the amounts of contamination that occurs in the manufacturing of the oxygen reduced niobium oxides. In addition, acid leaching is commonly used to reduce the level of contamination occurring when niobium is milled to achieve particular particle sizes. The acid leaching step complicates the manufacturing process and leads to the manufacturing process being more expensive. In addition, the flow property of the oxygen reduced niobium oxides could be further improved to better satisfy industry standards.

While there are various methods to make oxygen reduced niobium oxides and other oxygen reduced valve metal oxides, there is a constant need to improve upon the resulting properties of the final product. In some processes, the treatment steps can cause a loss of surface area and other treatment steps can cause a loss of flow properties and a decline in other favorable properties generally useful in the fabrication of capacitor anodes. For instance, the sintered crush strength of the oxygen reduced niobium oxide powders is a desirable property which can be generally low with current oxygen reduced niobium oxides. However, in any effort to improve upon this property, other properties can be affected such as the surface area, pore structure, pore size distribution, flow properties, and the like. Thus, there is a need in the industry to provide a method, as well as to provide products which provide a fine balance of properties, including a desirable sintered crush strength and green strength, along with other properties, such as BET surface area, capacitance capability, particle size, and the like.

The metal powder should provide an adequate surface area when formed into a porous body and sintered. The CV/g of metal capacitors can be related to the specific surface area of the sintered porous body produced by sintering a metal powder pellet. The specific surface area of metal powder can contribute to the maximum CV/g attainable in the sintered porous body.

Purity of the powder can be an important consideration as well. Metallic and non-metallic contamination tends to degrade the dielectric oxide film in metal capacitors. While high sintering temperatures serve to remove some volatile contaminants, high temperatures tend to shrink the porous body reducing its net specific surface area and thus the capacitance of the resulting capacitor. Minimizing the loss of specific surface area under sintering conditions, i.e., shrinkage, is helpful in producing high CV/g metal capacitors.

Flowability of the metal powder and green strength (mechanical strength of pressed unsintered powder pellets) are also important characteristics for the capacitor producer in order to provide efficient production. The flowability of the agglomerated metal powder can be important to proper operation of automatic pellet presses. Sufficient green strength permits better handling and transport of a pressed product, e.g., pellet, without excessive breakage.

A "pellet," as the term is used herein, is a porous mass or body comprised of metal particles or oxides thereof. Green strength is a measure of a pellet's unsintered mechanical strength. The term "pressability" describes the ability of a metal powder to be pressed into a pellet. Metal powder or oxides thereof that forms pellets that retain their shape and have sufficient green strength to withstand ordinary processing/manufacturing conditions without significant breakage have good pressability.

A desirable characteristic of metal powders or oxides thereof of relatively fine particle size is stability. Stability of metal powders can be achieved by surface passivation of the particles with, for example, oxygen or an oxide layer. Surface passivation is typically accomplished in a separate passivation step.

Accordingly, a need exists to provide fine metal particles such as niobium powder, not only to address the problems of fine powders but also to lead to agglomerated metal particles that have desirable properties such as good flow properties and improved pore size distribution.

Ongoing efforts persist to develop superior niobium materials and to refine niobium preparation processes to produce capacitor grade metal material that can be formed into high performance capacitors characterized by high capacitance (CV/g) and low DC leakage. Examples of morphology and other observable or measurable microstructure characteristics of capacitor grade material that can affect the performance characteristics of capacitors made therefrom, include primary particle size ($D_{50}$), granule size, flow, purity, degree of roundness, specific (BET) surface area, particle size distribution (e.g., $D_{10}$, $D_{50}$, and $D_{90}$), Scott density, pressability, crush strength, porosity, stability, dopant content, alloy content, and the like.

Niobium metal oxides that have been oxygen reduced, in other words, niobium suboxides such as niobium monoxide (NbO) and the like, have been recently recognized as a viable solid electrolytic capacitor material that offers unique performance advantages such as high dielectric stability, low leakage current, and low flammability. These advantages, combined with lower costs, make niobium suboxides an attractive and economical alternative to tantalum as an electrolytic capacitor material. Conventional methods of preparing niobium suboxides typically include converting a mixture of stochiometric proportions of $Nb_2O_5$ powder and niobium metal which acts as an oxygen getter into niobium suboxide(s) via heat treatment under vacuum. In addition to being relatively expensive due to the historically high cost of niobium metal, reduction methods using niobium metal offer significant challenges in controlling morphology and microstructure of the oxygen reduced final product (e.g., NbO) to obtain performance characteristics, such as high CV/g.

In addition to limited control over final product morphology, conventional methods of preparing niobium suboxide that use solid getter materials other than niobium metal, such as tantalum and magnesium, have other drawbacks. For instance, the final niobium suboxide product can become contaminated in the reduction process by unreacted or residual getter material and/or oxidized getter material being mixed in with the niobium suboxide. The likelihood of contamination is increased when the getter material is physically contacted with the starting niobium oxide such as by homogenizing, blending, mixing or the like. Also, getter materials used in conventional reduction reactions typically have high atomic weight and particles that provide a relatively low surface area with which the oxygen can react. Thus, currently used getter materials must be present in large quantities to reduce a given amount of starting niobium oxide. As a result, the extent of contamination of the reduced oxygen niobium oxide is greater because the ratio of getter material to the niobium oxide is high. Preparation of the final product by decontaminating the niobium suboxide by screening or acid leaching the niobium suboxide, for example, becomes more difficult and more waste is produced.

Accordingly, a need exists for an oxygen reduced niobium oxide such as NbO that is less expensive to produce than niobium suboxides produced by current methods that involve using niobium metal to reduce niobium oxides. A further need exists for a process that provides a greater degree of control over the morphology, microstructure, and/or particle size distribution of the oxygen reduced final product than what is presently possible using conventional reduction methods. A need also exists for a method to reduce a niobium oxide in which contamination of the oxygen reduced niobium oxide during the reaction process is minimized by having a comparatively low ratio of getter material to niobium oxide relative to conventional methods. Also needed are capacitors that have superior performance characteristics such as high capacitance and low DC leakage made from niobium suboxides having superior morphology.

A need also exists for a method of making primary and agglomerated valve metal oxide particles useful in producing a valve metal sintered body, that suitably controls the surface area, the cohesive strength, the porosity, the crush strength, and other properties of the valve metal oxide particles used as the capacitor-grade material, as well as minimizes the presence of semi-conducting valve metal oxides in the capacitor-grade material.

Accordingly, a need exists to overcome one or more of the above-described disadvantages.

SUMMARY OF THE PRESENT INVENTION

It is therefore a feature of the present invention to provide oxygen reduced niobium oxides having a porous, multi-modal or unimodal structure or a unimodal structure with an extended shoulder.

Another feature of the present invention is to provide oxygen reduced niobium oxides having improved sintered crush strength, porosity, green strength, and flow characteristics.

A further feature of the present invention is to provide high capacitance capacitors having low DC leakage made from oxygen reduced niobium oxides.

A further, feature of the present invention to provide a method of controlling the porosity and the BET surface area of capacitor-grade valve metal oxide particles by a method that includes thermal heat treatment.

Another feature of the present invention is to provide a method of making valve metal oxide particles that produces beneficial coarsening of the particles without sacrificing the desired impregnability of the particles.

Another feature of the present invention is to provide a method of preparing niobium pentoxide particles as well as other valve metal oxide particles that can be dexoxidized to form a finished niobium suboxide (or other valve metal sub-oxide) powder product having superior electrical properties.

A further feature of the present invention is to provide a method of thermally agglomerating a valve metal oxide in which pore size of the particles is maintained or increased without a substantial loss of BET surface area of the particles.

Yet another feature of the present invention is to provide a post-reaction, heat treated, oxygen reduced valve metal oxide in which the particles have a reduced BET surface area and are characterized as being less susceptible to retaining organic material during capacitor formation.

A further feature of the present invention to provide methods to form useful niobium powders or hydrided forms thereof which are preferably capable of forming useful granules for a variety of uses including capacitor applications and the formation of oxygen reduced niobium sub-oxides.

Another feature of the present invention is to provide niobium powders optionally in granule form which have a variety of useful properties.

A further feature of the present invention is to provide capacitor anodes having a variety of useful electrical properties such as high capacitance and/or low leakage.

A further feature of the present invention is to provide a method to at least partially reduce a niobium oxide using an oxygen getter material that has a high accessible surface area to volume ratio.

Another feature of the present invention is to reduce production costs of oxygen reduced niobium oxides by using an inexpensive getter material, decreasing the ratio of getter material to niobium oxide, and/or limiting the extent of contamination of the niobium oxide by the getter material and its oxide.

A further feature of the present invention is to control reaction conditions during oxygen reduction of niobium oxide to produce niobium suboxides having a desired morphology.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method to at least partially reduce a niobium oxide. The method includes mixing a niobium powder and a starting niobium oxide together to form a powder mixture; heat treating the powder mixture under vacuum to form a heat treated powder; and reacting the heat treated powder in an atmosphere which permits the transfer of oxygen atoms from the starting niobium oxide to the niobium powder, wherein the reacting occurs for a time and at a temperature sufficient to form an oxygen reduced niobium oxide.

Preferably, the niobium powder and starting niobium oxide are mixed together by co-milling. Preferably, the co-milling is used to aggressively break down any hard aggregates and to preferably reduce the particles to primary particles of the starting niobium oxide and niobium powder. As a further option, prior to heat treating the powder mixture, the powder mixture is granulated to form a plurality of granules.

The present invention further relates to a method to at least partially reduce a niobium oxide that includes heat treatment of the starting materials that causes mass transfer between particles characterized by necking of the particles.

The present invention further relates to a method to at least partially reduce a niobium oxide that includes granulating one or both of the starting materials either separately or as a mixture, and/or the oxygen reduced niobium oxide.

Furthermore, the present invention relates to valve metal sub-oxide powders having a sintered crush strength of at least 35 pounds.

In addition, the present invention relates to a valve metal sub-oxide powder having a granule strength, which is preferably substantially independent of screen size. The present invention further relates to valve metal sub-oxide powders having a green crush strength that is desirable for capacitor anode formation.

Also, the present invention relates to valve metal sub-oxide powders that have a porosity distribution such that a mono-modal log differential intrusion peak forms between 0.5 and 0.8 µm, wherein the log differential intrusion peak has a width of from 0.3 to 1.1 µm at 0.1 mL/g, and the mono-modal log differential intrusion peak has a height greater than 0.6 mL/g.

Also, the present invention relates to valve metal sub-oxide powders that have a porosity distribution such that a mono-modal log differential intrusion peak is present wherein the mono-modal log differential intrusion peak has a shoulder extending from 1.3 µm (or less) to 10 µm (or greater) with a shoulder height of less than 0.1 mL/g.

In addition, the present invention relates to valve metal sub-oxide powders that have a pore size distribution such that a mono-modal log differential intrusion peak is present with a shoulder, wherein the shoulder has a cumulative volume measured from 1 to 10 μm wherein the ratio is from 1 to 7.5.

Further, the present invention relates to valve metal suboxide powders that have a pore size distribution and forms a mono-modal log differential intrusion peak with a shoulder, wherein the shoulder has a total porosity of from 4 to 13 percent at above 1 μm and/or a total porosity of 1 to 4 percent at less than 10 μm.

Also, the present invention relates to valve metal sub-oxide powders having a pore size distribution to form a mono-modal log differential intrusion peak at about 0.4 μm, wherein the log differential intrusion peak has a width or breadth of from 0.2 to 0.6 μm at 0.1 mL/g, wherein the mono-modal log differential intrusion peak has a height greater than 0.5 mL/g.

The present invention also relates to a method to control porosity in valve metal sub-oxide materials which comprises forming granules and adjusting the granule size to obtain desired porosity. For instance, a pore size distribution can be achieved to form a log differential intrusion peak which can have an adjustable log differential intrusion peak height of from about 0.4 mL/g to about 0.75 mL/g. This can be adjusted, for instance, by screen size and/or pre-heat treatment variations.

The present invention also relates to a method of making valve metal oxide particles. The method generally includes heat treating a starting valve metal oxide under vacuum or inert conditions to form agglomerated particles, followed by deagglomerating the agglomerated particles.

The present invention further relates to niobium oxide(s) and other valve metal oxides that have superior impregnation properties.

The present invention also relates to high capacitance capacitors having low DC leakage made from valve metal oxide particles.

The present invention further relates to a post reaction heat treatment of an oxygen reduced valve metal oxide which reduces its BET surface area while maintaining its crush strength, flow, porosity, and/or other properties.

The present invention also relates to a method of making a niobium powder, e.g., a surface-passivated niobium powder, or hydrided forms thereof. The method includes a first milling (e.g., wet milling) of a niobium or hydrided niobium feedstock using a first milling media to form a first milled niobium or hydrided niobium powder; and a second milling (e.g., wet milling) of the first milled niobium or hydrided niobium powder using a second milling media after the first milling to preferably form a surface-passivated niobium or hydrided niobium powder, preferably having an oxygen content of at least 1,000 ppm, wherein the first milling media has a size that is greater than a size of the second or subsequent milling media.

The present invention further relates to niobium or hydrided niobium powders, optionally in granule form, which have desirable primary particle sizes, BET surface areas, flow rates, oxygen contents, high capacitance capability, bimodal pore size distribution, low metal impurities, or combinations thereof.

The present invention also relates to a method to at least partially reduce a niobium oxide. The method generally includes heat treating a starting niobium oxide in the presence of a getter material and in an atmosphere which permits a transfer of oxygen atoms from the starting niobium oxide to the getter material, for a time and at a temperature sufficient to form an oxygen reduced niobium oxide, wherein the getter material includes titanium. Preferably, the getter material is a titanium sponge.

The present invention also relates to capacitor-grade niobium suboxides having a variety of beneficial properties and characteristics.

The present invention further relates to capacitors that have superior performance characteristics such as high capacitance and low DC leakage made from niobium suboxides having superior morphology.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

BRIEF DESCRIPTION OF THE DRAWINGS

FIGS. 13 and 14 are graphs of particle size distribution for a single step milling, and two or three staged millings of different milling times.

FIG. 15 is a graph of BET surface areas versus milling times for $\frac{1}{32}$" media for NbH powder.

DETAILED DESCRIPTION OF THE PRESENT INVENTION

Figure 1:
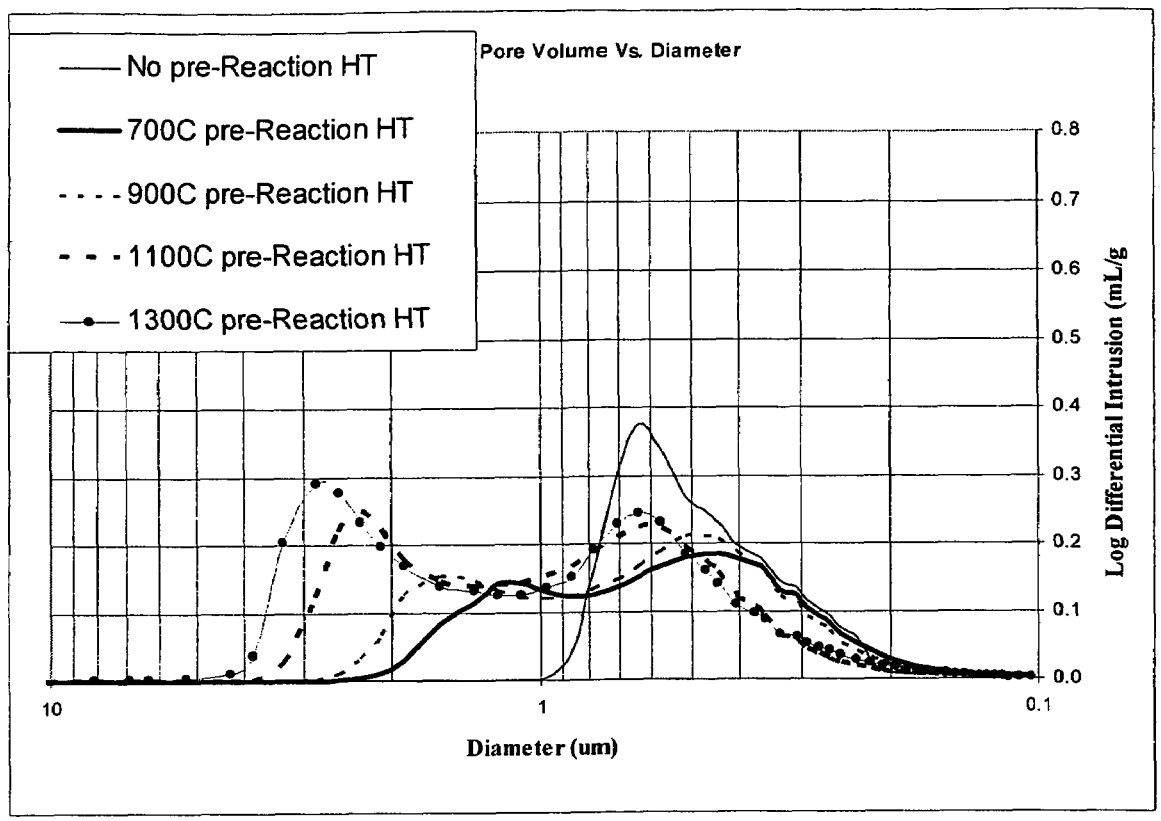
FIG. 1 is a graph of pore size distribution of various oxygen reduced niobium oxide powders that are pressed and sintered.

For purposes of the present invention, the preferred powder, which is an oxygen reduced niobium oxide will be primarily discussed for exemplary purposes. It is to be realized that the scope of the present invention relates to oxygen reduced valve metal oxides, such as oxygen reduced tantalum oxides, oxygen reduced aluminum oxides, oxygen reduced titanium oxides, oxygen reduced zirconium oxides, and alloys thereof. For purposes of the present invention, examples of the starting valve metal oxides can be, but are not limited to, at least one oxide of the metals in Groups 4, 5, and 6 (IUPAC designations) of the Periodic Table, aluminum, bismuth, antimony, and alloys thereof and combinations thereof. Generally, the alloys of the valve metal oxides will have the valve metal as the predominant metal present in the alloy oxide. Specific examples of the starting valve metal oxides, include, but are not limited to, $Nb_2O_5$, $Ta_2O_5$, and $Al_2O_3$. Also, for purposes of the present invention, oxygen reduced niobium oxides are used interchangeably with the term "niobium sub-oxides" and have the same meaning.

Likewise, oxygen reduced valve metal oxides have the same meaning as "valve metal sub-oxides."

A method of making oxygen reduced niobium oxides according to the present invention generally includes the steps of mixing a niobium powder and a starting niobium oxide together to form a powder mixture; heat treating the powder mixture preferably under inert or vacuum conditions to form a heat treated powder; and reacting the heat treated powder in an atmosphere which permits the transfer of oxygen atoms from the niobium oxide to the niobium powder for a time and at a temperature sufficient to form an oxygen reduced niobium oxide. The method optionally further includes granulating the starting niobium oxide, the niobium powder, both the starting niobium oxide and the niobium powder either separately before the mixing or as the powder mixture, or the oxygen reduced niobium oxide after formation. Preferably, the niobium powder and starting niobium oxide are mixed together by co-milling, preferably using high energy or aggressive milling so that the starting niobium oxide and niobium powder are essentially primary particles intimately mixed with one another. Furthermore, preferably the mixture that is preferably co-milled is granulated prior to heat treating.

Another method of making valve metal oxide particles according to the present invention generally includes heat treating a starting valve metal oxide or an oxygen reduced valve metal oxide to form primary and/or agglomerated valve metal oxide particles. The method preferably includes heat treating a starting valve metal oxide under vacuum or inert conditions to form agglomerated particles, and then deagglomerating the agglomerated particles.

A method of making niobium powder, e.g., surface-passivated niobium powder, or hydrided forms thereof according to the present invention includes milling, such as wet or dry milling, that involves multiple milling steps or staged milling of a niobium or hydrided niobium metal to form a surface-passivated niobium or hydrided niobium powder. In staged milling, there are at least two stages of milling, wherein in the first stage, the diameter of the milling media is larger than the diameter of the milling media used in the second and any subsequent stages of milling. The staged milling of the niobium or hydrided niobium metal leads to a variety of beneficial properties including a narrower particle distribution range and/or a smaller mean particle size of the niobium or hydrided niobium powder. In addition, surface-passivating during staged milling of the niobium or hydrided niobium metal eliminates the need for an additional passivation step which may be necessary for particles of comparable size prepared by other methods. For purposes of the present invention, the material can be niobium, hydrided niobium (e.g., NbH), doped forms of niobium (e.g., nitrided Nb), and the like. While "niobium" powder is discussed in detail below, it is understood that the other powders described above apply equally to this process and any part of the present invention, including, but not limited to, niobium hydride powder.

Various steps can be incorporated into the method to form the niobium powder, e.g., the surface-passivated niobium powder. In general, the present invention can include reducing the particle size of a niobium feedstock. In addition, any preliminary or intermediate or final milling step can be used in addition to the milling steps described herein. For example, a jet milling can be used at any point.

According to an embodiment of the present invention, the milling process is preferably a wet milling process. In wet milling, the niobium metal is milled using a milling media in the presence of an aqueous solution, preferably water. An example of a suitable ratio for a wet milling process is 800 grams of niobium powder to 300 ml of water. The milling media can occupy the remaining volume in the mill. An example of a suitable ratio is 5,000 g Nb powder to 1,600 ml water to 1 gallon of media, plus or minus 1-20% for each component.

For purposes of the present invention, surface passivation of the niobium powder can be characterized by formation of a niobium oxide on the surface of the niobium powder. Wet-milling of the niobium feedstock or the first milled niobium powder (both of which are hereinafter referred to as niobium metal) can produce surface-passivation of the niobium powder, for instance, from a reaction of the niobium metal with water as represented by the reaction:

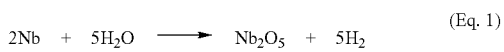

$$2Nb + 5H_2O \longrightarrow Nb_2O_5 + 5H_2 \quad (Eq.\ 1)$$

As can be seen by Eq. 1, wet milling niobium metal in the presence of water can result in forming a niobium oxide layer, such as a niobium pentoxide layer on the niobium metal. In more detail, the method of preparing the niobium powder of the present invention involves the use of an aqueous solution along with niobium feedstock to form the milled niobium powder of the present invention.

Preferably, the niobium powder of the present invention preferably has an oxygen content of at least about 1,000 ppm, more preferably, at least about 5,000 ppm, even more preferably, at least about 15,000 ppm, even more preferably, at least about 22,000 ppm, and most preferably, at least about 28,000 ppm. Higher oxygen contents are possible, especially using at least 3 wet millings, such as from about 28,000 ppm to about 70,000 ppm or more. In one embodiment, the surface passivated niobium can be used for formation of niobium sub-oxides, like $NbO_{0.17}$ to $NbO_{0.55}$ upon heat treatment as described later. This is optional. The oxygen content of the surface-passivated niobium powder can be related to the BET surface area of the surface-passivated niobium powder or particles. Preferably, a greater BET surface area is characterized by a greater oxygen content of the surface-passivated niobium powder preferably corresponding to a surface-passivation of the niobium powder. Specific levels of oxygen content can be achieved by increasing surface passivation or decreasing the oxygen content by conventional de-ox processes.

In preparing the niobium feedstock, in one embodiment, a niobium ingot can be subjected to a hydriding process in order to embrittle the niobium metal for purposes of crushing the ingot into feedstock in the form of powder, which is preferably then subjected to a screen in order to obtain a uniform particle distribution, which can be from about 5 to about 425 microns in size. If desired, the niobium powder can be subjected to the crusher two or more times in order to achieve the desired particle size and uniform particle distribution. At this point, the hydrided niobium can be maintained as hydrided niobium or can be converted to any other form of niobium, such as non-hydrided niobium, nitrided niobium, and the like.

The niobium feedstock used in the present invention can be in any shape or size. Preferably, the niobium feedstock is in the form of a powder or a plurality of particles. Examples of the type of powder that can be used include, but are not limited to, flaked, angular, nodular, spherical, and mixtures or variations thereof. Preferably, the niobium feedstock is in a powder form that more effectively leads to the passivation of the surface of the niobium powder. Examples of such preferred niobium feedstock include niobium powders having mesh sizes of from about 60/100 to about 100/325 mesh and from about 60/100 to about 200/325 mesh. Another range of size is from −40 mesh to about +325 mesh, or a size of −325 mesh.

Preferably, the niobium feedstock used in the present invention is high purity niobium metal to minimize the introduction of other impurities during the milling process. Accordingly, the niobium metal in the niobium feedstock preferably has a purity of at least about 98% and more preferably at least about 99%. Further, it is preferred that impurities are not present or are present in negligible amounts in the niobium feedstock, e.g., below about 500 ppm and preferably, below 100 ppm, excluding gases.

In one milling technique, the niobium metal can be milled wherein all of the surfaces that come in contact with the niobium metal are niobium, an alloy thereof, an oxide thereof, a nitride thereof, doped niobium (e.g., dopants such as nitrogen, oxygen, sulfur, phosphorus, boron, yttrium, and the like), or a substance coated with any of these. In this process, the milling of the niobium metal to form the niobium powder preferably occurs in a mill wherein all of the surfaces that come in contact with the niobium metal are niobium. In other words, preferably all of the contact surfaces of the mill, arms, and grinding media used in the mill have a niobium surface. The niobium surface on the contact areas of the mill and grinding media can be accomplished by coating the grinding media and internal surfaces of the mill with niobium metal or plates of niobium metal can be placed (e.g., welded) in the mill. The grinding media, such as balls, can be coated with niobium or can be made entirely of niobium. By having all contact surfaces of the mill and grinding media made of niobium, the amount of contamination to the niobium metal is significantly reduced, and preferably reduced to such a level that acid leaching is not necessary and is preferably avoided. This is especially advantageous since acid leaching can be inconsistent and lead to varying levels of contamination from production lot to production lot.

Preferably, the amount of niobium present on the contact surfaces of the mill and grinding media is of a sufficient level such that during the milling process, none of the non-niobium underlying surfaces come in contact with the niobium metal. Preferably, the thickness (e.g., about 1 mm or less to about 100 mm or more) of the niobium coating on the contact surfaces of the mill and grinding media is sufficient such that repeated milling can occur from production lot to production lot. Preferably, the milling of the niobium metal occurs in a wet mill, which leads to a more uniform particle distribution size of the niobium powder. In wet milling, the liquid used can be aqueous, such as water, alcohol, and the like. Preferably, the liquid used is water. Preferably, the milling is sufficient to reduce the niobium metal particle size to a range of from about 0.5 micron or less to about 10 microns, and more preferably, from about 0.5 micron or less to about 5 microns. In the alternative, dry milling (e.g., jet milling) can be used in one or more or all of the milling steps.

In an embodiment of the present invention, the staged milling of the niobium metal achieves desired particle distribution sizes. For instance, the particle distribution sizes preferably of the first milled niobium powder are such that the mean particle size or $D_{50}$ of the first milled niobium powder is from about 3 to about 4 microns. Preferably, the size distribution of the first milled niobium powder has both a $D_{10}$ value of less than about 2 microns, and preferably from about 1.5 microns to about 1.9 microns and a $D_{90}$ value of less than about 10 microns, and preferably from about 5 microns to about 8 microns. In addition, the particle distribution sizes preferably of the twice milled niobium powder are such that the mean particle size or $D_{50}$ of the niobium powder is from about 0.5 micron or less to about 3 microns, and more preferably from about 2 microns to about 1 micron or less. The $D_{10}$ value is less than about 2 microns, and preferably from about 0.1 micron or less to about 1.3 microns, and the $D_{90}$ value is less than about 4 microns, and preferably from about 1.8 microns or less to about 3.8 microns. Furthermore, the particle distribution sizes preferably of the three times milled niobium powder is such that the mean particle size or $D_{50}$ of the niobium powder is from about 0.5 micron or less to about 1.5 microns, and more preferably from about 0.75 micron to about 0.9 micron or about 1 micron. The $D_{10}$ value is less than about 1 micron and preferably from about 0.1 micron or less to about 0.75 micron, and the $D_{90}$ value is less than about 3 microns, and preferably from about 1 micron or less to about 2 microns.

The oxygen reduced niobium oxide or niobium suboxide can have any morphology, and preferably has an interconnected or cellular morphology. The niobium suboxide can be in any shape or size. Preferably, the niobium suboxide is in the form of a powder or a plurality of particles. Examples of possible types of powder include, but are not limited to, flaked, angular, nodular, spherical, and mixtures or variations thereof. Examples of preferred niobium suboxide powders include those having mesh sizes of from about 60/100 to about 100/325 mesh and from about 60/100 to about 200/325 mesh. Another range of size is from −40 mesh to about +325 mesh, or a size of −325 mesh. Preferably, the niobium suboxide powders have a $D_{50}$ of from about 0.25 to about 5 microns, and a BET surface area of from about 1 to about 8 $m^2/g$. The niobium suboxide preferably has a particle size distribution range in which the $D_{10}$, $D_{90}$, or both is within about 300% of the $D_{50}$. The niobium suboxide preferably has an apparent density of from about 0.5 to about 2.5 g/cc. The niobium suboxide preferably has a porous microstructure having pores of from about 0.01 to about 100 micrometers. The niobium suboxide preferably has a pore volume of from about 10 to about 90%. The niobium suboxide can have a monomodal or a multimodal pore size distribution, and more preferably a bimodal pore size distribution. Measurements relating to the porosity of the niobium suboxide can be made as described above. The niobium suboxide preferably has excellent flow properties such as from about 100 mg/s to about 2000 mg/s or more, and more preferably at least about 200 mg/s as measured by the methods described above. The niobium suboxide can contain a range of modifying agents or additives or dopants, including, but not limited to, nitrogen, silicon, phosphorous, boron, carbon, sulfur, yttrium, or combinations thereof. The niobium suboxide can be nitrided and/or contain a nitride layer. Preferably, the niobium suboxide is capable of a capacitance of at least 10,000 CV/g, when formed into a capacitor anode.

In an embodiment of the present invention, the staged milling of the niobium metal preferably achieves desired particle BET surface areas. The primary particles can be about 1 micron or less, such as 0.5 micron. The niobium powder of the present invention can have a high specific surface area. Further, the niobium powder of the present invention can be characterized as having a preferred BET surface area. For instance, the BET surface areas preferably of the first milled niobium powder are from about 1 to about 2 $m^2/g$. In addition, the particle BET surface areas preferably of the twice milled niobium powder are from about 2 to about 8 $m^2/g$, and more preferably from about 3 to about 4.5 $m^2/g$ or more. Higher BET surface areas above 5 $m^2/g$, and above 8 $m^2/g$ are obtainable with 2 or more milling stages as described herein.

In an embodiment of the present invention, the first milling of the niobium feedstock, the second milling of the first milled niobium powder, and/or any subsequent milling step comprise ball milling. The first milling, the second milling, and/or any subsequent milling step occurs in an Attritor mill such as a 1 S mill which is operated, for example, at about 350 rpm or higher. Other operating rpms can be used. Other mill sizes can be used. When the milling is completed, the mixture can optionally then be subjected to the heat treatment as described in U.S. Pat. Nos. 6,416,730; 6,391,275; and 6,322,912, all incorporated in their entirety by reference herein.

The milling of the niobium metal can be achieved sequentially by milling with varying ball diameters. For instance, the first milling can use 3/16" dia. media (e.g., Nb spherical media), the second milling can use 1/16" dia. media (e.g., Nb spherical media), the third milling can use 1/32" dia. media (e.g., Nb spherical media), and so on. The use of staged milling dramatically reduces the time required to obtain a desired particle size and size distribution. The milling of the niobium metal can occur in stages in different mills or in the same mill. In the preferred embodiment, faster milling is achieved early in the process by using a large ball diameter to product diameter ratio. When the milled product population increases, the ball diameter can be reduced in order to increase the ratio of balls to product, and thereby increasing the chances of the product being hit and shattered. Preferably, the size of the niobium metal can be as large as 1/10 of the size of the ball diameter. This niobium metal-to-ball ratio can be used until the niobium metal-to-ball ratio size is from about 1/1000 to about 1/500, more preferably, until the niobium metal-to-ball ratio is about 1/200. The ball diameter can then be changed so that the ratio of niobium metal-to-ball diameter is about 1/10. This process can be continued until the original feedstock reaches a size of from about 5 microns to about 1 micron, and can further be used to make submicron particles. The milling balls tend to reduce the larger niobium particles faster than the smaller milling balls. Therefore, rather than using very small ball diameter milling balls for the second milling step, which would take more time and create a broad distribution, a ball diameter is sequentially selected that takes advantage of being relatively massive while still being numerous, and yet follow the 1/10 ratio of niobium metal-to-ball diameter. As an example, and in more detail, the first stage milling can use the largest diameter niobium milling media in this process, such as a 3/16" diameter niobium spherical media. The niobium or hydrided niobium feedstock is milled such as in a attritor mill, preferably in the presence of a liquid such as water. The typical milling time for this first stage of milling is from about 30 minutes to about 6 hours and more preferably about 3 hours. At the end of this first stage of milling, the average particle size is preferably from about 3 to about 4 microns. The surface area as measured by BET is approximately from about 1 to about 2 $m^2/g$. Then, in a second stage milling, the material from the first stage milling is placed in a mill such as an attritor mill using 1/16" diameter niobium spherical media. Milling is preformed, for instance, from about 30 minutes to about 24 hours or more and more preferably from about 6 hours to about 20 hours to produce niobium or hydrided niobium particles having an average particle diameter of from about 0.5 to about 3 microns and more preferably from about 1 to about 2 microns with a surface area as measured by BET of from about 2 to about 8 $m^2/g$ and more preferably from about 2.5 to about 4 $m^2/g$. Then, in a third stage milling, 1/32" niobium media can be used to mill the material resulting from the second stage milling. This milling step can be preformed, for instance from about 30 minutes to about 24 hours or more and more preferably about 20 hours to produce very fine niobium or hydrided niobium particles having an average particle size of from about 0.1 to about 1 micron and more preferably about 0.5 to 1 micron with a BET surface area of from about 4 to about 10 $m^2/g$ and more preferably from about 5 to about 7 $m^2/g$. When three stages or more than three stages of milling are used, the milling time can be dramatically reduced to achieve the same given particle size and surface area. For instance, to mill a powder with a surface area of 5.5 $m^2/g$, a powder resulting from a two stage milling identified as a "fine" particle in Table 9 can be milled to the desired BET surface area in about 29 hours of total milling time or when using a feed which is identified as a "superfine" powder in Table 9 (and thus milled longer) would take approximately 43 hours in total milling time.

In the staged milling embodiment of the present invention, two or more stages of milling using progressively smaller diameters are used. In other words, in the first milling of the niobium feedstock, the diameter of the milling media is larger than the diameter of the milling media used in the second milling. Furthermore, if more than two stages are used, preferably each subsequent milling stage uses a milling media that has a diameter smaller than the previous milling stage. More than two milling stages can be used depending upon the desired particle size of the final product. For purposes of the present invention, at least two stages or three stages of milling accomplish the desired result, namely a product having a particle size of from about 0.5 micron to about 5 microns. Submicron particles can be obtained by use of this technique.

Using staged milling, the overall milling time can be reduced by at least 10%, and more preferably, can be reduced by at least 15%, and even more preferably, by at least 50%, compared to milling having only one stage of milling using the same milling media.

In the preferred embodiment, in each subsequent milling stage, the ball diameter is smaller than the ball diameter of the previous milling stage. The above process permits a more uniform milling of the niobium metal, since smaller diameter balls permit a more uniform milling. The advantage of using this preferred method of the present invention is that the method can reduce the overall milling time to achieve the preferred sizes of the niobium, e.g., from about 1 micron or less to about 5 microns. Reduced milling time lowers production costs and the amount of exposure of the niobium metal to contaminants. Moreover, to further reduce contamination, each mill and its grinding ball can be made of niobium metal or lined with niobium metal.

Any temperature can be used for the milling, such as 0° C. to 100° C. or higher. For purposes of the present invention, any of the milling steps described in the present application can be conducted under heat, such as described in U.S. Pat. No. 6,402,066 B1, incorporated in its entirety by reference herein. Also, other additives can be added during any milling step, such as a binder, lubricant, surfactant, dispersant, solvent, and the like.

In another embodiment of the present invention, prior to subjecting the starting materials to heat treatment in order to form the desired capacitor grade niobium powder, the milled niobium powder can be granulated or agglomerated. The granulation can occur by a number of techniques. For instance, wet screening or drum agglomeration of wet material can be used. Other examples of agglomeration techniques include a tilted dish agglomeration that involves a rotating pan set on an angle to which fresh powder is added and on which a fine water spray, optionally with binders, is used. The agglomerate builds up as a spherical mass and eventually rolls off the pan into a collector. Another example is dry drum agglomeration that involves adding the niobium powder to a large drum which turns fairly rapidly and has lifters. The showering particles are brought in contact with pellets and lightly hammered together. Another example is compactors which are devices that press the powder plus recycle between two rolls and makes slabs which are then milled to give feed to a screen set. Another example is a pin pelletizer.

As indicated above, the granulation can occur in a dried state or wet state. The liquid used can be water, water-based liquids, alcohols, organic liquids, and the like. With respect to screening, the granulation can occur by passing the powder over a screen, such as 20 mesh with openings larger than the desired granule size (for instance, less than 40 mesh). The majority of granules have sizes smaller than the openings and a few fines (for instance, less than 50 microns). This method works especially well for powders with high surface area (for example, greater than $1.5 \, m^2/g$). The granulation can also be achieved by agitating the niobium in water, such as by vibrating, blending and the like. Another method imparts the tumbling motion of moist particles to form spherical shaped granules. The water content in the powder, primary particle size, the rotation speed, and the size of media and tumbling time can be used to control the final granule size. Typical water contents are less than 50% by weight of the total ingredients and more preferably less than 30% by weight and residence times are preferably less than an hour to form granules greater than 50 microns in size (average). Screening operations to classify the materials may also be used to remove excessively large or small granules from the final product. The large and fine granules may be recycled and again used as feed material. As indicated above, the water content can be any amount such as amounts from about 5% to about 40% by weight of the total materials used in agglomeration and more preferably from about 10% to about 30% by weight. Tumbling speed during granulation when a tumbling motion is used can be any rotational speed depending upon the size of the tumbler. For a small lab tumbler, for instance, rotational speeds can be from about 30 to about 60 rpm and more preferably from about 40 to about 50 rpm. The amount of material granulated can be any amount and of course depends upon the size of the device being used to form granulation. Preferably, a media (e.g., 1/16"-1/2") can be also used during granulation such as media balls made from the same metal that forms the niobium powder. The media can be present in any amount, such as from about 1 to about 20% or from about 5 to 10% by volume. If wet granulating is used, the liquid can be added at any rate, such as a slow continuous rate or as a spray until the desired granule size is achieved. After granulation, if a liquid is used, the powder can then be dried using any drying technique such as drying under a vacuum oven or a convection oven at relatively lower temperatures. For instance, the drying can occur at temperatures of from about 85 to about 100° C. for about 15 to about 60 minutes or more. The granules can then be classified by screening the granules. The screening operation can be preformed either before or after the drying step. While any size can be achieved by this screening, examples include −40 mesh (−425 microns) or −50 mesh (−300 microns). The screening allows the removal of coarse and fine granules based on desired particle distribution.

The granulation methods of the present invention preferably form granules that have excellent flow properties such as from about 100 to about 1000 mg/s, and more preferably from about 280 to about 320 mg/s as measured by ASTM B 213 using a 3 mm diameter orifice. In one embodiment of the present invention, the present invention relates to a niobium powder in granule form. The granules preferably have a size of from about 30 to about 1,000 microns. The niobium powder of the present invention can have a microporous surface and can have a sponge-like structure. The niobium powder of the present invention can also have a porous structure with approximately 50% porosity. The granules have an oxygen content of from about 5,000 to about 15,000 ppm and a mean particle size of from about 3 to about 4 microns when said granules have a BET surface area of from about 1 to about 2 $m^2/g$, an oxygen content of from about 15,000 to about 22,000 ppm and a mean particle size of from about 2 to about 3 microns when said granules have a BET surface area of from about 2 to about 3 $m^2/g$, an oxygen content of from about 22,000 to about 28,000 ppm and a mean particle size of from about 1 to about 2 microns when said granules have a BET surface area of from about 3 to about 4.5 $m^2/g$, and an oxygen content of at least about 28,000 ppm and a mean particle size of less than about 1 micron when said granules have a BET surface area of at least about 4.5 $m^2/g$.

The granulated products of the present invention preferably provide excellent physical properties with respect to bulk density, flowability, green strength, and pressability of the powders. Preferably, the pressed and sintered granules of the present invention have a bimodal or multi-modal pore size distribution, such as from about 0.1 to about 10 microns. Preferably, the pressed granules of the present invention have a diametric shrinkage during sintering of from about 1 to about 12%. Preferably, the granules of the present invention have a combined amount of Fe/Ni/Cr of less than about 100 ppm, more preferably less than 50 ppm, and even more preferably, less than 30 ppm, such as from about 5 ppm to about 50 ppm, or from about 5 ppm to about 25 ppm. Preferably, the granules of the present invention have a pressability of from about 2.4 to about 3.5 g/cc, wherein pressability includes maintaining the integrity of the pressed compact for handling purposes. With the granulation techniques of the present invention, one can maintain the desired microstructure and electrical properties of the fine powders while retaining the physical properties during the forming process.

The niobium powder, e.g., after milling or after granulation, can optionally be subjected to one or more heat treatments, such as an inert gas or vacuum heat treatment, at the same or different temperatures, if more than one is used. The temperature and the time of the heat treatment can depend on a variety of factors. The heat treatment can be at any temperature which is below the melting point of the niobium powder. Generally, the heat treatment of the niobium powder is at a temperature of from about 500° C. or less to about 1900° C., and other temperatures can be from about 800° C. to about 950° C., such as about 850° C., for a time of from about 5 to about 100 minutes, and more preferably from about 30 to about 60 minutes. Furthermore, during the heat treatment process, a constant heat treatment temperature can be used during the entire heat-treating process or variations in the temperature or the temperature steps can be used. Variations of these steps can be used to suit any preferences of the industry. Routine testing in view of the present application will permit one skilled in the art to readily control the times and the temperatures of the heat treatment in order to obtain the desired properties of the niobium powder. If more than one heat treatment is used, the same furnace can be used and can be achieved in one run, and cooling can be avoided. For instance, heat treatment can occur at 700° C. for two hours and go directly to 1,000° C. or go directly to 500° C. for two hours. Also, $N_2$ can be used to effect control of the $N_2$ level of the niobium powder.

Once the heat treatment is complete and the desired niobium powder is obtained, the powder can then be pressed into an anode using conventional methods of forming anodes from valve metals. In the present invention, the niobium powder has significantly improved flow properties as well as crush strength and further has low impurities which all lead to beneficial capacitor anode properties, such as an extremely low leakage.

The starting niobium oxide can be at least one oxide of niobium metal and/or alloys thereof. A specific example of a starting niobium oxide is $Nb_2O_5$. The starting niobium oxide used in the present invention can be in any shape or size. Preferably, the niobium oxide is in the form of a powder or a plurality of particles. For purposes of the present invention, examples of starting valve metal oxides and/or oxygen reduced valve metal particles can be, but are not limited to, at least one oxide of the metals in Groups IV, V, and VI (IUPAC designations) of the Periodic Table of the Elements, aluminum, bismuth, antimony, and alloys thereof and combinations thereof. Preferably, the starting valve metal oxide is an oxide of tantalum, aluminum, titanium, zirconium, niobium, and/or alloys thereof, and most preferably is a niobium oxide, or alloys thereof. Generally, the alloys of the valve metal oxides will have the valve metal as the predominant metal present in the alloy oxide. Specific examples of starting valve metal oxides, include, but are not limited to $Nb_2O_5$, $Ta_2O_5$, and $Al_2O_3$. Further, the starting valve metal oxide can be a valve metal suboxide, such as TaO or NbO. The starting valve metal oxide can also be a valve metal oxide which is a semi-conductor as a lower oxide and which converts to a higher oxide with high insulating properties and has useful dielectric properties. Mixtures or combinations of oxides can be used. Examples of the type of powder that can be used include, but are not limited to, flaked, angular, nodular, spherical, and mixtures or variations thereof. Preferably, the starting niobium oxide is in the form of a powder that more effectively leads to the oxygen reduced niobium oxide. Examples of such preferred starting niobium oxide powders include those having mesh sizes of from about 60/100 to about 100/325 mesh and from about 60/100 to about 200/325 mesh. Another range of size is from −40 mesh to about +325 mesh, or a size of −325 mesh. Preferably, the starting niobium oxide powders have a primary particle size ($D_{50}$) of from about 0.1 to about 5 microns, and a BET surface area of from about 1 to about 15 $m^2/g$.

The starting valve metal oxide, the agglomerated particles, and the final product (i.e., valve metal oxide particles) of the present invention can be in any shape or size. The starting valve metal oxide, the agglomerated particles, and/or the final product (collectively, "the powders") can be, for example, in the form of a powder or a plurality of particles. Examples of the type of powder that can be used or formed include, but are not limited to, flaked, angular, spherical, fibrous, nodular, and mixtures or variations thereof. Examples of such preferred valve metal oxide powders include those having mesh sizes of from about 60/100 to about 100/325 and from about 60/100 to about 200/325 mesh. Another range of size is from about −40 mesh to about −325 mesh. Preferably, the powders have a primary particle size ($D_{50}$) of from about 0.25 to about 5 microns, and/or a BET surface area of from about 1 to about 8 $m^2/g$. The powders preferably include an apparent density of from about 0.2 to about 1.5 g/cc. The powders preferably include a porous microstructure (due to pore size, the number of pores, and/or total pore value) having pores of from about 0.1 to about 100 micrometers. The powders preferably include a pore volume of from about 10 to about 90%. The powders can include a monomodal or a multimodal pore size distribution, and more preferably, a bimodal pore size distribution. Measurements relating to the porosity of the valve metal oxide can be made, for example, as described in U.S. Pat. Nos. 6,576,038 B1, and 6,479,012 B1, and Published U.S. patent application Ser. Nos. 2003/0115985, and 2002/0033072, each of which is incorporated in its entirety herein by reference. The powders preferably include excellent flow properties, such as from about 100 to about 500 mg/s or more, and more preferably, at least about 200 mg/s as measured by ASTM B 213 using a 3 mm diameter orifice. The powders can contain a range of modifying agents or additives or dopants, including nitrogen, silicon, phosphorous, boron, carbon, sulfur, yttrium, or combinations thereof. The powders can be nitrided and/or contain a nitride layer. Preferably, the powders are capable of a capacitance of at least 40,000 CV/g, when formed into a capacitor anode. Furthermore, with respect to the numerous beneficial properties described above, such as the $D_{50}$, BET surface area, flow properties, oxygen contents, electrical properties, and the like, it is important to appreciate that for purposes of the present invention, the powders can have at least one of these characteristics, or two or more of these characteristics, or all of these characteristics. Any combination of properties and characteristics is possible.

The starting niobium oxides can be prepared by calcining at 1000° C. until removal of any volatile components. The oxides can be sized by screening. Preheat treatment of the niobium oxides can be used to create controlled porosity in the oxide particles. Preheat treatment can be at temperatures from about 600 to about 1400° C.

The niobium powder acts as a getter material for purposes of the present invention and is capable of reducing the specific starting niobium oxide to the oxygen reduced niobium oxide. Preferably, the niobium powder becomes part of the final product of the present invention, namely the oxygen reduced niobium oxide(s). The niobium powder for purposes of the present invention is any niobium powder that can remove or reduce at least partially the oxygen in the niobium oxide. Thus, the niobium powder can be an alloy or a material containing mixtures of niobium metal with other ingredients. Preferably, the niobium powder is predominantly, if not exclusively, niobium metal. The purity of the niobium metal is not important but it is preferred that high purity niobium metal comprise the niobium powder to, among other reasons, avoid the introduction of other impurities during the heat treating and reacting processes. Accordingly, the niobium metal in the niobium powder preferably has a purity of at least about 98% and more preferably at least about 99%.

The niobium can be in any shape or size. For instance, the niobium can be in the form of a tray that contains the starting niobium oxide to be reduced or can be in a particle or powder size. Preferably, the niobium is in the form of a powder in order to have the most efficient surface area for reducing the niobium oxide. The niobium powder, thus, can be flaked, angular, nodular, spherical and mixtures or variations thereof. Preferably, the niobium powder has a primary particle size ($D_{50}$) of from about 0.5 to about 5 microns, and a BET surface area of from about 1 to about 15 $m^2/g$.

In general, the materials, processes, and various operating parameters as described in U.S. Pat. Nos. 6,416,730; 6,391,275; and 6,322,912; U.S. patent application Ser. No. 09/533,430 filed Mar. 23, 2000; and U.S. Provisional Patent Application Nos. 60/100,629 filed Sep. 16, 1998; 60/229,668 filed Sep. 1, 2000; and 60/246,042 filed Nov. 6, 2000 can be used in the present invention and all of these applications are incorporated herein by reference in their entirety.

The oxygen reduced niobium oxide is any niobium oxide which has a lower oxygen content in the metal oxide compared to the starting niobium oxide. Typical reduced niobium oxides comprise NbO, $NbO_{0.7}$, $NbO_{1.1}$, $NbO_2$, and any combination thereof with or without other oxides present. Generally, the reduced niobium oxide of the present invention has an atomic ratio of niobium to oxygen of about 1: less than 2.5, and preferably 1:2 or less, or 1: less than 1.5, and more preferably 1:1.1, 1:1, or 1:0.7. Put another way, the reduced niobium oxide preferably has the formula $Nb_xO_y$, wherein Nb is niobium, x is 2 or less, and y is less than 2.5x. More preferably x is 1 and y is less than 2, such as 1.1, 1.0, 0.7, and the like. Preferably, the niobium sub-oxide of the present invention is an NbO or oxygen depleted NbO or an aggregate or agglomerate which contains NbO and niobium metal or niobium metal with a rich oxygen content. Unlike NbO, $NbO_2$ is less desirable due to its resistive nature, whereas NbO is very conductive. Accordingly, capacitor anodes which are formed from NbO or oxygen depleted NbO or mixture of NbO with niobium metal are desirable and preferred for purposes of the present invention.

In making the oxygen reduced niobium oxides of the present invention, and preferably NbO or variations thereof, hydrogen gas (or other carrier gases) is preferably used as the carrier wherein oxygen is transferred from the starting niobium oxide, e.g., $Nb_2O_5$, to Nb with the use of the $H_2$ gas as the carrier. The preferred reaction scheme is as follows:

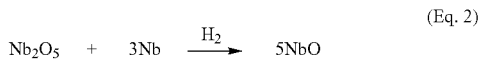

(Eq. 2)

As can be seen from Eq. 2, using a niobium metal as the getter material, the getter material along with the starting niobium oxide can all result into the final product of the present invention which is preferably NbO. In more detail, there are typically at least two processes involved in preparing the niobium sub-oxides of the present invention. One process involves the preparation of the getter material, i.e., niobium powder, and the other part of the process involves the use of the niobium powder along with the starting niobium oxide to form the niobium sub-oxide of the present invention.

In preparing the niobium powder, a niobium ingot can be subjected to a hydriding process in order to harden the niobium metal for purposes of crushing the ingot into powder which is subsequently subjected to a screen in order to obtain a uniform particle distribution which is preferably from about 5 to about 425 microns in size. If needed, the powder can be subjected two or more times to the crusher in order to achieve the desired uniform particle distribution. Afterwards, the powder can then be subjected to milling in order to preferably obtain a particle size that is from about 0.5 to about 5 microns in size. In this process, the milling of the niobium metal (or hydrided niobium metal) in order to form the niobium getter powder (or hydrided niobium powder) preferably occurs in a mill wherein all of the surfaces that come in contact with the niobium (or hydrided niobium) getter material are niobium. In other words, preferably all of the contact surfaces of the mill, arms, and grinding media used in the mill have a niobium surface. The niobium surface on the contact areas of the mill and grinding media can be accomplished by coating the grinding media and internal surfaces of the mill with niobium metal or plates of niobium metal can be placed (e.g., welded) in the mill. The grinding media, such as balls can be coated with niobium or can be completely made of niobium. By having all contact surfaces of the mill and grinding media made of niobium, the amount of contamination to the niobium getter material is significantly reduced and preferably reduced to such a level that acid leaching is not necessary and is preferably avoided. This is especially advantageous since acid leaching can be inconsistent and lead to varying levels of contamination from production lot to production lot. Preferably, the amount of niobium present on the contact surfaces of the mill and grinding media is of a sufficient level such that during the milling process, none of the non-niobium underlying surfaces come in contact with the niobium getter material. Preferably, the thickness of the niobium on the contact surfaces of the mill and grinding media is sufficient such that repeated milling can occur from lot to lot.

Preferably, the milling of the niobium getter powder occurs in a wet mill that leads to a more uniform particle distribution size of the getter material. In wet milling, the liquid used can be aqueous or non-aqueous, such as water, alcohol, and the like. Preferably, the milling is sufficient to reduce the size to a range of from about 0.5 to about 10 microns, and more preferably, from about 1 micron to about 5 microns.

Similarly, in the present invention, the starting niobium oxide can be subjected to milling, e.g., wet milling, in order to achieve a more uniform particle distribution (e.g., to the size ranges as described for the getter powder). Typically, the milling time required to achieve a similar particle distribution size of the starting niobium oxide as compared to the niobium getter powder requires less time. Preferably, the milling, and more preferably the wet milling of the starting niobium oxide occurs in a similar milling set-up used with respect to the niobium getter powder. In other words, preferably, the contact surfaces of the mill, arms, and grinding media are preferably niobium metal to again avoid contamination of the starting niobium oxide. Preferably, the milling is sufficient to reduce the size of the starting niobium oxide to a size substantially similar to the niobium getter powder. In one sense, the starting niobium oxide is de-agglomerated by the milling.

In a preferred embodiment of the present invention, the milling and preferably wet milling of the niobium getter powder and the starting niobium oxide are milled to the extent that the two components have similar particle distribution sizes. The advantage of having similar particle distribution sizes leads to an improved reacting rate or rate of forming the oxygen reduced starting niobium oxide. In other words, when the sizes of the two components are similar, the niobium getter powder more uniformly accepts oxygen atoms from the starting niobium oxide and similarly, the starting niobium oxide more readily is reduced. Thus, the final product, which is the oxygen reduced niobium oxide, is more uniform and includes as part of the final product, the niobium getter powder that has been converted as well as the oxygen reduced starting niobium oxides. The reaction rate is also increased due to the shorter distance for the oxygen to defuse out of the starting niobium oxide and to defuse into the niobium getter powder. This shorter distance also minimizes oxygen gradients within the final product resulting in a more stable product. By improving the reaction kinetics, the processing temperature for the reaction may be decreased to a temperature that is more favorable for the formation of preferred oxygen reduced niobium oxides, such as NbO.

The wet milling of the niobium powder and the starting niobium oxide can occur together. In more detail, the wet milling of the niobium powder and the starting niobium oxide can occur simultaneously wherein both materials are introduced in a mill, as described above, and uniformly mixed together in the mill for purposes of achieving a uniform powder mixture as well as uniform particle size. As an option, the niobium powder can be introduced first and milled alone for a certain time, such as a particular targeted size of, for instance, from about 1 to about 10 microns, and then the starting niobium oxide can be introduced into the same mill and the milling is continued with both components present until a targeted primary particle size of both particles is obtained which is preferably from about 0.1 to about 10 microns, and more preferably, from about 0.25 to about 5 microns. Alternatively, the niobium powder and starting niobium oxide can be co-milled together from start to finish. In a preferred embodiment, the milling occurs in an Attritor mill such as a 1 S, 5 S, or 30 S mill that is operated at about 100 to 300 rpm or more, depending on the size of the mill. When the milling is completed, the powder mixture can then be subjected to granulation and/or heat treatment. One advantage of the co-milling process is that the particle coordination is controlled in each phase, namely the starting niobium oxide phase and the niobium metal or hydrided niobium metal phase. During the co-milling step, the two phases are preferably aggressively milled, such as attritor milled in water or any suitable liquid (aqueous or non-aqueous) to preferably break down any existing hard aggregates that have formed in the starting niobium oxide or niobium metal phase and to break each of these phases, preferably into their respective primary particles. By causing this size reduction, an intimate mixture of the primary particles is achieved between each phase. By combining the two phases on the primary particle size scale, the niobium metal (or hydrided niobium) can form a rigid network that constrains the sintering between the starting niobium oxide particles. Put another way, in a preferred embodiment, the particle coordination (e.g., the niobium metal or hydrided niobium metal particles are surrounded by the starting niobium oxide particles and vice versa) will retain a finer microstructure at comparable heat treatment temperatures. This permits higher capacitance capability values to be obtained while maintaining other desirable electrical and physical characteristics.

The milling of the niobium getter powder, the starting niobium oxide, and/or the final product can occur sequentially by milling with varying ball diameters. In other words, the milling of the niobium powder, for instance, can occur in stages in different mills or in the same mill, but in each instance using ball diameters that have a lower ball diameter with each successive milling step. This permits a more uniform milling of the component(s) since smaller diameter balls permits a more uniform milling. This staged milling can be applied to any of the milling of the components used in the present invention and results in reducing the overall milling time to achieve the target size. With the reduction in milling time, the length of time that the material is exposed to possible contamination is also reduced. Also, the overall cost of production is also reduced. An example of a suitable ratio for wet milling is 800 grams of powder to 300 ml of water. The remaining volume in the mill is taken up by milling media. In any of the milling, dry milling can be used in lieu of wet milling, and an inert atmosphere can be used.

The heat treating of the starting valve metal oxide and/or the oxygen reduced valve metal oxide can be achieved in any treatment device or furnace commonly used in the heat treatment of metals, such as niobium and tantalum. For instance, heat treating can be conducted in any reaction system or reactor such as a retort, vacuum chamber, vacuum furnace, or a vacuum kiln, as described, for example, in U.S. Pat. Nos. 6,380,517 B2; 6,271,501 B1; and 6,105,272, each of which is incorporated in its entirety herein by reference. The heat treatment of the starting valve metal oxide is preferably at a temperature and for a time sufficient to form the agglomerated particles and further promote a porous matrix that exists with the agglomerated particles. The heat treatment can occur at any temperature such as temperatures sufficient to agglomerate the particles together but not melt the particles. Heat treating can be any thermal cycle, and can include, but is not limited to, calcining, sintering, annealing, or any combination thereof. Heat treating can be used to create controlled porosity in the heat-treated powder.

According to one embodiment, heat treating is preferably at a temperature that is at least about 80% of a melting point temperature of the starting valve metal oxide. Preferably, the heat treating is at a temperature of from about 80 to 99% of a melting point temperature of the valve metal oxide. For example, for NbO and $Nb_2O_5$, which have melting points of about 1,810° C. and about 1,510° C., respectively, the heat treating can preferably be at a temperature of from about 1,200 to about 1,800° C. The heat treating is preferably at a temperature that is sufficient to cause coarsening of the agglomerated particles. Also, heat treating preferably occurs at a temperature that is sufficient to cause a pore size distribution of the agglomerated particles to be at least 10% greater than a pore size distribution of the starting valve metal oxide. The heat treating can be at a temperature that causes densification or shrinkage of the powder particles and that causes a reduction in the BET surface area of the powder particles. Preferably, the heat treating achieves controlled shrinkage of the BET surface area of the powder.

Heat treating preferably occurs under vacuum or inert conditions. For example, heat treating preferably occurs in an atmosphere of from about $1 \times 10^{-5}$ to about 1,000 torr. Inert gas(es) can be present or absent from the atmosphere in which the heat treating occurs. For example, the atmosphere can be a hydrogen atmosphere. The heat treatment temperature and heat treatment time can be dependent on a variety of factors such as the type of starting valve metal oxide. During heat treatment, a constant temperature can be used during the entire heat treating process or variations in temperature or temperature steps can be used. Routine testing in view of the present application will permit one skilled in the art to readily control the duration, atmospheres, and temperatures of the heat treatment to obtain the proper or desired properties in the valve metal oxide particles formed by the present invention. Optionally, multiple heat treating steps can be performed on any of the powders of the present invention.

Heat treating of starting valve metal oxide can be achieved under dry or wet conditions. Under wet conditions, a volatilizable or vaporizable liquid can be combined with or added to the starting valve metal oxide in any conventional manner which includes methods of simply mixing a solid with a liquid. For instance, simple stirring can be used as well as more sophisticated methods of blending and milling, such as with a mixer-muller. Alternatively, the liquid can simply be poured on top of a container containing the metal particles with or without mixing or stirring. The volatilizable or vaporizable liquid can be any liquid which is capable of these properties. Examples include, but are not limited to, water, water-containing liquids, alcohols, non-aqueous liquids, aqueous liquids, aromatic-containing liquids, alkane-containing liquids, and the like. Preferably, the volatilizable or the vaporizable liquid is aqueous in nature and more preferably is water, and most preferably is deionized water. Any element/chemical helpful in controlling the agglomerating kinetics of the powders at high temperatures can be added to the water at the desired proportions. The agglomerated particles can be agglomerated into a cake. Heat treating the starting valve metal oxide to form agglomerated particles can be achieved by any method to agglomerate metal particles, as described, for example, in U.S. Pat. Nos. 6,576,038 B1, and 6,479,012 B2, each of which is incorporated in its entirety herein by reference.

Heat treating of the starting valve metal oxide powder is preferably at a temperature and for a time sufficient to cause thermal agglomeration of the powder to form agglomerated particles. The agglomerated particles can be fused together and/or can exhibit a mass transfer between individual particles of the powder that can be characterized by necking of the particles. Heat treating preferably forms agglomerated particles that upon the agglomerating and optional subsequent processing, forms a final product that has a porous microstructure, a multimodal and preferably a bimodal pore size distribution, and superior crushed strength. The term "bimodal" denotes a distribution with two modes, i.e., the presence of two distinct value ranges that are conspicuously more frequent than neighboring values.

The agglomerated particles can be hard and/or soft agglomerates. Soft agglomerates denote agglomerates that can easily break up upon impact with a harder surface. Furthermore, when a soft agglomerate does break, the powders return rather easily to their primary particle make-up. In addition, when the soft agglomerates are formed, the primary particles can easily be identified by SEM techniques. In other words, there is generally no necking of the primary particles with each other and the primary particle shapes can be maintained even after agglomeration. Also, heat treating the starting valve metal oxide can result in the formation of a hard agglomerate. The primary particles even after being heat treated can essentially maintain their pre-treatment shape and/or exhibit necking of adjacent particles. Essentially, the primary particles can maintain their structural shape and integrity even though they are in contact with each other while achieving the desired cohesiveness. Also, the agglomerated particles can be fused together such that the individual primary particles are indistinguishable. The soft and hard agglomerated particles of the present invention are quite beneficial with respect to creating a favorable pore distribution throughout the agglomerated particles.

According to one embodiment, the agglomerated particles are subjected to deagglomerating to form valve metal oxide particles. The deagglomerating can be sufficient to cause the deagglomeration of the agglomerated particles to their primary particle size or finer, and/or to clusters of primary particles having a particle size that is greater than the particle size of the starting valve metal oxide. Deagglomerating can be achieved by any technique that reduces the size of the agglomerated particles. For example, the agglomerating can be achieved by crushing, jet-milling, attritor milling, ball milling, classification, or any combination thereof. Preferably, deagglomerating includes multi-stage milling. Preferably, deagglomerating does not introduce a substantial amount of contaminants into the powder. Milling can be dry or wet milling, as described, for example, in U.S. patent application Ser. No. 60/471,650 filed on May 19, 2003, which is incorporated in its entirety herein by reference. Milling can include or not include one or more heating cycles. Milling can increase or decrease the BET surface area of the agglomerated particles. Preferably, deagglomerating is sufficient to cause the valve metal oxide particles produced therefrom to have a BET surface area that is at least 10% greater than a BET surface area of the agglomerated particles. Optionally, the agglomerated particles and/or the other powders can be can be subjected to multiple deagglomerating steps, for example, two or more times in multi-stage milling.

According to one embodiment of the present invention, heat treating can occur at or below a temperature of from about 40 to about 78% of a melting point temperature of the starting valve metal oxide. For example, for NbO or niobium pentoxide, a suitable heat treatment temperature can be from about 600 to about 1400° C. Heat treating can otherwise be achieved substantially as described above. The agglomerated particles formed according to this embodiment preferably have a pore size distribution that is at least 1% greater than a pore size distribution of the starting valve metal oxide, as well as a BET surface area that is at least 40% of a BET surface area of the starting valve metal oxide. That is, the agglomerated particles formed according to this embodiment preferably retain the desired porosity without substantial loss of BET surface area such that a deagglomerating step is unnecessary.

According to one embodiment of the present invention, a method to at least partially reduce a valve metal oxide includes subjecting a starting valve metal oxide to a first heat treatment in the presence of a getter material and in an atmosphere which permits the transfer of oxygen atoms from the starting valve metal oxide to the getter material, to form an oxygen reduced valve metal oxide having a first BET surface area, and then subjecting the oxygen reduced valve metal oxide to a second heat treatment under vacuum or inert conditions to form a heat-treated oxygen reduced valve metal oxide having a second BET surface area, wherein the second BET surface area is less than the first BET surface area. According to another embodiment of the present invention, a method of making valve metal oxide particles includes providing an oxygen reduced valve metal oxide, and heat treating the oxygen reduced valve metal oxide under vacuum or inert conditions to form a heat-treated oxygen reduced valve metal oxide having a BET surface area that is less than a BET surface area of the oxygen reduced valve metal oxide. For example, the BET surface area of a heat-treated oxygen reduced valve metal oxide can be less than about 90%, less than about 80%, less than about 70%, or less than about 60% of the BET surface area of the oxygen reduced valve metal oxide. For example, the oxygen reduced valve metal oxide can have a BET surface area of at least about 2 $m^2/g$, and preferably, at least about 3 $m^2/g$, while the heat-treated oxygen reduced valve metal oxide can have a BET surface area of less than about 2 $m^2/g$, and preferably, less than about 1.5 $m^2/g$. In addition, the surface of the heat-treated oxygen reduced valve metal oxide is preferably smoother than the surface of the oxygen reduced valve metal oxide. For example, the surface of the heat-treated oxygen reduced valve metal can have fewer salient points and/or edges, and/or less contour.

Although, in the above-described embodiment, the heat treating reduces the BET surface area of the valve metal oxide particles, preferably one or more physical properties (e.g., flow, porosity, capacitance, crush strength, and the like) of the valve metal oxide particles are substantially maintained. In other words, the present invention relates to a controlled heat treating that allows more control over the morphology of the heat treated particles. For example, the heat-treated oxygen reduced valve metal oxide can have a crush strength of at least about 70%, at least about 80%, and preferably, at least about 90% or more of a crush strength of the oxygen reduced valve metal oxide. As another example, the heat-treated oxygen reduced valve metal oxide can be capable of being formed into a capacitor having a capacitance of at least about 70%, at least about 80%, and preferably, at least about 90% or more of a capacitance of which the oxygen reduced valve metal oxide is capable when formed into a capacitor. As another example, the heat-treated oxygen reduced valve metal oxide can have a porosity of at least about 70%, at least about 80%, and preferably, at least about 90% or more of a porosity of the oxygen reduced valve metal oxide. Similarly, the heat-treated oxygen reduced valve metal oxide has a flow of at least about 70%, at least about 80%, and preferably, at least about 90% or more of a flow of the oxygen reduced valve metal oxide. The heat-treated particles can have one, two, three, or more of the above properties.

In another embodiment of the present invention, a post heat treatment of the metal sub-oxide powder is used. This post heat treatment can be used for any metal sub-oxide powder irrespective of how the metal sub-oxide powder was obtained. The post heat treatment is most beneficial with metal sub-oxide powders prepared in view of the above-described methods of making metal sub-oxide powders. The post heat treatment is most useful with metal sub-oxide powders and can be used with metal sub-oxide powders in loose form, agglomerated form, pressed form, and the like.

In this embodiment, metal sub-oxide powder is subjected to a post heat treatment which will generally reduce the BET surface area of the powder and also reduce the capacitance capability of the metal sub-oxide powder. In a preferred embodiment, the post heat treatment occurs at a temperature of from about 800° C. to about 1300° C. This post heat treatment can last from a few minutes (e.g., about 5 minutes to about 60 minutes) to several hours (e.g., about 1 hour to about 48 hours or more) depending upon the desired amount of post heat treatment. The post heat treatment preferably occurs in vacuum or under inert conditions. The post heat treatment, for instance, can be achieved in a furnace or other heating device. Other temperatures above and below the above described range can be used.

Without wishing to be bound to any theory, the post heat treatment, in certain embodiments, permits one to treat metal sub-oxides that may contain very small blisters or cracks, such as nanoscale cracks, wherein the post heat treatment will serve to reduce or eliminate these nanoscale cracks. The removal of these cracks or at the very least, the use of post heat treatment, permits one to take metal sub-oxide powder and mix it with a binder or lubricant, wherein the anode resulting from pressing this anode/binder mixture together can then be sintered. Upon delubing (or other means of removing the binder), the presence of nanoscale cracks or blisters or some other physical reason prevents the complete or nearly complete removal of the binder from the pressed anode which is detrimental in the formation of the anode as a component in a capacitor. Thus, the post heat treatment serves to preferably reduce or eliminate the blisters or nanoscale cracks or somehow treat the powder to prevent the retention of the binder in significant amounts after delubing. Accordingly, in one embodiment of the present invention, the post heat treatment is at a temperature and is for a time sufficient to reduce or prevent the significant retention of binder in a press anode after delubing.

With the post heat treatment, the BET surface area of the metal sub-oxide powder is generally reduced. In one embodiment, the BET surface area will be reduced by at least 1% and may be reduced by at least 5% or more or may be reduced by 10% or more depending upon the amount of post heat treatment as well as the starting BET surface area of the metal sub-oxide powder. Irrespective of whether the BET is reduced by the post heat treatment, the capacitance capability of the powder is not reduced more than 25%. In other words, if one took a metal sub-oxide powder which did not receive post heat treatment and compared that to the same powder which received the above-described post heat treatment, the capacitance capability is not reduced by more than 25% and preferably is not reduced by more than 10% and even more preferably is not reduced by more than 5%. The capacitance capability is the capacitance that the powder is capable of when formed into a press anode with the following conditions:

Sintered at 1400° C. for 10 minutes. A formation voltage of 30 volts. A DC bias voltage applied of 10 volts. A press density of 2.8 g/cc.

If one formed a press anode with the above conditions and measured the capacitance, this capacitance would be within 25% of an anode formed under the same conditions receiving no post heat treatment.

In one embodiment, the metal sub-oxide powder can have one or more of the following characteristics:
a) BET surface area of powder ("BET"): about 1.4 to about 2.5 m$^2$/g
b) Scott Density of powder ("Scott"): about 19 to about 28 g/in$^3$
c) capacitance @ 10 Vb ("CV/g"): 69,000-83,000 μFV/g
d) CV/g×BET×Scott: $1.12 \times 10^{11}$-$3.55 \times 10^{11}$ CV/(m*g)
e) CV/g×1/BET×Scott: $3.2 \times 10$-$10.1 \times 10^{10}$ (CV*g)/m$^5$
f) CV/g×1/BET×1/Scott: $1.62 \times 10^{-2}$-$5.11 \times 10^{-2}$ (CV*m/g)
g) CV/g×1/BET: 33,000-57,000 CV/m$^2$
h) CV/g×Scott: $1.10 \times 10^6$-$2.20 \times 10^6$ CV/in$^3$ The metal sub-oxide powder, preferably niobium sub-oxide powder, has at least 2, 3, 4, 5, 6, 7, or all 8 characteristics as set forth above. Preferably, the powder has at least a) through c) as well as at least one, two, three, four, or all five of d) through h).

Heat treating the starting valve metal oxide in the presence of a getter material and in an atmosphere which permits the transfer of oxygen atoms from the starting valve metal oxide to the getter material can be achieved by any conventional method to at least partially reduce a valve metal oxide. For example, in making the oxygen reduced niobium oxides of the present invention, and preferably NbO or variations thereof, hydrogen gas (or other carrier gases) is preferably used as the carrier wherein oxygen is transferred from the starting niobium oxide, e.g., Nb$_2$O$_5$, to Nb with the use of the H$_2$ gas as the carrier. The preferred reaction scheme is as follows:

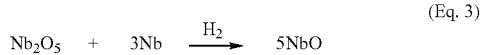

$$Nb_2O_5 + 3Nb \xrightarrow{H_2} 5NbO \qquad (Eq.\ 3)$$

As can be seen from Eq. 3, using a niobium metal as the getter material, the getter material along with the starting niobium oxide can all result into the oxygen reduced valve metal of the present invention, here, NbO. Other oxygen active materials can be used as the oxygen getter material, for instance, tantalum, magnesium, or their hydrides, as well as hydrided niobium. The first heat treatment can be, for example, at a temperature of from about 800 to about 1000° C. Other temperatures are possible. The first heat treatment can occur, for example, in an atmosphere of from about $1 \times 10^{-5}$ to about 1000 torr. The atmosphere is preferably a hydrogen atmosphere. Other atmospheres are possible.

The oxygen reduced valve metal oxide can be any oxygen reduced valve metal oxide as described above, for example, a niobium suboxide and/or a tantalum suboxide. Heat treating of the oxygen reduced valve metal oxide can be achieved as described above, and preferably is at a temperature of from about 1000 to about 1200° C. Other temperatures are possible. Heat treating of the oxygen reduced valve metal oxide preferably occurs in an atmosphere of from about $1 \times 10^{-5}$ to about 1000 torr. Other atmospheres are possible, for example, from about 10 torr to about 1000 torr, from about 100 torr to about 1000 torr, or from about 300 torr to about 1000 torr.

A variety of processing steps can be performed on any one or more of the powders of the present invention, before, during, and/or after any one or more of the above-described steps of the present invention. For example, where a higher valve metal oxide, e.g., niobium pentoxide, is used as the starting valve metal oxide, the niobium pentoxide particles formed by the present invention can be deoxidized by any known method or technique to form an oxygen reduced niobium suboxide. As another example, any of the powders of the present invention and/or oxygen getter material can be granulated at any stage, as described, for example, in U.S. patent application Ser. No. 60/450,536 filed on Feb. 26, 2003, which is incorporated in its entirety herein by reference. The valve metal oxide and/or the valve metal oxide-getter material mixture can be pre-heat treated, as described, in U.S. Provisional Application No. 60/471,649 filed on May 19, 2003, which is incorporated in its entirety herein by reference. In general, the materials, processes, and various operating parameters as described in U.S. Pat. Nos. 6,563,695 B1; 6,527,937 B2; 6,517,645 B2; 6,462,934 B2; 6,432,161 B1; 6,420,043 B1; 6,416,730 B1; 6,402,066 B1; 6,391,275 B1; 6,338,832 B1; 6,338,816 B1; 6,322,912 B1; 6,312,642 B1; 6,231,689 B1; 6,165,623; 6,071,486; 6,051,044; 6,051,326; 5,993,513; 5,986,877, 5,954,856; 5,580,516; 5,284,531; 5,261,942; 5,242,481; 5,234,491; 5,171,379; 4,960,471; 4,722,756; 4,684,399; and 4,645,533, and Published U.S. patent application Ser. Nos. 2003/0115985 A1; 2003/0082097 A1; 2003/0057304 A1; 2003/0037847 A1; 2003/0026756 A1; 2003/0003044 A1; 2002/0172861 A1; 2002/0135973 A1; 2002/0072475 A1; 2002/0028175 A1; 2002/0026965 A1; and 2001/0036056 A1, can be used in the present invention, and each are incorporated herein in their entirety by reference.

The various valve metal oxide particles of the present invention can be further characterized by the electrical properties resulting from the formation of a capacitor anode using the niobium suboxides of the present invention. In general, the valve metal oxide particles of the present invention can be tested for electrical properties by pressing powders of the valve metal oxide particles into an anode and sintering the pressed powder at appropriate temperatures and then anodizing the anode to produce an electrolytic capacitor anode which can then be subsequently tested for electrical properties.

Accordingly, another embodiment of the present invention relates to anodes for capacitors formed from the valve metal oxide particles of the present invention. The capacitor of the present invention can be formed by any method, for example, as described in U.S. Pat. Nos. 6,576,099 B2; 6,576,038 B1; 6,563,695 B1; 6,562,097 B1; 6,527,937 B2; 6,479,012 B1; 6,462,934 B2; 6,420,043 B1; 6,416,730 B1, 6,375,704 B1; 6,373,685 B1, 6,338,816 B1; 6,322,912 B1; 6,165,623; 6,051,044; 5,986,877, 5,580,367; 5,448,447; 5,412,533; 5,306,462; 5,245,514; 5,217,526; 5,211,741; 4,805,704; and 4,940,490, and Published U.S. patent application Ser. Nos. 2003/0115985 A1; 2003/0026756 A1; 2003/0003044 A1; 2002/0179753 A1; 2002/0152842 A1; 2002/0135973 A1; 2002/0124687 A1; 2002/0104404 A1; 2002/0088507 A1; 2002/0072475 A1; 2002/0069724 A1; 2002/0050185 A1; 2002/0028175 A1; and 2001/0048582 A1, each of which is incorporated herein in its entirety by reference.

The capacitors can be used in a variety of end uses such as automotive electronics, cellular phones, computers, such as monitors, mother boards, and the like, consumer electronics including TVs and CRTs, printers/copiers, power supplies, modems, computer notebooks, disc drives, and the like. Anodes can be made from the valve metal oxide particles in a similar process as used for fabricating metal anodes, i.e., pressing porous pellets with embedded lead wires or other connectors followed by optional sintering and anodizing. The lead connector can be embedded or attached at any time before anodizing. Anodes made from some of the valve metal oxide particles of the present invention can have a capacitance of from about 1,000 CV/g or lower to about 400,000 CV/g or more, and other ranges of capacitance can be from about 20,000 to about 300,000 CV/g or from about 62,000 to about 200,000 CV/g, and preferably from about 40,000 to about 400,000 CV/g. In forming the capacitor anodes of the present invention, a sintering temperature can be used that will permit the formation of a capacitor anode having the desired properties. The sintering temperature will be based on the particular valve metal oxide used. For a niobium suboxide, for example, the sintering temperature is preferably from about 1,200 to about 1,750° C., more preferably from about 1,200 to about 1,400° C., and most preferably from about 1,300 to about 1,400° C.

The anodes formed from the niobium oxides of the present invention are preferably formed at a voltage ($V_f$) of about 30 volts, and preferably from about 6 volts to about 80 volts or more. When niobium suboxide particles are used, preferably, the forming voltages are from about 6 to about 50 V, and more preferably from about 10 to about 40 volts. The valve metal oxide particles provide excellent low DC leakage at high formation voltages. Also, the anodes formed from the valve metal oxides of the present invention preferably include a DC leakage of less than about 5 nA/CV, for example, from about 5 nA/CV to about 0.05 nA/CV.

The previously described versions of the present invention include many advantages, including superior capacitor-grade materials and preparation processes to produce capacitor grade metal material that can be formed into high performance capacitors characterized by high capacitance and low DC leakage. Examples of morphology and other observable or measurable microstructure characteristics of the capacitor grade material of the present invention that enhance performance characteristics of capacitors made therefrom include, controlled primary particle size, high flowability, high purity, high BET surface area, uniform particle size distribution, Scott density, pressability, crush strength, microporosity, stability, dopant content, and the like. The valve metal oxide particles formed by deagglomerating the agglomerated particles of the present invention have beneficial properties that include, high BET surface area and uniform porosity with a minimal proportion of closed pores and micropores.

One option of achieving higher surface area anodes is by pressing greater amounts of valve metal oxide powder to form the porous pellet before sintering. This approach is restricted, however, because there is an inherent limit to the amount of powder which can be compacted into a given pellet size. Pellets pressed with higher than usual compression ratios result in anodes having poor porosity distributions with closed and non-uniform pores. The valve metal oxide powders of the present invention have high specific surface areas and their use in anode formation is preferable to increasing the quantity of valve metal oxide powder used to produce the pellet. By using the high surface area powders of the present invention, capacitor sizes can be reduced while achieving the same level of capacitance. The ESR value of a capacitor is related to the magnitude of heat generation accompanying increased speeds of electronic circuits such that as ESR increases, heat generation also increases. Thus, capacitors used in the CPUs and power supply circuits of personal computers preferably have a low ESR. In forming a high performance capacitor anode, it is beneficial to form a uniform cathode material coating on the valve metal sintered body.

Manganese oxide is typically used for the cathode material coating. In forming a cathode material coating comprised of manganese oxide, a manganese nitrate solution be impregnated into the sintered body followed by heating and thermal decomposition of the manganese nitrate. To uniformly form a cathode material coating on the valve metal sintered body, it is preferable to use a valve metal sintered body having uniform porosity with a minimal proportion of closed pores and micropores, which is possible by use of the valve metal oxide particles of the present invention.

In one embodiment of the present invention, prior to subjecting the starting materials to heat treatment, one or both of the starting materials, namely the starting niobium oxide and/or the niobium powder, or the powder mixture comprising both can be granulated or agglomerated. This granulation or agglomeration is especially useful when the materials have been co-milled together. The granulation can occur by a number of techniques. For instance, wet screening or drum agglomeration of wet material can be used. Other examples of agglomeration techniques include a tilted dish agglomeration which involves a rotating pan set on an angle to which fresh powder is added and on which a fine water spray, optionally with binders, is used. The agglomerate builds up as a spherical mass and eventually rolls off the pan into a collector. Another example is dry drum agglomeration which involves taking a powder and adding it to a large drum which turns fairly rapidly and has lifters. The showering particles are brought in contact with pellets and lightly hammered together. The granules can be formed by agitation of the powder in water, such as vibrating, blending, and the like. The granules can be formed by vacuum drying followed by screening. The granules can be formed by tumbling the powders in the presence of water. Another example is compactors which are devices that press the powder plus recycle between two rolls and makes slabs which are then milled to give feed to a screen set. Another example is a pin pelletizer. Granulating can be accomplished as described, for example, in U.S. Patent Application Publication No. US 2002/0033072 A1, incorporated in its entirety herein by reference.

As indicated above, the granulation can occur in a dried state or wet state. The liquid used can be water, water-based liquids, alcohols, organic liquids, and the like. With respect to screening, the granulation can occur by passing the powder over a screen, such as 20 mesh with openings larger than the desired granule size (for instance, less than 40 mesh). The screening can occur at any screen size, such as 20 mesh or lower (20 mesh to 200 mesh or lower). The majority of granules have sizes smaller than the openings and a few fines (for instance, less than 50 microns). This method works especially well for powders with high surface area (for example, greater than 1.5 m$^2$/g). Another method imparts the tumbling motion of moist particles to form spherical shaped granules. The water content in the powder, primary particle size, the rotation speed, and the size of media and tumbling time can be used to control the final granule size. Typical water contents are less than 50% by weight of the total ingredients and more preferably less than 30% by weight and residence times are preferably less than an hour to form granules greater than 50 microns in size (average). Screening operations to classify the materials may also be used to remove excessively large or small granules from the final product. The large and fine granules may be recycled and again used as feed material. As indicated above, the water content can be any amount such as amounts from about 5% to about 40% by weight of the total materials used in agglomeration and more preferably from about 10% to about 30% by weight. Tumbling speed during granulation when a tumbling motion is used can be any rotational speed depending upon the size of the tumbler. For a small lab tumbler, for instance, rotational speeds can be from about 30 to about 60 rpm and more preferably from about 40 to about 50 rpm. The amount of material granulated can be any amount and of course depends upon the size of the device being used to form granulation. Preferably, a media (e.g., 1/16"-1/2") can be also used during granulation such as media balls made from or coated with niobium. The media can be present in any amount, such as from about 1% to about 20% or from about 5 to 10% by volume. If wet granulating is used, the liquid can be added at any rate, such as a slow continuous rate or as a spray until the desired granule size is achieved. After granulation, if a liquid is used, the powder can then be dried using any drying technique such as drying under a vacuum oven or a convection oven at relatively lower temperatures. For instance, the drying can occur at temperatures of from about 85 to about 100° C. for about 15 minutes or less to about 60 minutes or more. The granules can then be classified by screening the granules. The screening operation can be preformed either before or after the drying step. While any size can be achieved by this screening, examples include −40 mesh (−425 microns), −50 mesh (−300 microns), −100 mesh (−150 microns), −140 mesh (−106 microns), and the like. The screening allows the removal of coarse and fine granules based on desired particle distribution.

If not already achieved, the niobium getter powder is mixed with or blended with the starting niobium oxide, which is preferably $Nb_2O_5$, to form a powder mixture. The powder mixture can then be subjected to a heat treatment, for instance, under inert or vacuum conditions, which can occur at a temperature below the melting point of the powder mixture constituents and preferably at a temperature of from about 600 to about 1,600° C., and which preferably occurs under inert or vacuum conditions. The heat treating that the powder mixture is subjected to can be conducted in any heat treatment device or furnace commonly used in the heat treatment of metals such as niobium and tantalum. In a preferred embodiment, heat treating and subsequent reacting are achieved using the same equipment, without removing the powder. For example, after the heat treating of the powder mixture, the powder mixture can be allowed or made to cool and the reacting process can begin as described in detail below. More than one heat treatment can occur, and multi-heat treatment steps can occur at different temperatures, and without cooling in between. With respect to the multi-heat treatment steps, optionally, other steps can occur between heat treatment steps, such as, but not limited to, screening one or more times between one or more heat treatment steps.

Figure 2:
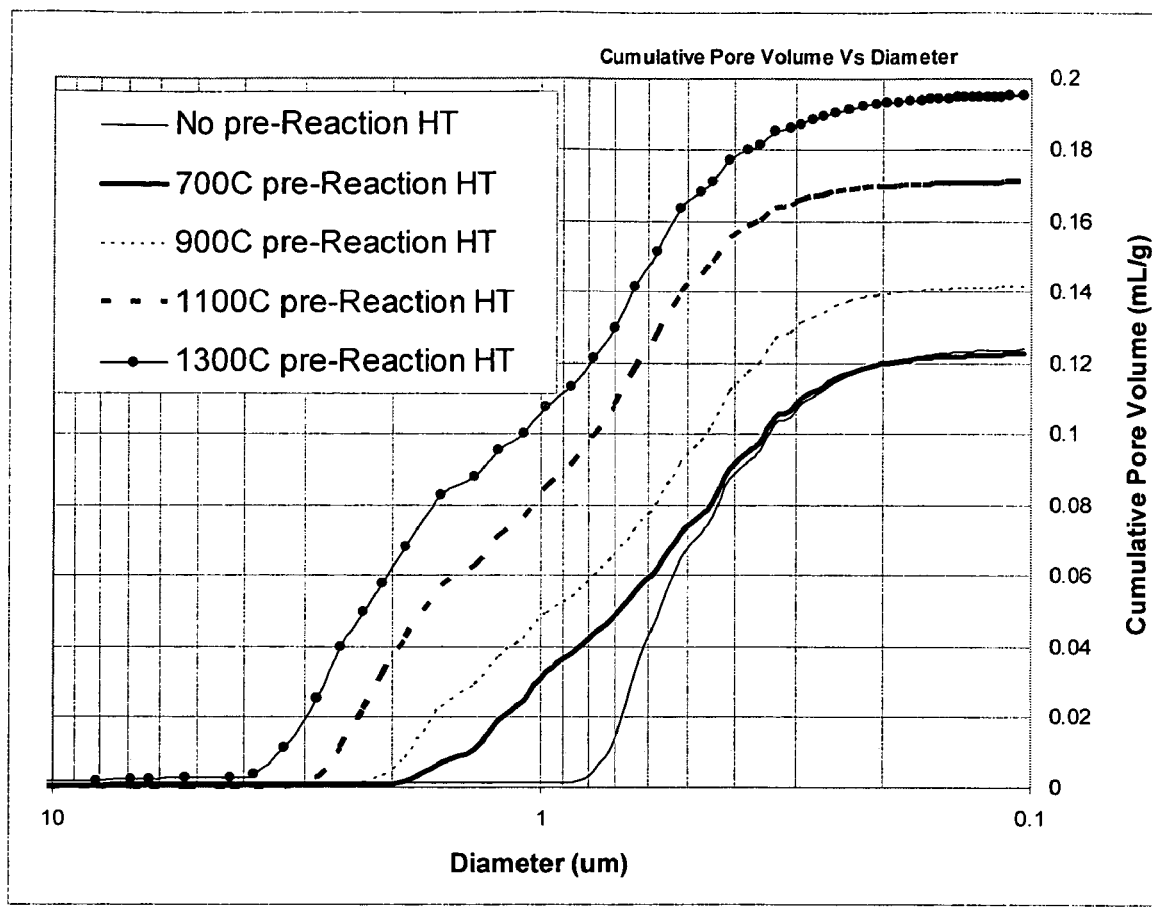
FIG. 2 is a graph of cumulative pore volume of various oxygen reduced niobium oxide powders that are pressed and sintered.

Heat treating under vacuum of the powder mixture is preferably at a temperature and for a time sufficient to cause mass transfer between the particles of the powder mixture that can be characterized by necking of the particles. Heat treating under vacuum preferably forms a heat treated powder that, upon subsequent reacting, forms a final product, i.e., oxygen reduced niobium oxide that has a porous microstructure (due to mean pore size and/or total pore volume), a unimodal or multi-modal pore size distribution (e.g., a bimodal pore size distribution), and superior crush strength. FIG. 1 is a graph of pore size distribution for pressed and sintered powders at various heat treating temperatures. The graph shows the bimodal pore size distribution associated with heat treated powders versus the unimodal pore distribution of non-heat treated powder. "Bimodal" means a distribution with two modes (i.e., the presence of two distinct value ranges that are conspicuously more frequent than neighboring values). FIG. 2 is a graph of cumulative pore volume for pressed and sintered powders at various heat treating temperatures. The graph shows the increased porosity associated with heat treated powders versus non-heat treated powder.

Figure 3:
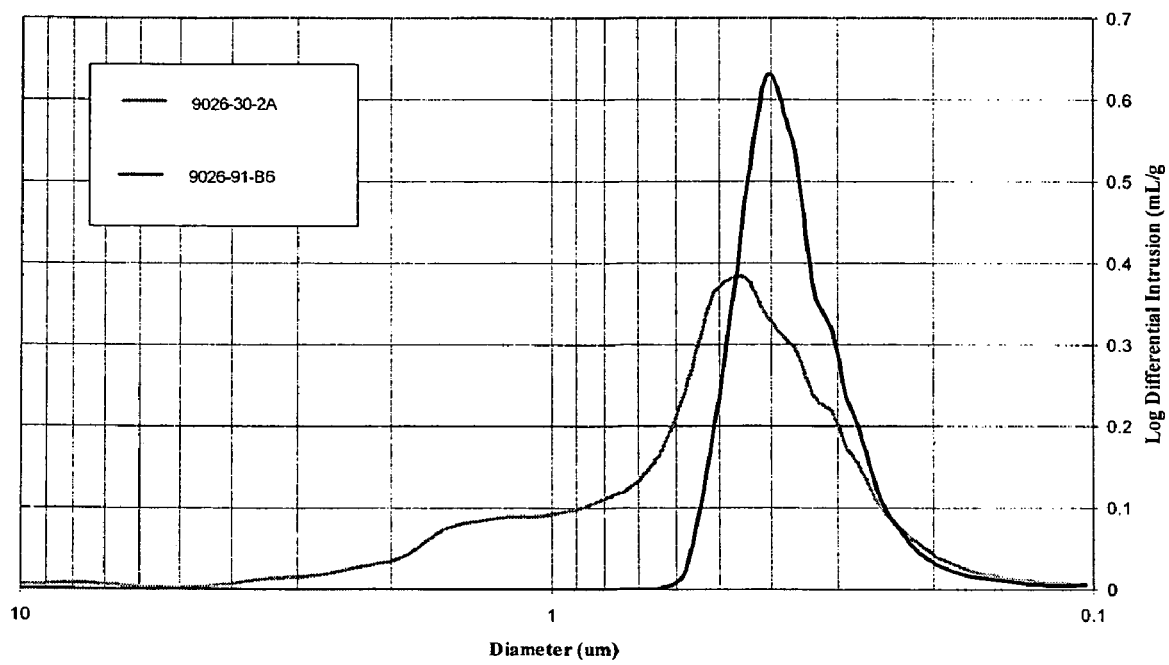
FIGS. 3-6 are graphs of pore size distributions and cumulative pore volumes of various oxygen reduced niobium oxide powders that are pressed and sintered.

"Mono-modal" means a distribution with one mode (i.e., the presence of one distinct value range that is conspicuously more frequent than neighboring values). A "mono-modal log differential intrusion peak with a shoulder or extended shoulder" means a distribution with one mode (i.e., the presence of one distinct value range that is conspicuously more frequent than neighboring values with the values on one side of the log differential intrusion peak being higher with respect to frequency than the values on the other side of the peak, thus forming a shoulder, for instance as shown in FIG. 3). FIG. 3 shows a mono-modal log differential intrusion peak (black line) with no shoulder while the gray line shows a mono-modal log differential intrusion peak with a shoulder.

Figure 4:
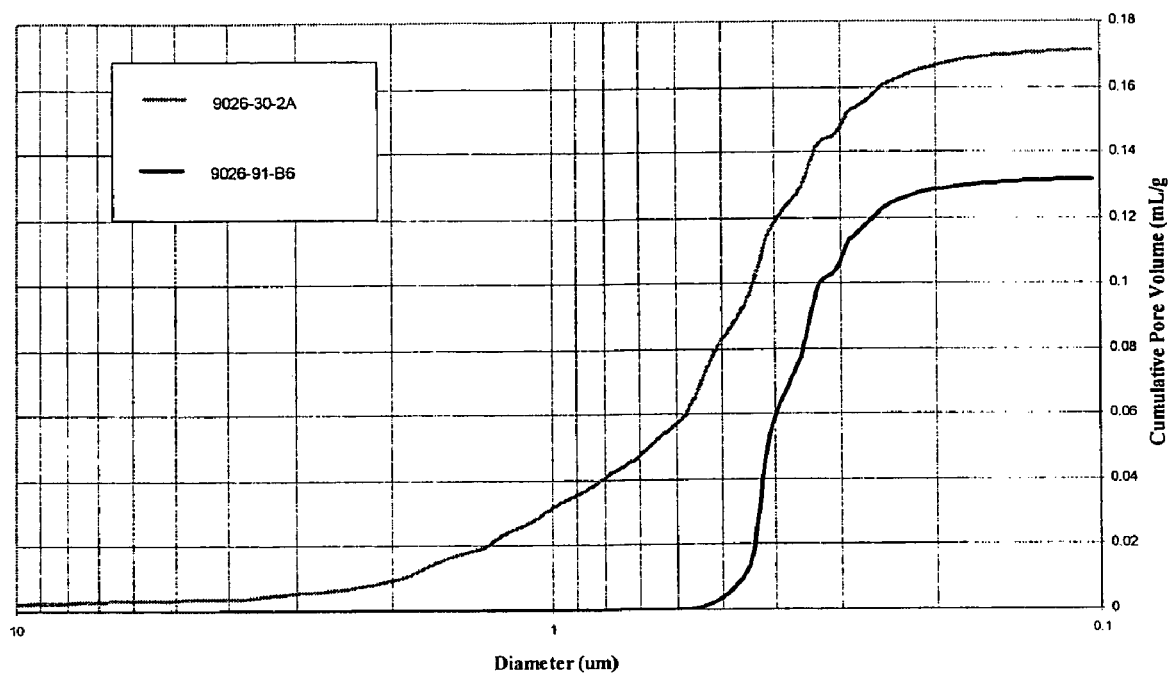
Figure 5:
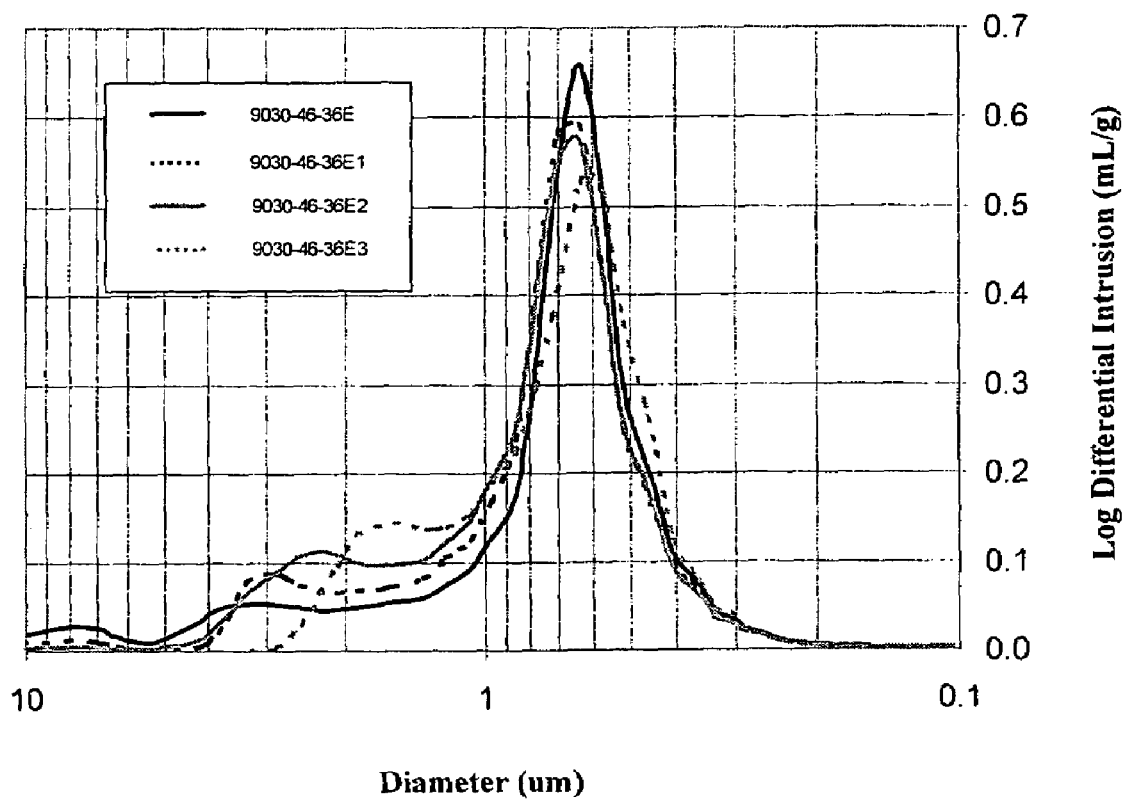
Figure 6:
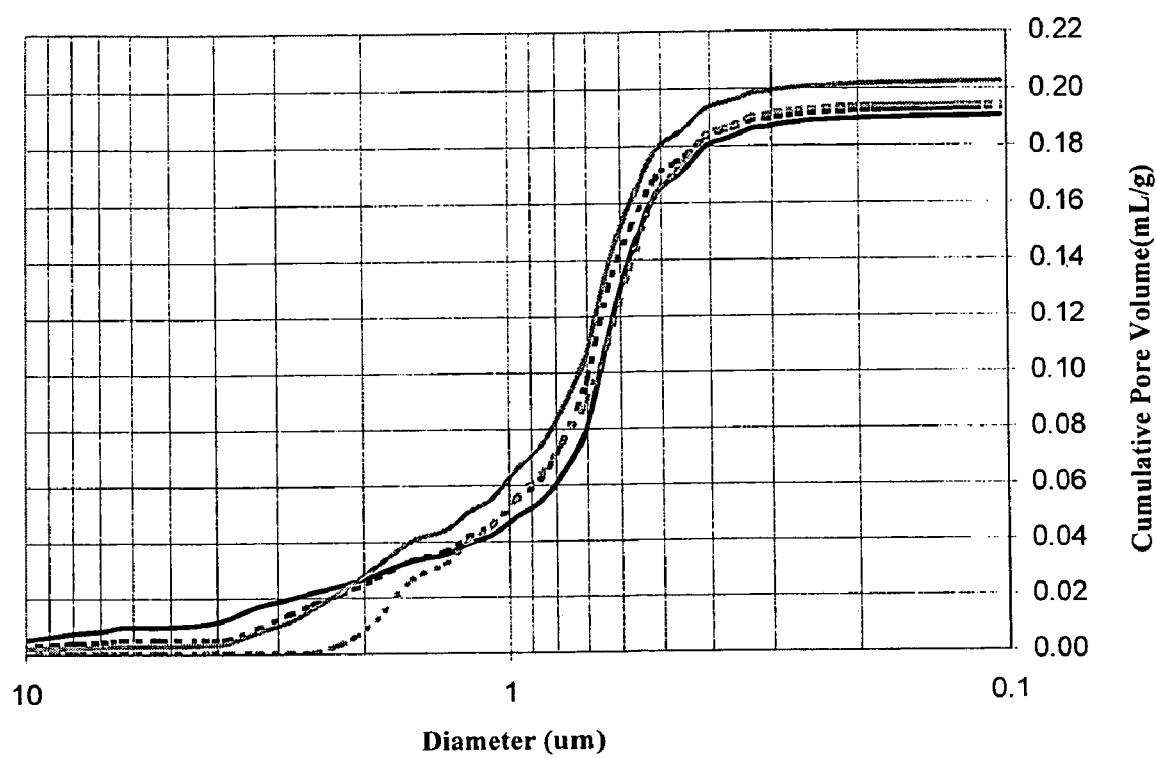

FIG. 3 is graph of pore size distribution for present sintered powders wherein the powder identified by the black line represents an oxygen reduced niobium oxide that was co-milled as described above and the grey line represents an oxygen reduced niobium oxide which formed a mixture of the starting niobium oxide with the niobium metal or hydrided niobium metal without co-milling. In each case, the material was sintered at 1,380° C. for 10 minutes. As can be seen from FIG. 3, the niobium sub-oxides of the present invention which have been co-milled provided a unimodal pore size distribution without any extended shoulder or bimodal log differential intrusion peaks. FIG. 4 is also a graph showing the pore size distribution associated with heat treated powders using a smaller scale for the log differential intrusion. Again, a different pore size distribution can be seen with respect to the various niobium sub-oxide powders. In FIG. 4, the same powders are represented as in FIG. 3. In FIG. 5, a graph representing pore size-distribution is again shown wherein the solid black line and the dotted black line represent niobium sub-oxide powders which been sintered and pressed at 1,380° C. for 10 minutes at a 2.8 g/cc pressed density. The samples again show essentially a unimodal pore size distribution whereas the sample represented by the grey line was prepared without co-milling, but only combining the starting ingredients. As can be seen, a bimodal distribution is achieved. The same powder samples shown in FIG. 5 are shown in FIG. 6, except with respect to a smaller scale with respect to the log differential intrusion. The legend from FIG. 5 applies to FIG. 6 too.

The heat treated powder is preferably then subjected to further heat treatment or reacting which preferably occurs at a temperature of from about 800 to about 900° C. in the presence of hydrogen, for instance at a pressure of from about 50 to about 900 Torr. Preferably, the reacting occurs for a sufficient time to achieve the reaction set forth above which is the full conversion of the niobium powder and the starting niobium oxide to the final product which is an oxygen reduced niobium oxide such as NbO, $NbO_{0.7}$, $NbO_{1.1}$, or combinations thereof. Thus, in this process, the niobium powder as well as the starting niobium oxide become the final product.

The reacting that the powder mixture is subjected to can be conducted in any heat treatment device or furnace commonly used in the heat treatment of metals, such as niobium and tantalum. The reacting of the powder mixture containing the starting niobium oxide and the niobium powder is at a temperature and for a time sufficient to form an oxygen reduced niobium oxide. The temperature and time of the reacting can be dependent on a variety of factors such as the amount of reduction of the niobium oxide, the amount of the niobium powder, and the type of niobium powder as well as the type of starting niobium oxide. Generally, the reacting of the niobium oxide is at a temperature of from about 750° C. or less to about 1900° C. or more, and preferably from about 800 to about 900° C., and more preferably at about 850° C. Reacting can be for a time of from about 5 minutes to about 4 hours, and more preferably from about 1 to about 3 hours. Routine testing in view of the present application will permit one skilled in the art to readily control the times and temperatures of the reacting process in order to obtain the proper or desired reduction of the niobium oxide.

As stated, after heat treating preferably under inert or vacuum conditions, primary reacting occurs in an atmosphere which permits the transfer of oxygen atoms from the niobium oxide to the niobium powder. The reacting preferably occurs in a hydrogen containing atmosphere which is preferably just hydrogen. Other gases can also be present with the hydrogen, such as inert gases, so long as the other gases do not react with the hydrogen. Preferably, the hydrogen atmosphere is present during the reacting at a pressure of from about 10 to about 2000 Torr, and more preferably from about 100 to about 1000 Torr. Mixtures of $H_2$ and an inert gas such as Ar can be used. Also, $H_2$ in $N_2$ can be used to effect control of the $N_2$ level of the final product.

During the reacting process, a constant heat treatment temperature can be used during the entire reacting process or variations in temperature or temperature steps can be used. For instance, hydrogen can be initially admitted at 1,000° C. followed by increasing the temperature to 1,250° C. for 30 minutes followed by reducing the temperature to 1,000° C. and held there until removal of the $H_2$ gas. After the $H_2$ or other atmosphere is removed, the furnace temperature can be dropped. Variations of these steps can be used to suit any preferences of the industry. As an option, the use of hydrogen can be avoided, for instance by preferably using high reaction temperatures, such as 1400° C. or higher, and with uniform mixing of the starting materials.

Set forth below is a discussion regarding the various physical and chemical and electrical characteristics of the niobium sub-oxide powders of the present invention. The niobium sub-oxide powders of the present invention can have one or more or any combination of the properties described herein. The discussion with respect to these properties and characteristics is simply for convenience sake and is not meant to limit the combination of properties that the niobium sub-oxides of the present invention can have.

Once the reaction is complete and the desired oxygen reduced niobium oxide is obtained, the powder can then be pressed into an anode using conventional methods of forming anodes from valve metals. In the present invention, the oxygen reduced niobium oxide has significantly improved flow properties as well as crush strength and further has low impurities (e.g., Fe, Ni, and Cr), which all lead to beneficial capacitor anode properties, such as an extremely low leakage.

The oxygen reduced niobium oxides of the present invention, in one embodiment, can be in granulated or granule form. These granules can have a spherical shape though other shapes are possible. Also, a combination of spherical and other shapes can be present. The oxygen reduced niobium oxide preferably forms granules that have excellent flow properties such as from about 100 to about 1000 mg/s or more, or from about 300 to about 700 mg/s, and more preferably at least about 300 mg/s as measured by ASTM B213 using a 3 mm diameter orifice. In one embodiment of the present invention, the present invention relates to a oxygen reduced valve metal oxide that comprises granules preferably having a size of from about 30 to about 1000 microns and more preferably from about 30 to about 300 microns. As indicated, in one embodiment, the pressed and sintered oxygen reduced niobium oxides of the present invention, including the granule form, independently of other properties, can have a bimodal pore size distribution. In other words, when the pore size distribution of the pressed and sintered oxygen reduced niobium oxide granules is measured, and, for instance, depicted by a graph, at least two major or primary log differential intrusion peaks are detected with respect to the primary pore size distribution. Preferably, the pore size distribution is from about 0.1 to about 10 microns. This bimodal pore size distribution is especially beneficial for counter-electrode impregnation thus forming a suitable capacitor or part thereof. With respect to pore volume, the pressed and sintered oxygen reduced niobium oxides of the present invention have excellent pore volumes. Alternatively, the pressed and sintered granules can have a mono-modal pore size distribution of from about 0.1 to about 10 microns, or a mono-modal pore size distribution with a shoulder (e.g., extended shoulder) on one side of the mono-modal log differential intrusion peak with a distribution of from about 0.1 to about 10 microns. For instance, the niobium sub-oxides of one embodiment of the present invention with respect to porosity, when pressed to a press density of 2.8 cc/g and sintered at 1380° C. for 10 minutes, can have a pore size distribution with a mono-modal log differential intrusion peak at 0.4 microns, with the mono-modal log differential intrusion peak having a breadth (or width) of from 0.2 to 0.6 microns at 0.1 mL/g and the mono-modal log differential intrusion peak can have a height greater than 0.5 mL/g. These various numbers are with respect to the measurements, for instance, set forth in the figures. As another example, the niobium sub-oxides of the present invention can have a pore size distribution which has a mono-modal log differential intrusion peak located at 0.5 to 0.8 microns, with a breadth (or width) of from 0.3 to 1.1 microns at 0.1 mL/g and the mono-modal log differential intrusion peak height is preferably greater than 0.6 mL/g. As another example, the niobium sub-oxides of the present invention can have a pore size distribution wherein a mono-modal log differential intrusion peak is present with a shoulder, for instance, extending from 1.3 microns or less to 10 microns or greater with a shoulder height of less than 0.1 mL/g. In one embodiment, the shoulder that can be present in the pore size distribution can have a ratio of the cumulative volume located between 1 and 10 microns, wherein the ratio is from 1 to 7.5. In another embodiment, the shoulder from the pore size distribution can have a total porosity of from 4 to 13 percent at a pore size above 1 micron and/or can have a total porosity of from 1 to 4 percent with the pore sizes of less than 10 microns. The pressed and sintered granules can have a total pore volume of from about 0.1 to about 0.30 mL/g. Other pore volumes can be achieved.

The granulated products of the present invention preferably provide excellent physical properties with respect to bulk density, flowability, green strength, and pressability of the powders. With the granulation techniques of the present invention, one can maintain the desired microstructure and electrical properties of the fine powders while retaining the physical properties during the forming process.

The oxygen reduced niobium oxide granules, when they are pressed and sintered, preferably have a diametric shrinkage that is quite beneficial, such as from about 1 to about 12%. Furthermore, the oxygen reduced niobium oxide granules, once they are pressed and sintered and form as a body of granules, preferably have a BET surface area of from about 0.5 to about 4.0 $m^2/g$. Other BET surface areas are possible. The niobium granules of the present invention can preferably be pressed at a pressed density of from about 2.4 to about 3.5 g/cc and provide sufficient crush strength.

The oxygen reduced niobium oxides of the present invention, in one embodiment, can have a sintered crush strength of at least 35 lbs. More preferably, the sintered crush strength is from 35 lbs. to about 75 lbs. In other embodiments, the sintered crush strength can be 20 lbs. or greater, such as 25 lbs. or greater, for instance, 25 lbs. to 75 lbs. The sintered crush strength is based upon the oxygen reduced niobium oxide or other valve metal oxide being sintered at 1,380° C. for 10 minutes with a pressed density of 2.8, an anode diameter of 0.197 inch, an anode height of 0.208 inch with the lead wire not present.

In one embodiment, the oxygen reduced niobium oxide or valve metal sub-oxide powder can have a granule strength, which is substantially independent of screen size. One means to test granule strength is based on a $D_{50}(NU)/D_{50}(120S-U)$ ratio, wherein NU means "no ultrasound" and 120 S-U means "120 seconds of ultrasound." This test determines the strength of the granule when an ultra sound is applied for 120 seconds and compares it to the strength of the granule when no ultra sound is applied. By doing this test, one can readily determine the granule strength of the oxygen reduced niobium oxide or valve metal sub-oxide powder when formed into a granule. When using this test, the granule strength of various oxygen reduced valve metal sub-oxides of the present invention show excellent consistent granule strength irrespective of the size of the granule. As shown, for instance, in FIG. 7, the granule strength of the metal sub-oxide powders was surprisingly consistent throughout various screen sizes which is quite unusual. More importantly, even though this granule strength is maintained throughout various screen sizes, the remaining electrical properties such as capacitance and DC leakage are also maintained. Thus, the present invention provides a means as well as a powder which provides excellent consistent granule strength irrespective of the screen size which can be quite desirable for various capacitor manufacturer specifications. In addition, in at least one embodiment, the present invention relates to oxygen reduced niobium oxide or valve metal sub-oxide powders that have a $D_{50}(NU)/D_{50}(120S-U)$ ratio of from about 1.0 to about 3.5 and more preferably, from about 1 to about 3 wherein this granule strength is substantially independent of granule size and preferably this granule strength is substantially independent of granule sizes of from −40 mesh to about −140 mesh. For purposes of the present invention, an example of substantially independent means that the granule strength $D_{50}$ ratio does not alter by more than ±3 and more preferably by no more than ±2 and even more preferably no more than ±1. In addition, or as an option, the oxygen reduced niobium oxide can have a green crush strength of 1 lb. or greater, more preferably from 1.6 lbs. to 6 lbs. or greater. In some embodiments, the green crush strength can be 6 lbs. or greater.

The present invention also relates to a method to control porosity in valve metal sub-oxide materials which comprises forming granules and adjusting the granule size to obtain desired porosity. For instance, a powder can be prepared to have a pore size distribution to form a log differential intrusion peak which can have an adjustable peak height of from about 0.4 mL/g to about 0.75 mL/g. This can be adjusted, for instance, by screen size and/or pre-heat treatment variations. The log differential intrusion peak height can also vary from about 0.5 mL/g to about 0.6 mL/g. The log differential intrusion peak can be a mono-modal log differential intrusion peak with or without a shoulder(s) or can be a part of a multi-modal distribution.

Furthermore, as indicated above, the oxygen reduced niobium oxides, e.g., oxygen reduced niobium oxide granules, preferably have low metal impurities such as low Fe, Ni, Cr, C, and other low metal impurities. Preferably, these impurities are less than 500 ppm and more preferably less than 100 ppm, and even more preferably less than 50 ppm, excluding gases. The oxygen reduced niobium oxides can also contain levels of nitrogen, e.g., from about 100 to about 80,000 ppm $N_2$ or to about 130,000 ppm $N_2$. Suitable ranges include from about 31,000 to about 130,000 ppm $N_2$ and from about 50,000 to about 80,000 $N_2$.

The oxygen reduced niobium oxides of the present invention have a variety of beneficial properties and characteristics. The oxygen reduced niobium oxides can have a primary particle size ($D_{50}$) of from about 0.1 micron to about 5 microns. Preferably, the primary particle size is from about 0.5 micron to about 5 microns. Other suitable ranges are possible. The oxygen reduced niobium oxides of the present invention also preferably have a microporous surface and preferably have a sponge-like structure, as granules. The oxygen reduced niobium oxides of the present invention can have high specific surface area, and/or a porous structure having pores from about 0.1 to about 10 microns, and total porosity of 50% or more. The oxygen reduced niobium oxides can also have a variety of BET surface areas. The BET surface areas are with respect to the primary particles. Suitable BET surface areas include, but are not limited to, at least 0.5 $m^2/g$ or higher. Other ranges include a BET surface area of from about 1 $m^2/g$ to about 15 $m^2/g$ or higher. Other suitable BET ranges are possible. The oxygen reduced niobium oxides of the present invention can be characterized as having a preferred BET specific surface area of from about 0.5 to about 10.0 $m^2/g$, more preferably from about 0.5 to 2.0 $m^2/g$, and even more preferably from about 1.0 to about 1.5 $m^2/g$. The preferred apparent density of the powder of the oxygen reduced niobium oxides is less than about 2.0 g/cc, more preferably, less than 1.5 g/cc and more preferably, from about 0.5 to about 1.5 g/cc.

The various oxygen reduced niobium oxides of the present invention can be further characterized by the electrical properties resulting from the formation of a capacitor anode using the oxygen reduced niobium oxides of the present invention. In general, the oxygen reduced niobium oxides of the present invention can be tested for electrical properties by pressing powders of the oxygen reduced niobium oxide into an anode and sintering the pressed powder at appropriate temperatures and then anodizing the anode to produce an electrolytic capacitor anode which can then be subsequently tested for electrical properties.

Accordingly, another embodiment of the present invention relates to anodes for capacitors formed from the oxygen reduced niobium oxides of the present invention. Anodes can be made from the powdered form of the oxygen reduced niobium oxides in a similar process as used for fabricating metal anodes, i.e., pressing porous pellets with embedded lead wires or other connectors followed by optional sintering and anodizing. The lead connector can be embedded or attached at any time before anodizing. Anodes made from some of the oxygen reduced niobium oxides of the present invention can have a capacitance of from about 1,000 CV/g or lower to about 400,000 CV/g or more, and other ranges of capacitance can be from about 20,000 to about 300,000 CV/g or from about 62,000 to about 200,000 CV/g and preferably from about 40,000 to about 400,000 CV/g. As a further example, anodes made from some of the oxygen reduced niobium oxides of the present invention can have a capacitance from about 55,000 to about 175,000 at a 10 V bias. In forming the capacitor anodes of the present invention, a sintering temperature can be used which will permit the formation of a capacitor anode having the desired properties. The sintering temperature will be based on the oxygen reduced niobium oxide used. Preferably, the sintering temperature is from about 1,200 to about 1,750° C. and more preferably from about 1,200 to about 1,400° C. and most preferably from about 1,300 to about 1,400° C.

The sintering temperature in the formation of a capacitor anode of the present invention can be accomplished at a variety of temperatures. For instance, the sintering temperature can be conducted at about 800° C. or lower to about 1,750° C. or higher. When lower temperatures are used such as on the order of from about 900° C. or lower to about 1,100° C., sintering can occur for any sufficient time to result in a capacitor anode that provides capacitance. When lower sintering temperatures are used to form the capacitor anodes of the present invention, the sintering time is preferably longer than conventional times used for forming capacitor anodes in general. For instance, the sintering times can be from about 1 hour to about 10 hours or more (e.g., 1 or more days). As a more specific example, sintering times can be from about 1 hour to about 5 hours or from about 2 hours to about 4 hours. These long sintering times at low sintering temperatures preferably results in an acceptable capacitance for the capacitor anode as well as a low DC leakage such as below about 0.5 nanoampheres/CV. In addition, less shrinkage occurs at these lower sintering temperatures that preferably yield a more desirable pore structure. For example, with lower sintering temperatures using the anodes of the present invention, the number of pores is greater and the diameter of these pores is larger which results in very beneficial properties in using these capacitor anodes in electrical applications. For example, these improved properties with respect to the number of pores and size of the pores further results in achieving maximum capacitance retention through the capacitor manufacturing process. Accordingly, when the various preferred embodiments of the present invention are used, such as the milling options described above as well as using lower sintering temperatures, a whole host of improved properties are achieved with respect to the powder and the resulting capacitor anode as described herein. Generally, the lower the sintering temperature, the longer the sintering time for purposes of achieving the desirable properties such as capacitance, low DC leakage, and other properties. Thus, if the sintering temperature is more on the order of about 800° C. the sintering time will be much longer compared to a sintering temperature of 1100° C. or more. As stated above and shown in the examples, the sintering time can be a variety of different times pending upon the desired properties of the resulting capacitor anode.

The anodes formed from the niobium oxides of the present invention are preferably formed at a voltage ($V_f$) of about 30 volts and preferably from about 6 to about 80 volts or more. When an oxygen reduced niobium oxide is used, preferably, the forming voltages are from about 6 to about 50 V, and more preferably from about 10 to about 40 volts. The DC leakage achieved by the niobium oxides of the present invention have provided excellent low leakage at high formation voltages. Also, the anodes formed from the oxygen reduced niobium oxides of the present invention preferably have a DC leakage of less than about 5.0 nA/CV. In an embodiment of the present invention, the anodes formed from some of the oxygen reduced niobium oxides of the present invention have a DC leakage of from about 5.0 nA/CV to about 0.50 nA/CV.

The oxygen reduced niobium oxides in granulated form or non-granulated form can have beneficial electrical properties. For instance, when the oxygen reduced niobium oxide granules of the present invention are pressed and sintered, beneficial capacitance and/or low leakage properties are exhibited.

In more detail, when the oxygen reduced niobium oxide granules of the present invention are sintered at a temperature of 1380° C. for 10 minutes and formed at 30 volts, and at a formation temperature of 90° C., wherein the granules are pressed at 2.8 g/cc, the sintered oxygen reduced niobium oxide granules exhibit a capacitance of from about 40,000 to about 300,000 CV/g and/or have a leakage current of less than 0.5 nA/CV. Other capacitance and low leakage values are possible depending upon the sintering conditions, the sintering time, the formation voltage, and the like.

The oxygen reduced niobium oxides, including the granule form of the present invention, can be formed into capacitor parts such as capacitor anodes using conventional capacitor formation techniques which can include one or more of the techniques mentioned herein. Thus, one embodiment of the present invention is a capacitor anode containing the oxygen reduced niobium oxides of the present invention, and having the remaining aspects of an anode and capacitor, e.g., dielectric layer, and the like.

Furthermore, with respect to the numerous beneficial properties described above, such as the primary particle size ($D_{50}$), BET surface area, flow properties, electrical properties and the like, it is important to appreciate that for purposes of the present invention, the oxygen reduced niobium oxides can have at least one of these characteristics, or two or more of these characteristics, or all of these characteristics. Any combination of properties and characteristics is possible.

For instance, the oxygen reduced niobium oxides of the present invention can have a primary particle size ($D_{50}$) of from about 0.1 to about 5 microns and a granule size, once granulated, of from about 30 to about 1,000 microns. These oxygen reduced niobium oxides can also have a BET surface area of from about 1 to about 15 $m^2/g$ and optionally a flow rate of at least about 300 mg/s.

The following paragraph relates to one preferred embodiment. Other embodiments are possible. As indicated, the primary particles of the oxygen reduced niobium oxides preferably have a spherical or essentially a spherical shape. Furthermore, the granules of the oxygen reduced niobium oxides of the present invention also preferably have a spherical or substantially spherical shape. When the powders of the present invention are granulated but not sintered, the agglomerates are essentially soft agglomerates. In other words, these agglomerates can easily break up upon hitting a hard surface. Furthermore, when a soft agglomerate does break, the powders return rather easily to their primary particle make-up. In addition, when the soft agglomerates are formed, the primary particles can easily be identified by SEM techniques. In other words, there is generally no necking of the primary particles with each other and the shapes which are essentially spherical are maintained even when granulated. Also, when the granules are sintered to form a sintered body, this results in a hard agglomerate. Importantly, spherical primary particles even after being sintered essentially maintain their spherical shape and there is necking of particles with adjacent particles. Essentially, the primary particles maintain their structural shape and integrity even though they are in contact with each other. This is quite beneficial with respect to creating a favorable pore distribution throughout the sintered body. Again, the sintered body of granules, even under an SEM analysis, essentially maintains their primary particle shape. These properties and characteristics, which are preferred, are especially preferred when the oxygen reduced niobium oxide is NbO, $NbO_{0.7}$, and/or $NbO_{1.1}$.

The oxygen reduced niobium oxide formed from the above-described preferred process of the present invention can be combined with a sufficient amount of binder in order to form the capacitor anode. Preferably, the amount of binder used is from about 1% to about 5% by weight based on the weight of the capacitor anode. Suitable binders include, but are not limited to, PEG and Q-Pac. Other suitable binders are described in one of the earlier referenced applications which are incorporated in their entireties by reference herein.

With respect to the anodes formed from the niobium oxides of the present invention, the oxygen reduced niobium oxide powder can optionally be mixed with a binder and/or lubricant solution in an amount sufficient to be able to form the niobium oxide powder into an anode when pressed. The amount of the binder and/or lubricant in the powder can range from about 1 to about 20 wt %, based on the wt % of the combined ingredients. After mixing the niobium oxide powder with the binder and/or lubricant solution, the solvent that may be present as part of the binder/lubricant solution is removed by evaporation or other drying techniques. Once the solvent, if present, is removed, the niobium oxide powder is then pressed into the shape of an anode, preferably with a tantalum, niobium, or other conductive wire embedded in the anode. While a variety of press densities can be used, preferably, the pressed density is from about 2 to about 4 g/cc, and more preferably from about 2.4 to about 3.5 g/cc. These ranges can also reflect pressability, meaning the pressed compact maintains its structural integrity for handling purposes. Once pressed into the anode, a de-binding or de-lube step occurs to remove the binder and/or lubricant present in the pressed anode. The removal of the binder and/or lubricant can occur a number of ways including putting the anode in a vacuum furnace at temperatures, for instance, of from about 250 to about 1200° C. to thermally decompose the binder and/or lubricant. The binder and/or lubricant can also be removed by other steps, such as repeated washings in appropriate solvents to dissolve and/or solubilize or otherwise remove the binder and/or lubricant that may be present. Once the de-binding/de-lube step is accomplished, the anode is then sintered in a vacuum or under inert atmosphere at appropriate sintering temperatures, such as from about 900 to about 1900° C. The finished anode then preferably has reasonable body and/or wire pull strength as well as low carbon residue. The anodes of the present invention, which use the reduced oxygen niobium oxides of the present invention, have numerous advantages over tantalum and/or niobium powders which are formed into anodes. Many organic binders and/or lubricants, which are used to improve press performance in the formation of an anode, lead to high carbon residues that are present after de-binding or de-lubing and sintering. The full removal of the carbon residue can be extremely difficult since carbon forms carbides with metals. The presence of carbon/carbides leads to the formation of defective dielectrics and thus an undesirable product. With the anodes of the present invention, the micro-environment of the anode is oxygen-rich. Thus, when the anode is sintered at high temperature, carbon residue in the anodes can evaporate as carbon monoxide after reacting with oxygen. Thus, the anodes of the present invention have a "self-cleaning" property that is quite different from other anodes formed from tantalum or niobium. Accordingly, the anodes of the present invention have a high tolerance of organic impurities during processing and handling and have the ability to use a wide range of hydrocarbon containing binders and/or lubricants for improved processability including improved powder flow, improved anode green strength, and the like. Accordingly, the binders and/or lubricants that can be used in the present invention include organic binders and organic lubricants as well as binders and lubricants that contain high amounts of hydrocarbons. Examples of suitable binders that can be used in the formation of the pressed anodes of the present invention, include, but are not limited to, poly(propylene carbonates) such as QPAC-40 available from PAC Polymers, Inc., Greenville, Del.; alkyd resin solutions, such as GLYPTAL 1202 available from Glyptal Inc., Chelsea, Mass.; polyethylene glycols, such as CARBOWAX, available from Union Carbide, Houston, Tex.; polyvinylalcohols, stearic acids, and the like. The procedures and additional examples of binders and/or lubricants set forth in Publication Nos. WO 98/30348; WO 00/45472; WO 00/44068; WO 00/28559; WO 00/46818; WO 00/19469; WO 00/14755; WO 00/14139; and WO 00/12783; and U.S. Pat. Nos. 6,072,694; 6,056,899; and 6,001,281, all of which are incorporated in their entirety by reference herein, can be used in the present invention.

Once the oxygen reduced niobium oxides are formed, as indicated above, the particles can be mixed with a binder in the amounts indicated above and then compacted. The compacted particles can then be crushed sufficiently to form a particle distribution of from about 100 microns to about 500 microns and more preferably from about 100 microns to about 300 microns. These particles can then be pressed into anodes and sintered for anode production using conventional techniques known to those skilled in the art. As shown in the Examples, the crush strength of the oxygen reduced niobium powders of the present invention are significantly improved compared to previous oxygen reduced niobium oxides and further have significantly lower leakage.

The crush strength and other properties can be achieved by taking the niobium powder formed from the above-described preferred process of the present invention and combining it with a sufficient amount of binder to form the capacitor anode. The use of binder is optional. Preferably, the amount of binder used is from about 1% to about 5% by weight based on the weight of the capacitor anode. Suitable binders include, but are not limited to, PEG and Q-Pac. Other suitable binders are described in one of the earlier referenced applications, which are incorporated in their entireties by reference herein. The flow properties of the oxygen reduced niobium oxides of the present invention are preferably improved as well as the impurity levels of the surface-passivated niobium powder, as shown in the examples.

Once the niobium powder is formed, as indicated above, the particles can be mixed with a binder in the amounts indicated above and then optionally compacted. The particles, if desired, can then be crushed sufficiently to form a particle distribution of from about 100 microns to about 500 microns, and more preferably from about 100 microns to about 300 microns. These particles can then be pressed into anodes and sintered for anode production using conventional techniques known to those skilled in the art. As shown in the examples, the crush strength of the surface-passivated niobium powder of the present invention are significantly improved compared to previous niobium powders and further have significantly lower leakage.

The present invention also relates to a capacitor in accordance with the present invention having a niobium oxide film on the surface of the capacitor. Preferably, the film is a niobium pentoxide film. The capacitor of the present invention can be formed by any method, for example, as described in U.S. Pat. Nos. 6,527,937 B2; 6,462,934 B2; 6,420,043 B1; 6,375,704 B1; 6,338,816 B1; 6,322,912 B1; 6,616,623; 6,051,044; 5,580,367; 5,448,447; 5,412,533; 5,306,462; 5,245,514; 5,217,526; 5,211,741; 4,805,704; and 4,940,490, all of which are incorporated herein in their entireties by reference. For instance, a capacitor can be formed which is impregnated with an electrolyte, such as a polymer or $MnO_2$. As an example, certain oxygen reduced niobium oxides of the present invention can be more useful with a polymer electrolyte or other oxygen reduced niobium oxides of the present invention can be favorable with $MnO_2$. For instance, when oxygen reduced niobium oxides of the present invention have a mono-modal porosity curve which, for instance, can be formed by using a heat treatment prior to reaction of less than or equal to about 1150° C., these oxygen reduced niobium oxides may be more favorably used with a polymer electrolyte because, for instance, of the high capacitance, higher sinter crush, and mono-modal porosity curve. Further, other oxygen reduced niobium oxides, for instance, having a porosity curve with an extended shoulder out to 10 microns or more may be more useful for impregnation with $MnO_2$. These oxygen reduced niobium oxides, for instance, can be formed at a higher heat treatment temperature prior to reaction such as greater than or equal to about 1,300° C.

In the alternative, the niobium of the present invention can be used as the starting niobium and mixed with a starting niobium oxide, e.g., $Nb_2O_5$, to form oxygen reduced niobium oxides, as described in U.S. Pat. Nos. 6,416,730; 6,391,275; and 6,322,912; U.S. patent application Ser. No. 09/533,430 filed Mar. 23, 2000; and U.S. Provisional Patent Application Nos. 60/100,629 filed Sep. 16, 1998; 60/229,668 filed Sep. 1, 2000; and 60/246,042 filed Nov. 6, 2000 and all of these applications are incorporated herein by reference in their entirety.

Preferably, the granules of the present invention have a capacitance of from about 35,000 to about 300,000 CV/g and a leakage current of from about 0.2 to about 2 nA/CV when said granules are sintered at a temperature of 1125° C. for 10 minutes at a $V_f$ of 40 V. The niobium of the present invention can be sintered at a range of different temperatures, such as from about 1050° C. to 1300° C. Preferred formation voltages include from about 20V to about 40V.

The niobium powders of the present invention have a variety of beneficial properties and characteristics. The niobium powders can have a primary particle size ($D_{50}$) of less than 1 micron (e.g., 0.75 micron to about 0.9 micron) to about 5 microns. Preferably, the primary particle size is from about 1 micron to about 4 microns. Other suitable ranges include from about 2 microns to about 3 microns, from about 3 microns to about 4 microns, less than 1 micron, or from about 1 micron to about 2 microns, and the like.

The niobium powders of the present invention, in one embodiment, can be in granulated or granule form. The granule size can be a variety of sizes such as from about 30 microns to about 1,000 microns. These granules can have a spherical shape though other shapes are possible. Also, a combination of spherical and other shapes can be present. The niobium powders also can have an oxygen content. The oxygen content is preferably at least 1,000 ppm or higher. Preferred ranges include from about 5,000 ppm to about 28,000 ppm or higher. These oxygen contents are preferably with respect to the primary particles of the niobium powder. Suitable ranges of oxygen contents for the niobium powder include, but are not limited to, from about 5,000 ppm to about 28,000 ppm, from about 15,000 ppm to about 22,000 ppm, from about 22,000 ppm to about 28,000 ppm, from about 35,000 ppm to 55,000 ppm, and from about 5,000 ppm to about 15,000 ppm.

The niobium powders can also have a variety of BET surface areas. The BET surface areas are with respect to the primary particles. Suitable BET surface areas include, but are not limited to, at least 0.5 micron or higher m$^2$/g. Other ranges include a BET surface area of from about 1 m$^2$/g to about 4.5 m$^2$/g or higher, from about 1 m$^2$/g to about 2 m$^2$/g, from about 2 m$^2$/g to about 3 m$^2$/g, from about 3 m$^2$/g to about 4.5 m$^2$/g, from about 5 m²/g to about 7 m²/g, and various ranges in between these BET surface area sizes.

As indicated above, the niobium granules can have beneficial flow properties such as greater than about 300 mg/s using the flow test previously described.

The niobium powder in granulated form or non-granulated form can have beneficial electrical properties. For instance, when the niobium granules of the present invention are pressed and sintered, beneficial capacitance and/or low leakage properties are exhibited. In more detail, when the niobium granules of the present invention are sintered at a temperature of from about 1050° C. to about 1250° C. for 10 minutes and formed at 40 volts, wherein the granules are pressed at 2.8 g/cc, the sintered niobium granules exhibit a capacitance of from about 35,000 to about 300,000 CV/g and/or having leakage current of from about 0.2 to about 2 nA/CV. Other capacitance and low leakage values are possible depending upon the sintering conditions, the sintering time, the formation voltage, and the like.

Also, the niobium granules of the present invention independently of other properties preferably have a bimodal pore size distribution. In other words, when the pore size distribution of the pressed and sintered Nb granules is measured, and depicted by a graph, at least two peaks are detected with respect to the primary pore size distribution. Preferably, the pore size distribution is from about 0.1 to about 10 microns. This bimodal pore size distribution is especially beneficial for counterelectrode impregnation thus forming a suitable capacitor or part thereof.

The niobium granules when they are pressed and sintered preferably have a diametric shrinkage that is quite beneficial such as from about 1 to about 12%. Furthermore, the Nb granules once they are pressed and sintered and form a body of granules preferably have a BET surface area of from about 0.5 to about 4.0 m²/g. Other BET surface areas are possible. The niobium granules of the present invention can preferably be pressed at a pressed density of from about 2.4 to about 3.5 g/cc.

Furthermore, the niobium, e.g., niobium granules, preferably have low metal and other impurities such as low Fe, Ni, Cr, C, and other metal impurities. Preferably, these impurities are less than 500 ppm and more preferably less than 100 ppm, excluding gases.

The niobium powder including the niobium granules of the present invention can be formed into capacitor parts such as capacitor anodes using conventional capacitor formation techniques which can include one or more of the techniques mentioned above. Thus, one embodiment of the present invention is a capacitor anode containing the niobium powders of the present invention, and having the remaining aspects of an anode and capacitor, e.g., dielectric layer and the like.

Furthermore, with respect to the numerous beneficial properties described above, such as the primary particle size ($D_{50}$), BET surface area, flow properties, oxygen contents, electrical properties, and the like, it is important to appreciate that for purposes of the present invention, the niobium powder can have at least one of these characteristics, or two or more of these characteristics, or all of these characteristics. Any combination of properties and characteristics is possible.

For instance, the niobium powder of the present invention can have a primary particle size ($D_{50}$) of from about 3 to about 4 microns and a granule size, once granulated, of from about 30 to about 1,000 microns. These niobium powders can also have a BET surface area of from about 1 to about 2 m²/g and optionally an oxygen content of from about 5,000 ppm to about 15,000 ppm. In another embodiment, niobium powders can have a primary particle size of from about 2 to about 3 microns and once granulated, can have a granule size of from about 30 microns to about 1,000 microns. These niobium powders can also have a BET surface area of from about 2 to about 3 m²/g and optionally oxygen contents of from about 5,000 ppm to about 22,000 ppm and more preferably from about 15,000 ppm to about 22,000 ppm.

In another embodiment, niobium powders can have a primary particle size ($D_{50}$) of from about 1 micron to about 2 microns, and once granulated, have a granule size of from about 30 microns to about 1,000 microns. These niobium powders can also have a BET surface area of from about 3 to about 4.5 m²/g and optionally oxygen contents of from about 5,000 ppm to about 28,000 ppm or more, and preferably from about 22,000 ppm to about 28,000 ppm.

In another embodiment, niobium powders of the present invention can have a primary particle size ($D_{50}$) of less than 1 micron and once granulated, can have a granule size of from about 30 to about 1,000 microns. These powders can also have a BET surface area greater than 4.5 m²/g and can optionally have oxygen contents of from about 5,000 ppm to 28,000 ppm or higher and more preferably 8,000 ppm or higher.

The following paragraphs relate to one preferred embodiment. As indicated, the primary particles of the niobium powder preferably have a spherical or essentially a spherical shape. Furthermore, the granules of the niobium of the present invention also preferably have a spherical or substantially spherical shape. When the powders of the present invention are granulated but not sintered, the agglomerates are essentially soft agglomerates. In other words, these agglomerates can easily break up upon hitting a hard surface. Furthermore, when a soft agglomerate does break, the powders return rather easily to their primary particle make-up. In addition, when the soft agglomerates are formed, the primary particles can easily be identified by SEM techniques. In other words, there is generally no necking of the primary particles with each other and the shapes which are essentially spherical are maintained even when granulated. Also, when the granules are heat treated and/or sintered, this results in a hard agglomerate. Importantly, spherical primary particles even after being sintered essentially maintain their spherical shape and there is necking of particles with adjacent particles. Essentially, the primary particles maintain their structural shape and integrity even though they are in contact with each other. This is quite beneficial with respect to creating a favorable pore distribution throughout the sintered body. Again, the sintered body of granules, even under an SEM analysis, essentially maintains their primary particle shape and are easily identifiable as primary particles.

In one embodiment of the present invention, a method to at least partially reduce a niobium oxide according to the present invention includes heat treating a starting niobium oxide in the presence of a getter material and in an atmosphere which permits a transfer of oxygen atoms from the starting niobium oxide to the getter material, for a time and at a temperature sufficient to form an oxygen reduced niobium oxide, wherein the getter material is or includes titanium. Preferably, the getter material is a titanium sponge.

For purposes of the present invention, the term "morphology" can denote the shape, microstructure, form, and/or other observable or nonobservable characteristics of the starting niobium oxide, intermediate niobium oxides, or niobium suboxides of the present invention. Preferably, the morphology can be determined upon visual inspection utilizing scanning electron microscope photographs (SEMs) or micrographs as desired. Other properties may be determined by procedures which are known and generally utilized in the relevant art.

In detail, the starting niobium oxide used in the present invention can be at least one oxide of niobium metal and/or alloys thereof. A specific example of a starting niobium oxide is $Nb_2O_5$. The starting niobium oxide can have any morphology, and preferably has an interconnected or cellular morphology. The starting niobium oxide can be in any shape or size. Preferably, the starting niobium oxide is in the form of a powder or a plurality of particles. Examples of the type of powder that can be used include, but are not limited to, flaked, angular, nodular, spherical, and mixtures or variations thereof. Preferably, the starting niobium oxide is in the form of a powder that more effectively leads to the niobium suboxide. Examples of such preferred starting niobium oxide powders include those having mesh sizes of from about 60/100 to about 100/325 mesh and from about 60/100 to about 200/325 mesh. Another range of size is from −40 mesh to about +325 mesh, or a size of −325 mesh. Preferably, the starting niobium oxide has an average primary particle size ($D_{50}$) of from about 0.25 to about 5 microns, and a BET surface area of at least about 0.5 $m^2/g$, for example, from about 1 to about 8 $m^2/g$. The starting niobium oxide preferably has a particle size distribution range in which the $D_{10}$, $D_{90}$, or both is within 300% of the $D_{50}$. The starting niobium oxide preferably has an apparent density of from about 0.3 to about 2.0 g/cc. The starting niobium oxide preferably has a porous microstructure (due to mean pore size, the number of pores, and/or total pore volume) having pores of from about 0.1 to about 100 micrometers. The starting niobium oxide preferably has a pore volume of from about 10 to about 90%. The starting niobium oxide can have a monomodal or a multimodal pore size distribution, and preferably has a bimodal pore size distribution. Measurements relating to the porosity of the starting niobium oxide can be made, for example, as described in U.S. Pat. Nos. 6,576,038 B1, and 6,479,012 B1, and Published U.S. patent application Ser. Nos. 2003/0115985, and 2002/0033072, each of which is incorporated in its entirety herein by reference. The starting niobium oxide preferably has excellent flow properties such as from about 100 to about 2000 mg/s or more, and more preferably at least about 200 mg/s as measured by ASTM B213 using a 3 mm diameter orifice. The starting niobium oxide can contain a range of modifying agents or additives or dopants, including nitrogen, silicon, phosphorous, boron, carbon, sulfur, yttrium, or combinations thereof. The starting niobium oxide can be nitrided and/or contain a nitride layer.

The oxygen-active or getter material used in practicing the present invention can be any solid or non-solid material containing titanium that is capable of reducing the starting niobium oxide to an oxygen reduced niobium oxide or niobium suboxide. The getter material can be any material containing titanium that facilitates the removal of oxygen atoms from the starting niobium oxide. Preferably, the getter material is an oxygen-active titanium material that has a greater affinity for oxygen than does the starting niobium oxide. Preferably, the getter material is a titanium-containing substance that allows the starting niobium oxide to be at least partially reduced without substantially alteration of the morphology of the starting niobium oxide in the process. The getter material can be any commercially available titanium material and/or titanium material that is prepared by any known method.

The getter material for purposes of the present invention is any material containing titanium metal that can remove or reduce at least partially the oxygen in the niobium oxide. Thus, the getter material can be an alloy (e.g., Ti—Zr), or a material containing mixtures of titanium metal with other constituents. Preferably, the getter material is predominantly, if not exclusively, titanium metal. The purity of the getter material is not important but it is preferred that the getter material comprise high purity titanium to avoid the introduction of undesirable impurities during the heat treating process. Accordingly, the titanium metal in the getter material preferably has a purity of at least about 98%, and more preferably at least about 99%. Preferably, impurities that affect DC leakage, such as iron, nickel, chromium, and carbon, are below about 100 ppm.

The getter material can be in any size, shape, or form such as sheet, sponge, or powder material. Preferably, the getter material is in a form having a superior surface area for reducing the niobium oxide. For instance, the getter material can be in the form of a tray which contains the starting niobium oxide or can be in a particle or powder size. The getter material can be flaked, spherical, angular, nodular, and mixtures or variations thereof, e.g., coarse granular material having a particle size of from about 0.1 to about 10 mm that can be readily separated from the niobium suboxide by screening or by acid leaching, for instance. Most preferably, the getter material is a titanium sponge metal. The titanium sponge can be any commercially available titanium sponge and/or titanium sponge produced by any known method, as described, for example, in U.S. Pat. No. 6,226,173, which is incorporated herein in its entirety by reference.

Preferably, the titanium sponge has a morphology that leads to efficient mass transfer kinetics in the reduction process, which results in a smaller quantity of getter material necessary to reduce a given amount of starting niobium oxide. Preferably, the titanium sponge has a morphology characterized in that it readily reacts with oxygen atoms from the starting niobium oxide. For example, the titanium sponge preferably has a high accessible surface area to volume ratio. The titanium sponge preferably has a specific (BET) surface area, such as a BET of from about 0.01 to about 2 $m^2/g$ and more preferably of from about 0.01 to about 0.1 $m^2/g$. As another example, the titanium sponge preferably has a microporous structure (due to mean pore size, the number of pores, and/or total pore volume) having many accessible (i.e., not enclosed), large pores. Preferably, the titanium sponge has pores of from about 10 to about 100,000 nanometer (nm). The titanium sponge preferably has a pore volume of from about 10 to about 80%. Preferably, the titanium sponge has a high surface area as well as an easily accessible open porosity.

Generally, a sufficient amount of getter material is present to at least partially reduce the niobium oxide being heat treated. Further, the amount of the getter material is dependent upon the amount of reducing desired to the niobium oxide. For instance, if a slight reduction in the niobium oxide is desired, then the getter material will be present in a stoichiometric amount. Similarly, if the niobium oxide is to be reduced substantially with respect to its oxygen presence, then the getter material is present in an amount of about 2 to 5 times stoichiometric amount. Generally, the amount of getter material (e.g., based on the getter material being 100% titanium) can be present in a getter material to starting niobium oxide ratio of from about 0.25 to 0.50 to about 1.5 to 2.0. Preferably, the getter material and the starting niobium oxide are present in a wt. ratio of about 1: less than 4.

An example of a preferred reduction of $Nb_2O_5$ to NbO can be generally represented as follows:

$$2Nb_2O_5 + 3Ti = 4NbO + 3TiO_2 \qquad \text{(Eq. 4)}$$

As can be seen from Eq. 4, the reduction process preferably involves the transfer of oxygen atoms from the starting niobium oxide, e.g., niobium pentoxide, to the getter material, e.g., titanium sponge, to form the desired niobium suboxide and a titanium oxide. The niobium suboxide is any niobium oxide which has a lower oxygen content in the metal oxide compared to the starting niobium oxide. The niobium suboxide can have oxygen levels that are less than stoichiometric for a fully oxidized niobium. Typical niobium suboxides comprise NbO, $NbO_{0.7}$, $NbO_{1.1}$, $NbO_2$, and any combination thereof with or without other oxides present. Generally, the niobium suboxide of the present invention has an atomic ratio of niobium to oxygen of about 1:less than 2.5, and preferably 1:2 or less, or 1: less than 1.5, and more preferably 1:1.1, 1:1, or 1:0.7. In other words, the niobium suboxide preferably has the formula $Nb_xO_y$, wherein Nb is niobium, x is 2 or less, and y is less than 2.5x. More preferably x is 1 and y is less than 2, such as 1.1, 1.0, 0.7, and the like. Preferably, the niobium suboxide of the present invention is an NbO, an oxygen depleted NbO, an aggregate or agglomerate which contains NbO and niobium metal, or a niobium metal with a rich oxygen content. Unlike NbO, $NbO_2$ is less desirable due to its resistive nature, whereas NbO is very conductive. Accordingly, capacitor anodes which are formed from NbO, oxygen depleted NbO, or a mixture of NbO with niobium metal are desirable and preferred for purposes of the present invention.

According to one embodiment, the reduction process of the present invention provides the desired control over the morphology, microstructure, particle size distribution, and the like of the final product, i.e., the niobium suboxide. Preferably, the starting niobium oxide and the niobium suboxide have substantially similar morphologies, and more preferably, substantially indistinguishable morphologies. Preferably, the niobium oxide remains in a solid state throughout the reduction process. Preferably, the starting niobium oxide has a cellular or porous microstructure, and the niobium suboxide has a cellular or porous microstructure.

The heat treatment of the starting niobium oxide can be achieved in any heat treatment device or furnace commonly used in the heat treatment of metals, such as niobium and tantalum. For instance, heat treating can be conducted in any reaction system or reactor such as a retort, vacuum chamber, vacuum furnace, or a vacuum kiln, as described, for example, in U.S. Pat. Nos. 6,380,517 B2; 6,271,501 B1; and 6,105,272 each of which is incorporated in its entirety herein by reference. The heat treatment of the starting niobium oxide in the presence of the getter material is at a temperature and for a time sufficient to form the niobium suboxide. The temperature and time of the heat treatment can be dependent on a variety of factors such as the amount of reduction of the niobium oxide, the amount and type of the getter material, as well as the type of starting niobium oxide. Generally, heat treating the niobium oxide can be at a temperature of from less than or about 800 to about 1,900° C., and more preferably is from about 800 to about 1,400° C., and most preferably is from about 800 to about 1,100° C., for a time of from about 5 to about 600 minutes, and more preferably of from about 30 to about 120 minutes.

The getter material need not be in physical contact with the starting niobium oxide, but is preferably disposed in close proximity to the niobium oxide. The getter material can be blended or mixed together with the starting niobium oxide prior to or during the heat treatment. The titanium oxide formed in the reaction process, and any residual titanium can be substantially removed from the oxygen reduced niobium oxide by screening or sieving techniques, for example, and/or by leaching in a concentrated hydrofluoric, HCl, or nitric acid solution, i.e., acid leaching, for instance.

Heat treatment is preferably achieved in an atmosphere that permits the transfer of oxygen atoms from the niobium oxide to the getter material (e.g., a hydrogen atmosphere), and preferably at a temperature of from about 900 to about 1,100° C. Preferably, the atmosphere is under vacuum or is an inert atmosphere. Gas(es) such as hydrogen and argon can be, but need not be present in the atmosphere. Preferably, the atmosphere is present during the heat treatment at a pressure of from about $1 \times 10^{-5}$ to about 2,000 torr, and more preferably from about 100 to about 1,000 torr, and most preferably from about 100 to about 930 torr. During the reacting process, a constant heat treatment temperature can be used during the entire reacting process or variations in temperature or temperature steps can be used. For instance, the atmosphere can be initially admitted at 900° C., followed by an increase in the temperature to 1,000° C. for 30 minutes, followed by a decrease in the temperature to 1,000° C., and held there until removal of the atmosphere. After the atmosphere is removed, the furnace temperature can be dropped. Variations of the above steps can be used to suit any preferences of the industry. Routine testing in view of the present application will permit one skilled in the art to readily control the times and temperatures of the heat treatment to obtain the proper or desired reduction of the niobium oxide.

In general, the materials, processes, and various operating parameters as described in U.S. Pat. Nos. 6,563,695 B1; 6,527,937 B2; 6,517,645 B2; 6,462,934 B2; 6,432,161 B1; 6,420,043 B1; 6,416,730 B1; 6,402,066 B1; 6,391,275 B1; 6,338,832 B1; 6,338,816 B1; 6,322,912 B1; 6,312,642 B1; 6,231,689 B1; 6,165,623; 6,071,486; 6,051,044; 6,051,326; 5,993,513; 5,986,877, 5,954,856; 5,580,516; 5,284,531; 5,261,942; 5,242,481; 5,234,491; 5,171,379; 4,960,471; 4,722,756; 4,684,399; and 4,645,533, and Published U.S. patent application Ser. Nos. 2003/0115985 A1; 2003/0082097 A1; 2003/0057304 A1; 2003/0037847 A1; 2003/0026756 A1; 2003/0003044 A1; 2002/0172861 A1; 2002/0135973 A1; 2002/0072475 A1; 2002/0028175 A1; 2002/0026965 A1; and 2001/0036056 A1, can be used in the present invention, and each are incorporated herein in their entirety by reference.

The various niobium suboxides of the present invention can be further characterized by the electrical properties resulting from the formation of a capacitor anode using the niobium suboxides of the present invention. In general, the niobium suboxides of the present invention can be tested for electrical properties by pressing powders of the niobium suboxide into an anode and sintering the pressed powder at appropriate temperatures and then anodizing the anode to produce an electrolytic capacitor anode which can then be subsequently tested for electrical properties.

Accordingly, another embodiment of the present invention relates to anodes for capacitors formed from the niobium suboxides of the present invention. The capacitor of the present invention can be formed by any method, for example, as described in U.S. Pat. Nos. 6,576,099 B2; 6,576,038 B1; 6,563,695 B1; 6,562,097 B1; 6,527,937 B2; 6,479,012 B1; 6,462,934 B2; 6,420,043 B1; 6,416,730 B1, 6,375,704 B1; 6,373,685 B1, 6,338,816 B1; 6,322,912 B1; 6,165,623; 6,051,044; 5,986,877, 5,580,367; 5,448,447; 5,412,533; 5,306,462; 5,245,514; 5,217,526; 5,211,741; 4,805,704; and 4,940,490, and Published U.S. patent application Ser. Nos. 2003/0115985 A1; 2003/0026756 A1; 2003/0003044 A1; 2002/0179753 A1; 2002/0152842 A1; 2002/0135973 A1; 2002/0124687 A1; 2002/0104404 A1; 2002/0088507 A1; 2002/0072475 A1; 2002/0069724 A1; 2002/0050185 A1; 2002/0028175 A1; and 2001/0048582 A1, each of which is incorporated herein in its entirety by reference. The capacitors can be used in a variety of end uses such as automotive electronics, cellular phones, computers, such as monitors, mother boards, and the like, consumer electronics including TVs and CRTs, printers/copiers, power supplies, modems, computer notebooks, disc drives, and the like. Anodes can be made from the powdered form of the niobium suboxides in a similar process as used for fabricating metal anodes, i.e., pressing porous pellets with embedded lead wires or other connectors followed by optional sintering and anodizing. The lead connector can be embedded or attached at any time before anodizing. Anodes made from some of the niobium suboxides of the present invention can have a capacitance of from about 1,000 CV/g or lower to about 400,000 CV/g or more, and other ranges of capacitance can be from about 20,000 to about 300,000 CV/g or from about 62,000 to about 200,000 CV/g, and preferably from about 40,000 to about 400,000 CV/g. In forming the capacitor anodes of the present invention, a sintering temperature can be used which will permit the formation of a capacitor anode having the desired properties. The sintering temperature will be based on the niobium suboxide used. Preferably, the sintering temperature is from about 1,200 to about 1,750° C. and more preferably from about 1,200 to about 1,400° C. and most preferably from about 1,300 to about 1,400° C.

The sintering temperature in the formation of a capacitor anode of the present invention can be accomplished at a variety of temperatures. For instance, the sintering temperature can be conducted at about 800° C. or lower to about 1,750° C. or higher. When lower temperatures are used such as on the order of from about 900° C. or lower to about 1,100° C., sintering can occur for any sufficient time to result in a capacitor anode that provides capacitance. When lower sintering temperatures are used to form the capacitor anodes of the present invention, the sintering time is preferably longer than conventional times used for forming capacitor anodes in general. For instance, the sintering times can be from about 1 to about 10 hours or more (e.g., 1 or more days). As a more specific example, sintering times can be from about 1 to about 5 hours or from about 2 to about 4 hours. These long sintering times at low sintering temperatures preferably results in an acceptable capacitance for the capacitor anode as well as a low DC leakage such as below about 0.5 nA/CV. In addition, less shrinkage occurs at these lower sintering temperatures that preferably yield a more desirable pore structure. For example, with lower sintering temperatures using the anodes of the present invention, the number of pores is greater and the diameter of these pores is larger which results in very beneficial properties in using these capacitor anodes in electrical applications. For example, these improved properties with respect to the number of pores and size of the pores further results in achieving maximum capacitance retention through the capacitor manufacturing process. Accordingly, when the various preferred embodiments of the present invention are used, such as the milling options described above as well as using lower sintering temperatures, a whole host of improved properties are achieved with respect to the powder and the resulting capacitor anode as described herein. Generally, the lower the sintering temperature, the longer the sintering time for purposes of achieving the desirable properties such as capacitance, low DC leakage, and other properties. Thus, if the sintering temperature is more on the order of about 800° C. the sintering time will be much longer compared to a sintering temperature of 1,100° C. or more. As stated above and shown in the examples, the sintering time can be a variety of different times pending upon the desired properties of the resulting capacitor anode.

The anodes formed from the niobium oxides of the present invention are preferably formed at a voltage ($V_f$) of from about 6 to about 80 volts or more and preferably at about 10 to 40 volts. When a niobium suboxide is used, preferably, the forming voltages are from about 6 to about 80 V, and more preferably from about 10 to about 40 volts. The DC leakage achieved by the niobium oxides of the present invention have provided excellent low leakage at high formation voltages. Also, the anodes formed from the niobium suboxides of the present invention preferably have a DC leakage of less than about 5.0 nA/CV. In an embodiment of the present invention, the anodes formed from some of the niobium suboxides of the present invention have a DC leakage of from about 5.0 nA/CV to about 0.1 nA/CV.

The present application also can be applied to other valve metal suboxides such as those described in U.S. Pat. No. 6,322,912, incorporated in its entirety by reference herein.

While the above-described embodiments have been discussed using niobium as one preferred material, the present invention equally applies to other valve metals and hydrided forms thereof as described, for example, in U.S. Pat. No. 6,322,912 B1, which is incorporated in its entirety by reference herein.

The powder, granules, pressed and/or sintered versions, and anodes thereof can be packaged using vacuum packing, such that the oxygen permeability is less than 1.0 cc/100 in$^2$/day and more preferably is less than 0.01 cc/100 in$^2$/24 hrs. Bags from Fres-Co System USA can be used optionally in conjunction with a Fres-Co vacuum packaging machine or other similar packaging device.

The capacitors of the present invention can be used in a variety of end uses such as automotive electronics, cellular phones, computers, such as monitors, mother boards, and the like, consumer electronics including TVs and CRTs, printers/copiers, power supplies, modems, computer notebooks, disc drives, and the like.

The powder, granules, pressed and/or sintered versions, and anodes thereof can be packaged using vacuum packing, such that the oxygen permeability is less than 1.0 cc/100 in$^2$/day and more preferably is less than 0.01 cc/100 in$^2$/24 hrs. Bags from Fres-Co System USA can be used optionally in conjunction with a Fres-Co vacuum packaging machine or other similar packaging device.

The present invention will be further clarified by the following examples, which is intended to be exemplary of the present invention.

EXAMPLES

Example 1

According to an embodiment of the invention, niobium powder (200 g) having a BET surface area of 4.1 m$^2$/g and starting niobium oxide (161 g), i.e., niobium pentoxide, with a BET surface area of 1.3 m$^2$/g were mixed together to form a powder mixture. The powder mixture was then granulated and screened to a granular size of about −40 mesh. The granular powder mixture was then placed into a vacuum heat treatment furnace and heated under vacuum to about 700° C. for about 2 hours. Hydrogen gas was then admitted to the furnace to a pressure of about 960 Torr. The temperature in the furnace was then brought to about 850° C. and held for about 1 hour. After formation, the oxygen reduced niobium oxide was tested for certain properties which are set forth in Table 1. Three more trials were made with three more sample lots of niobium powder and starting niobium oxide wherein the above described method was repeated with heat treatment temperatures of 900, 1,100, and 1,300° C., respectively. In these trials, after the heat treatment under vacuum, the powder mixture was cooled to below 850° C. before the hydrogen gas was admitted to the furnace. The oxygen reduced niobium oxide formed in the three trials were tested for same properties as for the final product of the first trial, and the results are set forth in Table 1. Table 1 also includes the observed properties of an oxygen reduced niobium oxide in which the step of heat treatment under vacuum was omitted. The pore size distribution and cumulative pore volumes for the pressed and sintered oxygen reduced niobium oxides formed in the five trials were also determined and are graphed in FIGS. 1 and 2, respectively. In addition to the particular properties set forth in Table 1 and in FIGS., 1 and 2, it was observed that the oxygen reduced niobium oxides could also be pressed at lower press densities and still maintain acceptable crush.

TABLE 1

| NbO Trial # | Nb + Nb2O5 Mixing Method | Nb Type | Nb Final BET m2/g | Nb2O5 BET m2/g | Nb/O Mole Ratio |
|---|---|---|---|---|---|
| 1 | BMA | SFG | 4.16 | 1.34 | 0.98 |
| 2 | BMA-HT-700 | SFG | 4.16 | 1.34 | 0.98 |
| 3 | BMA-HT-900 | SFG | 4.16 | 1.34 | 0.98 |
| 4 | BMA-HT-1100 | SFG | 4.16 | 1.34 | 0.98 |

TABLE 1-continued

| 5 | BMA-HT-1300 | SFG | 4.16 | 1.34 | 0.98 |

POST REACTION TEST DATA

| NbO Trial # | React BET m2/g | Scott g/in3 | Crush Lb | CV/g 2.5 V | CV/g 10 V | DCL @ 180 sec nA/CV | Shrink % | Anode BET m2/g |
|---|---|---|---|---|---|---|---|---|
| 1 | 3.42 | 14.6 | 4.65 | 86530 | 71111 | 0.54 | 8.78 | 1.184 |
| 2 | 3.16 | 18.8 | 3.87 | 80364 | 68199 | 0.15 | 8.5 | 1.116 |
| 3 | 3.01 | 18.8 | 3.62 | 87694 | 72610 | 0.15 | 6.5 | 1.164 |
| 4 | 2.59 | 20.1 | 1.94 | 78849 | 71429 | 0.78 | 3 | 1.074 |
| 5 | 1.40 | 21.2 | 0.87 | 74258 | 62722 | 0.14 | 1 | 0.931 |

HT = Heat Treatment under vacuum at stated temp ° C.
BMA = Ball Milled and Agglomerated with water with agitation
SFG = Super fine granular-nodular Example 2

According to an embodiment of the invention, niobium hydride powder (20 g) having a BET surface area of 3.9 m2/g and starting niobium oxide (16.1 g), i.e. niobium pentoxide, with a BET surface area of 3.9 m2/g were mixed together to form a powder mixture. The powder mixture was then attritor milled (comilled) in water for 2 hours using 3/16 Nb media. The powder slurry was vacuum dried at 120° C. and granulated by passing the dried powder over a 50 mesh screen. The granular powder mixture was then placed into a vacuum heat treatment furnace and heated to 1100° C. for about 2 hours. The temperature in the furnace was then brought to about 850° C. and hydrogen gas was admitted to the furnace to a pressure of about 960 Torr and held for about 1 hour. After formation, the oxygen reduced niobium oxide was tested for certain properties which are set forth in Table 2. In addition, sample lots of niobium hydride and niobium pentoxide were mixed as described above without the attritor milling step. Powder mixtures were granulated and heat treated as described above. The oxygen reduced niobium oxide formed in this manner was tested in the same manner and the results are set forth in Table 2. The pore size distribution and cumulative pore volumes for the press and sintered oxygen reduced niobium oxides at 2.8 g/cc are shown in FIGS. 3 and 4.

Example 3

Figure 7:
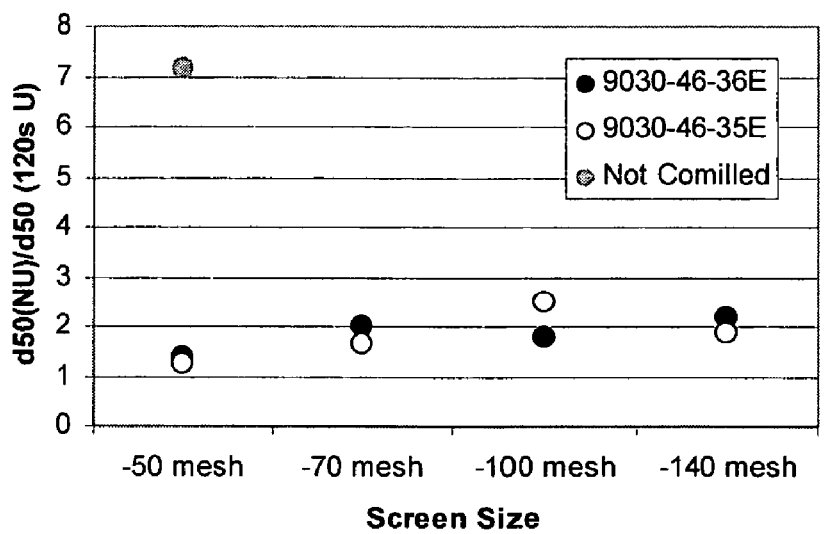
FIG. 7 is a graph showing the granule strengths of various oxygen reduced niobium oxide powders at various mesh screen sizes.

According to an embodiment of the invention, niobium hydride powder (400 g) having a BET surface area of 3.9 m2/g and starting niobium oxide (322 g), i.e. niobium pentoxide, with a BET surface area of 3.9 m2/g were mixed together to form a powder mixture. The powder mixture was then attritor milled (comilled) in water for 2 hours using 3/16" Nb media. The powder slurry was vacuum dried at 120° C. and granulated by passing the dried powder over a 50 mesh screen. In addition, some of the powder was passed over a 70 mesh, 100 mesh and 140 mesh screen. The sample passing through the appropriate screen was collected. The granular powder mixture was then placed into a vacuum heat treatment furnace and heated to 1400° C. for about 2 hours. The temperature in the furnace was then brought to about 850° C. and hydrogen gas was admitted to the furnace to a pressure of about 960 Torr and held for about 1 hour. After formation, the oxygen reduced niobium oxide powders were tested for certain properties which are set forth in Table 3. The pore size and cumulative pore volumes for the pressed and sintered oxygen reduced niobium oxides screened at different mesh sizes were also determined and are. graphed in FIGS. 5 and 6. In addition to the tests performed in Table 3 and FIGS. 5 and 6, it was observed that the granules had a high degree of strength. Granules that were heat treated were subjected to particle size measurement that included with and without sonication of an ultrasonic probe. A ratio of the $d_{50}$ values without and with sonication for two minutes was determined and plotted in FIG. 7. As shown in FIG. 7 granulated samples had ratios of ~2 or less and the granule strengths were independent of granule size.

TABLE 3

| Lot # | granule size mesh | Scott g/in3 | Crush lbs | Flow s/25 g | CV/g 1.5 V | CV/g 10 V | DCL 180 s | Shrink % | d50/d50 |
|---|---|---|---|---|---|---|---|---|---|
| 9030-30-46-36E | −50 | 23 | 0.89 | 20.4 | 111990 | 80200 | 0.15 | 0.41 | 1.36 |
| 9030-30-46-36E1 | −70 | 22.3 | 0.8 | 21 | 112100 | 80300 | 0.12 | 0.43 | 2.02 |
| 9030-30-46-36E2 | −100 | 21 | 1.39 | 23.3 | 112500 | 80100 | 0.11 | 0.6 | 1.79 |
| 9030-30-46-36E3 | −140 | 20.4 | 1.29 | 34 | 111500 | 79900 | 0.12 | 0.56 | 2.1 |

Example 4

According to an embodiment of the invention, niobium hydride powder (140 g) having a BET surface area of 3.9 m2/g and starting niobium oxide (91.5 g), i.e. niobium pentoxide, with a BET surface area of 3.9 m2/g were mixed together to form a powder, mixture. The powder mixture was then attritor milled (comilled) in water for 2 hours using 3/16" Nb media. The powder slurry was vacuum dried at 120° C. and granulated by passing the dried powder over a 50 mesh screen. In addition, some of the powder was passed over a 70 mesh, and 100 mesh. The samples passing through the appropriate screen was collected. The granular powder mixture was

TABLE 2

| Lot # | Scott g/in3 | Flow s/25 g | Crush lbs | CV/g 1.5 V | CV/g 10 V | DCL 180 s | Shrink % | Anode BET m2/g | Comilled |
|---|---|---|---|---|---|---|---|---|---|
| 9026-91-B6 | 24 | 18 | 7.2 | 137500 | 94500 | 0.19 | 5.95 | 1.53 | yes |
| 9026-30-2A | 23.5 | 23 | 2.81 | 129466 | 87000 | 0.15 | 4.07 | 1.46 | no | then placed into a vacuum heat treatment furnace and heated to 1400° C. for about 2 hours. The temperature in the furnace was then brought to about 850° C. and hydrogen gas was admitted to the furnace to a pressure of about 960 Torr and held for about 1 hour. After formation, the oxygen reduced niobium oxide powders were tested for certain properties which are set forth in Table 4.

Figure 8:
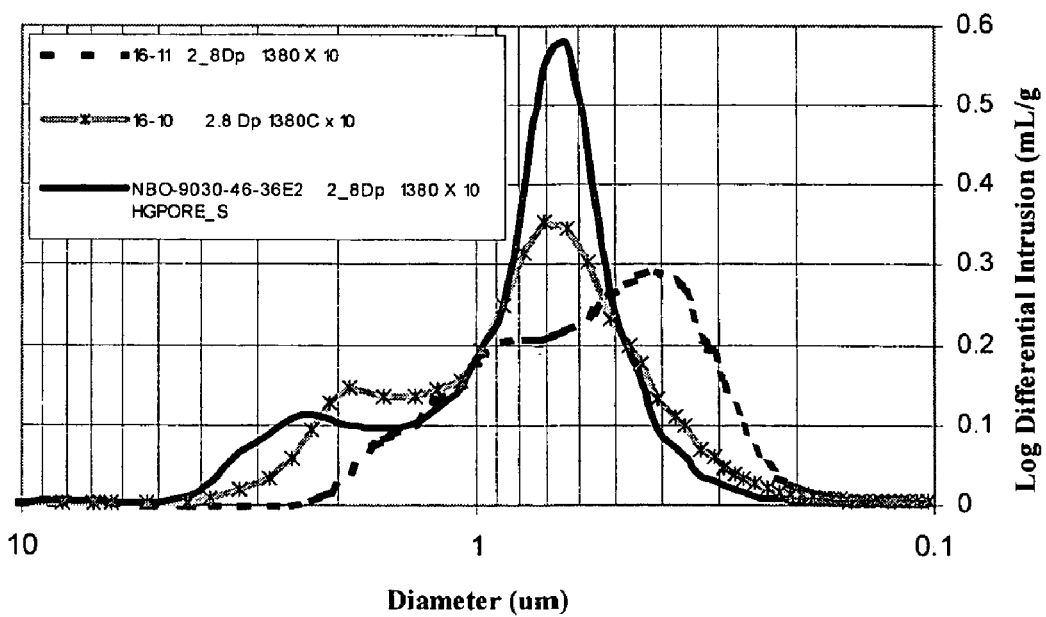
FIGS. 8-9 are graphs of pore size distributions and cumulative pore volumes of various oxygen reduced niobium oxide powders that are pressed and sintered.
Figure 9:
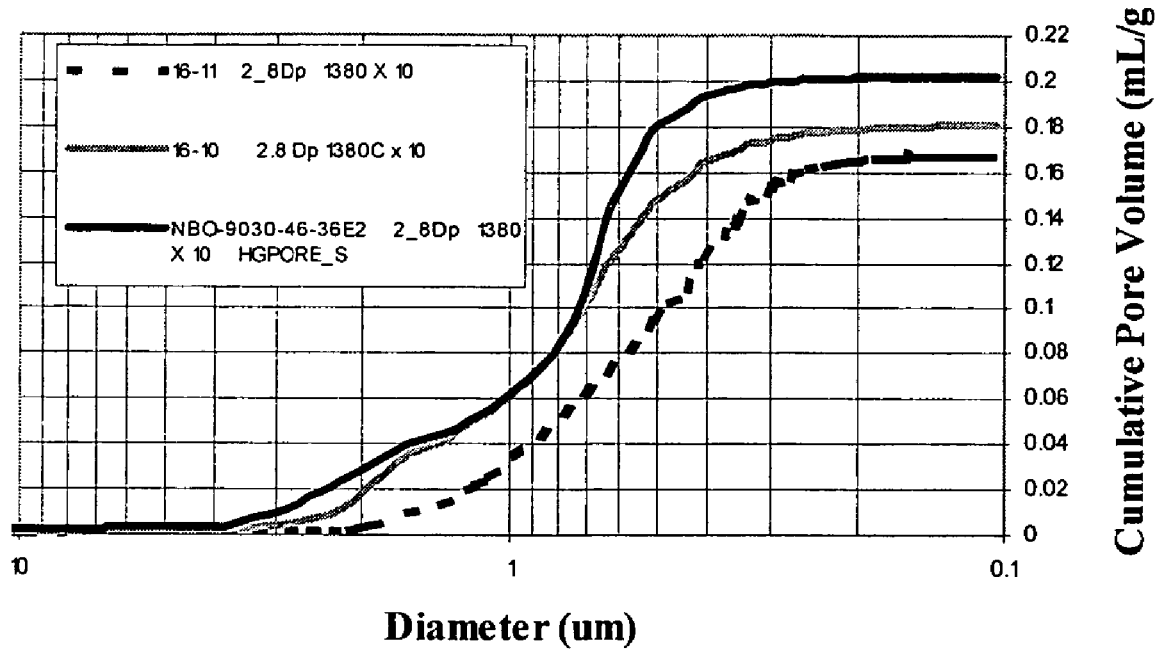

Powder mixtures were granulated and heat treated to 1100° C. followed by reaction in hydrogen as described above. The oxygen reduced niobium oxide formed in this manner was tested in the same manner and the results are set forth in Table 6. The pore size distribution and cumulative pore volumes for the press and sintered oxygen reduced niobium oxides at 2.8 g/cc are shown in FIGS. 8 and 9.

TABLE 4

| Lot # | granule size mesh | Scott g/in3 | Crush lbs | Flow s1/25 g | CV/g 1.5 V | CV/g 10 V | DCL 180 s | Shrink % |
|---|---|---|---|---|---|---|---|---|
| 9030-46-38D | −50 | 22 | 4.38 | 22.4 | 153400 | 100100 | 0.12 | 3.99 |
| 9030-46-38D1 | −70 | 21.5 | 3.84 | 23.2 | 153470 | 100060 | 0.12 | 4.34 |
| 9030-46-38D2 | −100 | 20.4 | 4.2 | 29.8 | 153700 | 99450 | 0.12 | 4.18 |

Example 5

Samples in Example 4 were also sintered at two different temperatures and tested for certain properties outlined in Table 5.

TABLE 5

| Lot # | Sinter Temp ° C. | Scott g/in3 | Crush Lbs | Flow s/25 g | CV/g 1.5 V | CV/g 10 V | DCL 180 s | Shrink % |
|---|---|---|---|---|---|---|---|---|
| 9030-46-38D | 1380 | 22 | 4.38 | 22.4 | 153400 | 100100 | 0.12 | 3.99 |
| 9030-46-38D | 1280 | 22 | 4.38 | 22.4 | 181700 | 109800 | 0.12 | 0.52 |

Example 6

According to an embodiment of the invention, niobium hydride powder (20 g) having a BET surface area of 3.9 m2/g and starting niobium oxide (16.1 g), i.e. niobium pentoxide, with a BET surface area of 3.9 m2/g were mixed together to form a powder mixture. The powder mixture was then attritor milled (comilled) in water for 2 hours using 3/16" Nb media. The powder slurry was vacuum dried at 120° C. and granulated by passing the dried powder over a 100 mesh screen. The granular powder mixture was then placed into a vacuum heat treatment furnace and heated to 1400° C. for about 2 hours. The temperature in the furnace was then brought to about 850° C. and hydrogen gas was admitted to the furnace to a pressure of about 960 Torr and held for about 1 hour. After formation, the oxygen reduced niobium oxide was tested for certain properties which are set forth in Table 6. In addition, sample lots of niobium hydride and niobium pentoxide were mixed as described above without the attritor milling step.

TABLE 6

| Lot # | granule size mesh | Scott g/in3 | Crush Lbs | Flow s/25 g | CV/g 10 V | DCL 180 s | Shrink % | comilled |
|---|---|---|---|---|---|---|---|---|
| 9030-46-36E2 | −100 | 21 | 1.39 | 23.3 | 80100 | 0.11 | 0.6 | Yes |
| 16-11 | −50 | 21.9 | 1.65 | 41 | 82824 | 0.22 | 4.5 | no |
| 16-10 | −50 | 19.8 | 2.7 | 23 | 76751 | 0.17 | 3.5 | no |

Example 7

Four samples of niobium pentoxide were placed in separate crucibles and placed into a vacuum heat treatment furnace. The furnace was evacuated to a pressure of 1 torr. Argon gas was admitted to the furnace to a pressure of 0.11 torr. The temperature in the furnace was ramped up to 1450° C. and held for 60 minutes. At this point, argon was readmitted to the furnace and the furnace cooled to a temperature of 50° C. The heat treated samples were then passivated with air by incremental increases in the pressure of the furnace to atmosphere.

Samples of the agglomerated niobium pentoxide were deagglomerated using an attritor mill. 1000 grams of the agglomerated $Nb_2O_5$ was mixed with one liter of water, to which a number of 3/16" media were added to form a slurry.

The slurry was milled for separate milling runs of 20, 30, and 10 minutes, each with the mill operating at 350 rpm. Four additional milling runs of 10 minutes were carried out at 350 rpm. The 3/16" media were removed from the slurry, and 1/16" media added. Several 20 minute milling runs were then made with the mill operating at 200 rpm.

microns, a BET surface area of about 4.0 m²/g, and an oxygen content of about 27,000 ppm.

The particle size distribution of the niobium powders obtained are shown in FIG. 13 as coarse grind, fine grind, and super fine grind, respectively. The results are also shown in Table 7.

TABLE 7

| Degree of Milling | Tip Speed (in/min) | Media Size Diam. (inch) | Milling Time: Stage I (hours) | Milling Time: Stage II (hours) | D10 (μm) | D50 (μm) | D90 (μm) | BET Surface Area (m²/g) | Oxygen Content (ppm) | Fe/Ni/Cr Content (ppm) |
|---|---|---|---|---|---|---|---|---|---|---|
| Coarse | 5k-9k | 3/16 | 3-6 | N/A | 1.7 | 35 | 7.0 | 1.5 | 10,000 | 35 |
| Fine | 5k-9k | 1/16 | 3-6 | 4-8 | 1.3 | 2.3 | 3.8 | 2.6 | 20,000 | 45 |
| Super Fine | 5k-9k | 1/16 | 3-6 | 15-24 | 0.8 | 1.3 | 1.8 | 4.0 | 27,000 | 60 |

Figure 10:
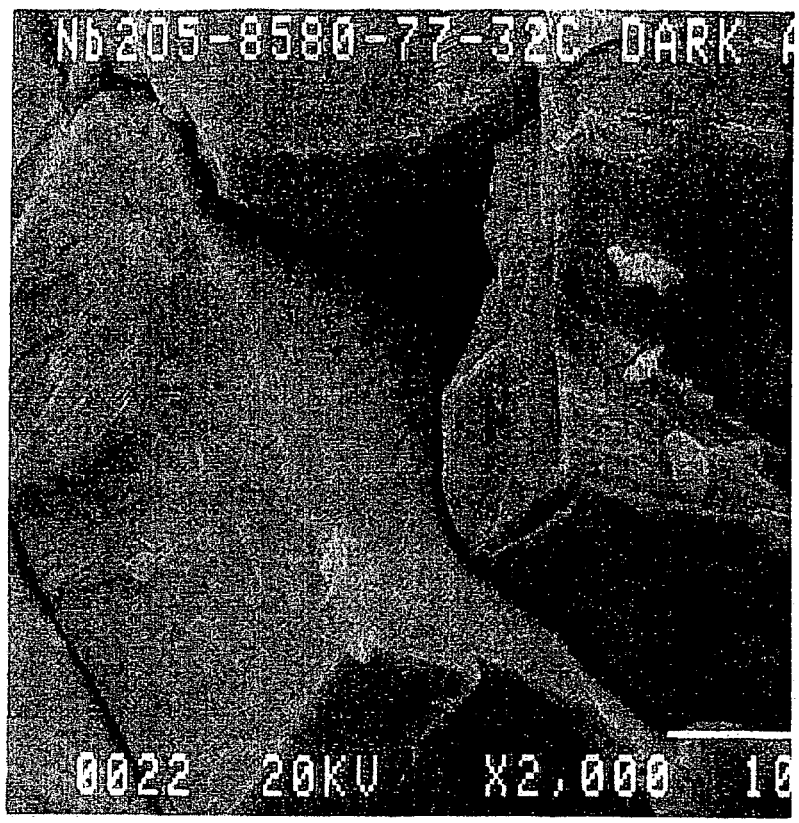
FIGS. 10 and 11 are SEMs of agglomerated niobium pentoxide particles of the present invention at two different magnifications.
Figure 11:
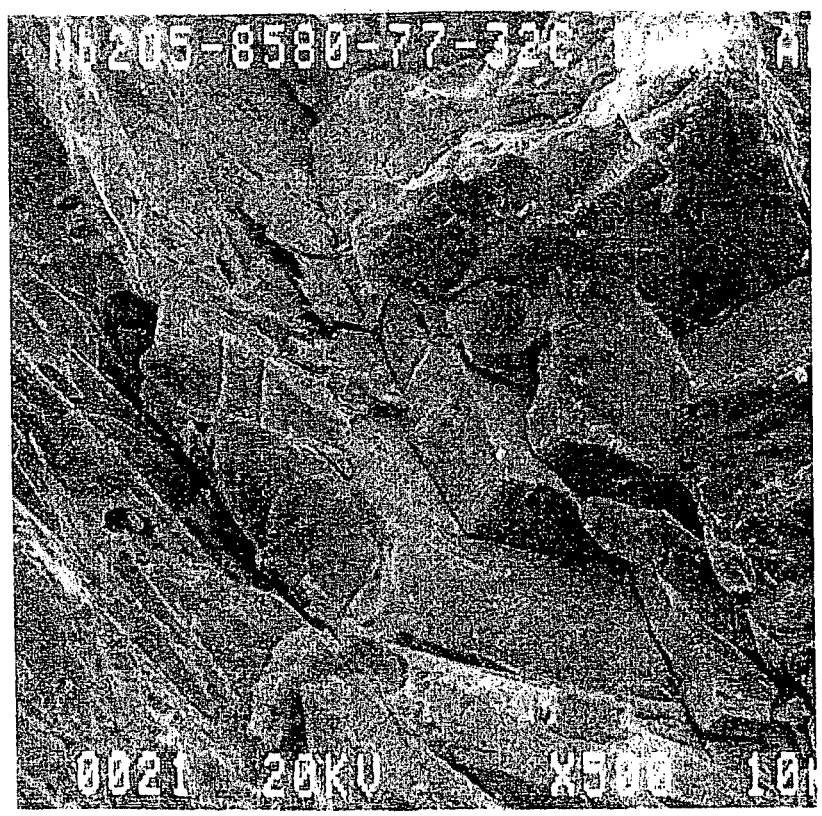
Figure 12:
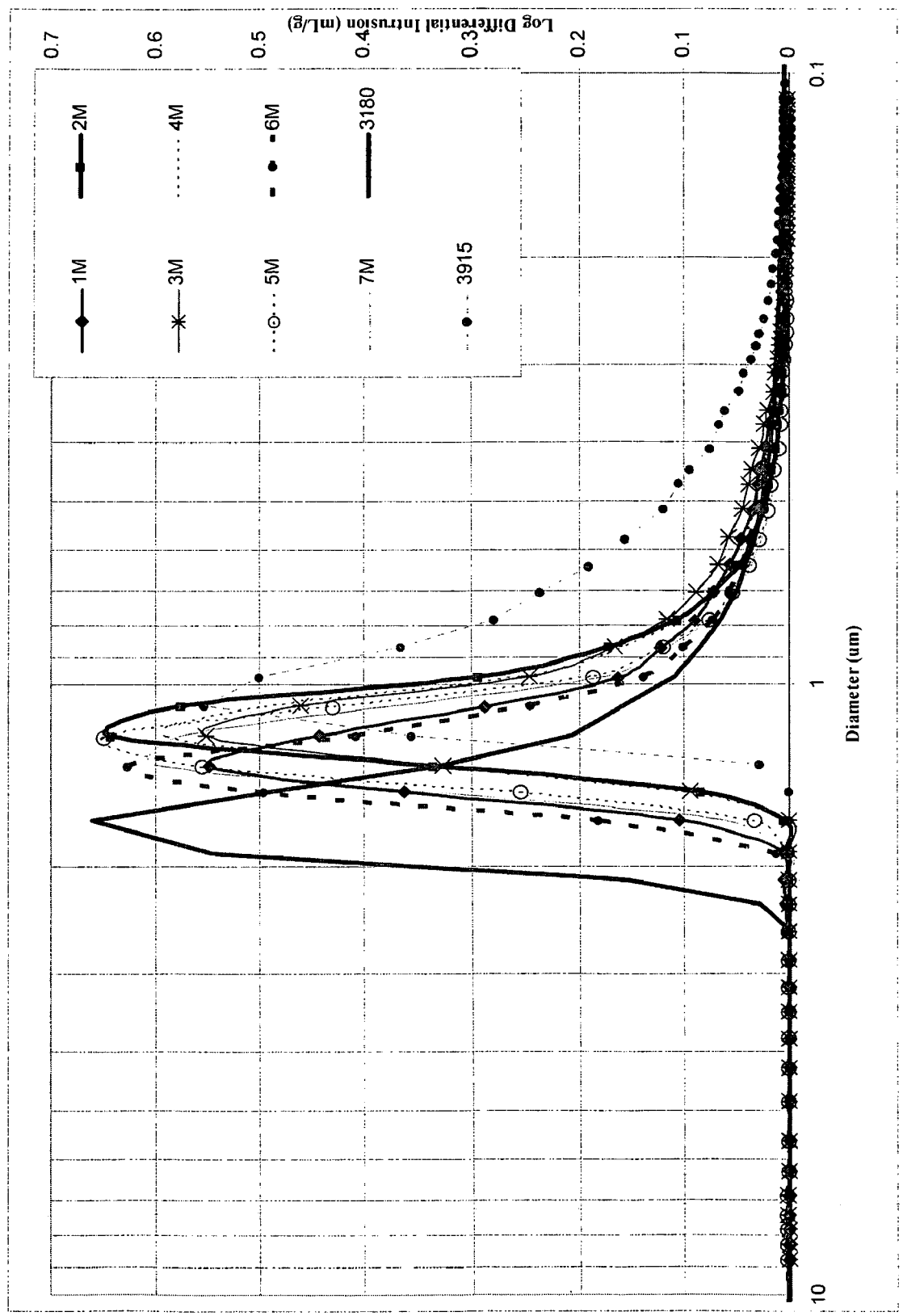
FIG. 12 is a graph of porosimetry comparisons of niobium suboxide anodes made via the present invention of various sizes.

FIGS. 10 and 11 are microphotographs obtained by use of a scanning electron microscope (SEM) showing niobium pentoxide particles of the present invention taken at 500× and 2,000×magnification, respectively. FIG. 12 is graph of porosimetry comparisons of various niobium suboxide anodes made via the present invention.

Example 8

According to an embodiment of the invention, a niobium feedstock was a highly purified crushed niobium hydride screened to −40 mesh. The feedstock was milled in 1S Attritor mill to obtain the desired size reduction. The mill itself was lined with Nb and was outfitted with Nb arms to minimize contamination. The milling was accomplished by stirring 3/16" Nb balls in water and then adding the 40 mesh Nb powder to create a slurry. The mill was operated at about 450 rpm for a time from between 3 to 6 hours to reduce the size of the first milled niobium powder to between 3 to 4 microns, a BET surface area of about 1.5 m²/g, and an oxygen content of about 10,000 ppm.

The first milled niobium metal as prepared in this Example was removed from the mill and separated from the 3/16 inch milling media using a screen. 1/16 Nb media was placed in the mill and the slurry returned to the mill. The mill was then operated at about 450 rpm for an additional 4-8 hours with the smaller media to obtain the surface-passivated niobium powder having a size of between 2-3 microns, a BET surface area of about 2.6 m²/g, and an oxygen content of about 20,000 ppm.

The first milled niobium metal as prepared was removed from the mill and separated from the 3/16 inch milling media using a screen. 1/16" Nb media was placed in the mill and the slurry returned to the mill. The mill was then operated at about 450 rpm for an additional 15-24 hours to obtain the surface-passivated niobium powder having a size of between 1-2

The milled slurry was decanted to remove any excess water, and placed in a vacuum oven at 100° C. to dry. After the powder was dry it was screened through a 20 mesh screen to produce spherical granules. An additional screening step using a 40 mesh screen was used to prepare granules that were less than 425 microns in size. The granules were then placed in a vacuum heat treated furnace and heated under vacuum between 600 and 1000° C. and/or combinations of these heat treatment temperatures. The heat treated powders had flow values greater than 300 mg/s as measured by ASTM B 213. Heat treated granulated powders were then pressed and sintered at 1125° C. After formation at 40 V, the Nb samples (fine and super fine) were tested for certain tests which are set forth in Table 8.

TABLE 8

| Sample | Type | 1st Heat Treat (C.) | 2nd Heat Treat (C.) | 0 V CV/g | 1.5 V CV/g | 2.5 V CV/g | 10 V CV/g | nA/CV 180 s 10 V | Shrink % |
|---|---|---|---|---|---|---|---|---|---|
| 1 | Fine | 600 | 0 | 152033 | 97165 | 84647 | 66927 | 1.59 | 8 |
| 2 | Fine | 600 | 800 | 163060 | 102093 | 88334 | 68665 | 1.58 | 6 |
| 3 | Fine | 700 | 0 | 154851 | 98294 | 85364 | 67235 | 1.72 | 7.5 |
| 4 | Fine | 800 | 0 | 154904 | 97793 | 85102 | 66776 | 1.81 | 6 |
| 5 | Super Fine | 600 | 0 | 127855 | 589609 | 80476 | 67377 | 0.56 | 9.98 |
| 6 | Super Fine | 700 | 0 | 134940 | 93705 | 83828 | 69753 | 0.45 | 9.65 |
| 7 | Super Fine | 700 | 800 | 154410 | 103094 | 91173 | 74579 | 0.51 | 7.97 |
| 8 | Super Fine | 800 | 0 | 144850 | 98322 | 87281 | 71949 | 0.61 | 8.3 |
| 9 | Super Fine | 900 | 0 | 151414 | 99804 | 88310 | 72987 | 0.68 | 5.5 |
| 10 | Super Fine | 1000 | 0 | 145564 | 95238 | 84498 | 70362 | 0.5 | 2.79 |

Example 9

In this Example, Example 8 was essentially repeated except as shown in Table 9, and except an extra stage of milling was used for some of the samples. Thus, in this Example, a first stage milling was compared to a two stage milling and to a three stage milling wherein the second stage and third stage had varying milling times as shown in Table 9. The various physical parameters of the resulting hydrided niobium are also set forth in Table 9.

TABLE 9

| Type | Tip Speed (ft/min) | Milling Time: Stage I (3/16") Hours | Milling Time: Stage II (1/16") Hours | Milling Time Stage III (1/32") Hours | $d_{10}$ µm | $d_{50}$ µm | $d_{90}$ µm | BET Surface Area $m^2/g$ | Scott Density (lb/ft$^3$) | Oxygen Content ppm |
|---|---|---|---|---|---|---|---|---|---|---|
| Coarse | 5000-9000 | 3 | 0 | 0 | 1.7 | 3.5 | 7.0 | 1.5 | 25.3 | ~10000 |
| Fine | 5000-9000 | 3 | 6 | 0 | 1.3 | 2.3 | 3.8 | 2.6 | 24 | ~20000 |
| Super Fine | 5000-9000 | 3 | 20 | 0 | 0.8 | 1.2 | 1.8 | 3.8-4.0 | 22 | ~27000 |
| Ultra Fine | 5000-9000 | 3 | 6 | 20 | 0.6 | 0.9 | 1.3 | 5.5 | 19 | ~50,000 |
| Ultra Fine | 5000-9000 | 3 | 20 | 20 | 0.6 | 0.9 | 1.3 | 5.5 | 19 | ~50,000 |

FIG. 15 shows a comparison of BET surface area versus milling time for 1/32" media. The various meaning of the feedstocks are set forth in Table 9. In addition, FIG. 14 shows a particle size distribution for the various powders milled in accordance with Example 9. As further shown in the Examples, the milled powders had varying oxygen amounts. In these Examples, all powders had some level of oxygen associated with the passivated surface. Therefore, the powders milled were a hydrided niobium with a thin shell of niobium pentoxide on the surface (e.g., approximately 8 nm thick). Even after removing the hydrogen by heating, for instance, the niobium metal with this niobium pentoxide shell would still exist.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. Oxygen reduced niobium oxide granules, wherein the oxygen reduced niobium oxide granules have a multi-modal pore size distribution of from about 0.1 to about 20 microns, after being pressed and sintered, and are formed from oxygen reduced niobium oxide having a BET surface area of from about 0.5 to about 8 $m^2/g$.

2. The oxygen reduced niobium oxide granules of claim 1, wherein said oxygen reduced niobium oxide has a BET surface area of from about 1 to about 8 $m^2/g$.

3. The oxygen reduced niobium oxide granules of claim 1, wherein said oxygen reduced niobium oxide has a capacitance, when formed into an electrolytic capacitor anode at a $V_f$ of 30 V and sintered at 1380° C. for 10 minutes, of from about 40,000 to about 300,000 CV/g, and a DC leakage of less than about 0.5 nA/CV.

4. The oxygen reduced niobium oxide granules of claim 1, wherein said oxygen reduced niobium oxide has a flow of at least about 300 mg/s.

5. The oxygen reduced niobium oxide granules of claim 1, wherein said granules have a $D_{50}$ size of from about 30 to about 1,000 microns.

6. The oxygen reduced niobium oxide granules of claim 1, wherein said granules have a primary particle size of from about 0.1 to about 5 microns.

7. The oxygen reduced niobium oxide granules of claim 1, wherein said granules have a pore volume of from about 0.1 to about 0.25 mL/g, after being pressed and sintered.

8. The oxygen reduced niobium oxide granules of claim 1, wherein said granules have a diametric shrinkage of from about 0.1 to about 10%, after being pressed at 2.8 g/cc and sintered at 1380 C for 10 mins.

9. The oxygen reduced niobium oxide granules of claim 1, wherein said granules have a pressability of from about 2.4 to about 3.5 g/cc.

10. The oxygen reduced niobium oxide granules of claim 1, wherein said granules have a combined amount of Fe/Ni/Cr of less than about 100 ppm.

11. A capacitor anode comprising the granules of claim 1.

12. The capacitor anode of claim 11, wherein said capacitor anode has a capacitance of from about 40,000 to about 300,000 CV/g when formed at a $V_f$ of 30 V and sintered at 1380° C. for 10 minutes.

13. The capacitor anode of claim 11, wherein said capacitor anode has a DC leakage of less than about 0.5 nA/CV.

14. The oxygen reduced niobium oxide granules of claim 1, further having a sintered crush strength of at least 35 lbs.

15. The oxygen reduced niobium oxide granules of claim 14, wherein said sintered crush strength is from about 35 lbs. to about 75 lbs.

16. The oxygen reduced niobium oxide granules of claim 1, further having a granule strength substantially independent of granule size.

17. The oxygen reduced niobium oxide granules of claim 16, wherein said granule strength is substantially independent of granule size wherein said granule size is from about 75 microns to about 425 microns.

18. The oxygen reduced niobium oxide granules of claim 16, wherein said valve metal sub-oxide powder further has a green crush strength of at least 1 lb.

19. The oxygen reduced niobium oxide granules of claim 1, further having a granule strength, measured by a D50(NU)/D50(120S-U) ratio, of from about 1.0 to about 3.5.

20. The oxygen reduced niobium oxide granules of claim 19, wherein said ratio is from about 1 to about 3.

21. The oxygen reduced niobium oxide granules of claim 1, further having a pore size distribution having an adjustable log differential intrusion peak height of from about 0.4 mL/g to about 0.75 mL/g.

22. The oxygen reduced niobium oxide granules of claim 1, further having a carbon retention after delube of less than 200 ppm.

23. The oxygen reduced niobium oxide granules of claim 1, wherein said granules have an oxygen content of from about 5,000 to about 15,000 ppm and a mean particle size of from about 3 to about 4 microns when said granules have a BET surface area of from about 1 to about 2 $m^2/g$, an oxygen content of from about 15,000 to about 22,000 ppm and a mean particle size of from about 2 to about 3 microns when said granules have a BET surface area of from about 2 to about 3 $m^2/g$, an oxygen content of from about 22,000 to about 28,000 ppm and a mean particle size of from about 1 to about 2 microns when said granules have a BET surface area of from about 3 to about 4.5 $m^2/g$, and an oxygen content of at least about 28,000 ppm and a mean particle size of less than about 1 micron when said granules have a BET surface area of at least about 4.5 m²/g, and an oxygen content of from about 28,000 to about 70,000 ppm and a mean particle size of less than 1 micron when said granules have a BET surface area of from about 5 to about 8 microns.

24. The oxygen reduced niobium oxide granules of claim 23, wherein said granules have a flow of at least about 300 mg/s.

25. The oxygen reduced niobium oxide granules of claim 23, wherein said granules after being pressed and sintered have a diametric shrinkage of from about 1 to about 12%.

26. The oxygen reduced niobium oxide granules of claim 23, wherein said granules have a capacitance of from about 35,000 to about 300,000 CV/g and a leakage current of from about 0.2 to about 2 nA/CV when said granules are sintered at a temperature of 1125° C. for 10 minutes at a $V_f$ of 40 V.

27. The oxygen reduced niobium oxide of claim 1, wherein the granules have a multimodal pore size distribution from about 0.1 to about 10 microns, after being pressed and sintered.

28. A method of making the oxygen reduced niobium oxide granules of claim 1, comprising:
providing oxygen reduced niobium oxide having a BET surface area of from about 0.5 to about 8 m²/g; and
heat treating said oxygen reduced niobium oxide under vacuum or inert gases to form heat-treated oxygen reduced niobium oxide granules having a BET surface area that is less than the BET surface area of said provided oxygen reduced niobium oxide.

29. The method of claim 28, wherein said heat-treated oxygen reduced niobium oxide has a crush strength of at least about 90% of a crush strength of said oxygen reduced valve metal oxide.

30. A method to at least partially reduce a niobium oxide, comprising:
mixing a niobium powder and a starting niobium oxide together to form a powder mixture and granulating said powder mixture to form granules;
heat treating said granules under vacuum or inert gases to form heat treated granules; and
reacting said heat treated granules in an atmosphere which permits the transfer of oxygen atoms from said starting niobium oxide to said niobium powder, wherein said reacting occurs for a time and at a temperature sufficient to form an oxygen reduced niobium oxide.

31. The method of claim 30, wherein said niobium powder has a BET surface area of from about 1 to about 8 m²/g.

32. The method of claim 30, wherein said starting niobium oxide has a BET surface area of from about 1 to about 15 m²/g.

33. The method of claim 30, wherein said oxygen reduced niobium oxide is NbO.

34. The method of claim 30, wherein said oxygen reduced niobium oxide has an atomic ratio of niobium to oxygen of 1:less than 2.5.

35. The method of claim 30, wherein said temperature of said reacting is about 850° C., and said time of said reacting is from about 1 hour.

36. The method of claim 30, wherein said atmosphere is hydrogen and is present in an amount of 10 to about 1,000 Torr.

37. The method of claim 30, wherein said granulating forms granules having a size of less than 425 microns.

38. The method of claim 30, wherein said mixing comprises co-milling said niobium powder with said starting niobium oxide.

39. The method of claim 30, wherein said mixing comprises co-milling said niobium powder with said starting niobium oxide such that any aggregates present in said niobium powder and/or in said starting niobium oxide are reduced to their respective primary particles.

40. The method of claim 30, further comprising post heat treating said oxygen reduced niobium oxide at a temperature and for a time sufficient to reduce the BET surface area of the oxygen reduced niobium oxide by at least 1% and to reduce the capacitance capability of said oxygen reduced niobium oxide by no more than 25%.

41. The method of claim 30, further comprising post heat treating said oxygen reduced niobium oxide at a temperature of from about 800° C. to about 1300° C., wherein said post heat treatment reduces the capacitance capability of said oxygen reduced niobium oxide by no more than 25%.

42. The method of claim 41, wherein said post heat treatment reduces the capacitance capability of said oxygen reduced niobium oxide by no more than 10%.

43. The method of claim 30, wherein said granulating comprises wet screening.

44. The method of claim 30, wherein said granulating comprises wet granulating.

45. The method of claim 30, wherein said granulating comprises dry granulating.

46. The method of claim 30, wherein said granulating of said oxygen reduced niobium oxide forms granules having a size of from about 30 to about 1,000 microns.

47. Oxygen reduced niobium oxide granules having a pore size distribution with a mono-modal log differential intrusion peak at 0.4 micron, and said peak has a breadth of from 0.2 to 0.6 microns at 0.1 mL/g, and said peak has a height greater than 0.5 mL/g, when pressed and sintered.

48. Oxygen reduced niobium oxide granules having a pore size distribution with a mono-modal log differential intrusion peak located at 0.5 to 0.8 microns, wherein said peak has a breadth of from 0.3 to 1.1 microns at 0.1 mL/g, and said peak has a height greater than 0.6 mL/g, when pressed and sintered.

49. Oxygen reduced niobium oxide granules having a pore size distribution such that a mono-modal log differential intrusion peak is present with a shoulder extending from 0.3 micron or less to 10 microns or greater with a shoulder height of less than 0.1 mL/g, when pressed and sintered.

50. Oxygen reduced niobium oxide granules having a pore size distribution which includes a shoulder that has a ratio of cumulative volume between 1 and 10 microns, wherein said ratio is from 1 to 7.5, when pressed and sintered.

51. Oxygen reduced niobium oxide granules having a pore size distribution which includes a shoulder that has a total porosity from 4 to 13 percent above 1 micron, when pressed and sintered.

52. Oxygen reduced niobium oxide granules having a pore size distribution which includes a shoulder that has a total porosity of from 1 to 4 percent and pore sizes of less than 10 microns, when pressed and sintered.

53. A method to at least partially reduce a valve metal oxide, comprising:
subjecting a starting valve metal oxide to a first heat treatment in the presence of a getter material and in an atmosphere which permits the transfer of oxygen atoms from said starting valve metal oxide to said getter material, to form an oxygen reduced valve metal oxide having a first BET surface area; and
subjecting said oxygen reduced valve metal oxide to a second heat treatment under vacuum or inert gases to form a heat-treated oxygen reduced valve metal oxide having a second BET surface area, wherein said second BET surface area is less than said first BET surface area.

54. The method of claim 53, wherein said heat-treated oxygen reduced valve metal oxide has a crush strength of at least about 90% of a crush strength of said oxygen reduced valve metal oxide.

55. The heat-treated oxygen reduced valve metal oxide formed by the method of claim 53.

56. A capacitor comprising the heat-treated oxygen reduced valve metal oxide of claim 55.

57. Niobium sub-oxide granules having at least a)through c) and at least one of d) through h) of the following characteristics:
   a) BET surface area of powder ("BET"): about 1.4 to about 2.5 $m^2/g$
   b) Scott Density of powder ("Scott"): about 19 to about 28 $g/in^3$
   c) capacitance @ 10 Vb ("CV/g"): 69,000-83,000 μFV/g
   d) CV/g×BET×Scott: $1.12 \times 10^{11}$-$3.55 \times 10^{11}$ CV/(m*g)
   e) CV/g×1/BET×Scott: $3.2 \times 10^{10}$-$10.1 \times 10^{10}$ (CV*g)/$m^5$
   f) CV/g×1/BET×1/Scott: $1.62 \times 10^{-2}$-$5.11 \times 10^{-2}$ (CV*m/g)
   g) CV/g×1/BET: 33,000-57,000 CV/$m^2$
   h) CV/g×Scott: $1.10 \times 10^6$-$2.20 \times 10^6$ CV/$in^3$.

58. The niobium sub-oxide granules of claim 57, wherein said niobium sub-oxide powder has at least characteristics d) and g).

59. The niobium sub-oxide granules of claim 57, wherein said niobium sub-oxide powder has characteristics e), f), g), and h).

60. The niobium sub-oxide granules of claim 57, wherein said niobium sub-oxide powder is NbO.

* * * * *